US012728714B2

(12) United States Patent
Wei et al.

(10) Patent No.: US 12,728,714 B2
(45) Date of Patent: Sep. 8, 2026

(54) ELECTRIC ALL-TERRAIN VEHICLE AND CONTROL METHOD OF VEHICLE BRAKING

(71) Applicant: Greenworks (Jiangsu) Co., Ltd., Changzhou (CN)

(72) Inventors: Qunli Wei, Changzhou (CN); Fei Zhu, Changzhou (CN); Jiafu Xue, Changzhou (CN); Mi Ding, Changzhou (CN); Shiyuan Ding, Changzhou (CN); Baogui Wu, Changzhou (CN); Yueyue Xu, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 301 days.

(21) Appl. No.: 18/533,154

(22) Filed: Dec. 7, 2023

(65) Prior Publication Data

US 2024/0123806 A1 Apr. 18, 2024

Related U.S. Application Data

(63) Continuation of application No. PCT/CN2022/098007, filed on Jun. 10, 2022.

(30) Foreign Application Priority Data

Jun. 11, 2021 (CN) ......................... 202110653232.7
Jun. 11, 2021 (CN) ......................... 202110653234.6
(Continued)

(51) Int. Cl.
*B60K 1/00* (2006.01)
*B60K 1/04* (2019.01)
(Continued)

(52) U.S. Cl.
CPC .................. *B60K 1/00* (2013.01); *B60K 1/04* (2013.01); *B60K 17/04* (2013.01); *B60L 50/60* (2019.02);
(Continued)

(58) Field of Classification Search
CPC ...................................................... B62D 33/02
See application file for complete search history.

(56) References Cited

U.S. PATENT DOCUMENTS

2009/0121518 A1* 5/2009 Leonard ................. B62D 61/10
296/183.1
2010/0317484 A1* 12/2010 Gillingham .......... B60K 17/346
180/242
(Continued)

FOREIGN PATENT DOCUMENTS

CN 104608825 A 5/2015
CN 106515690 A 3/2017
(Continued)

*Primary Examiner* — Brian L Swenson

(57) ABSTRACT

The electric all-terrain vehicle includes a vehicle frame, a motor, a gearbox, a cargo compartment, a battery pack, a handle assembly and a walking wheel. The motor is arranged on the vehicle frame and located at a rear end of the vehicle frame. The gearbox is arranged on the vehicle frame and located on a first side of the motor, and the gearbox is connected with the motor. The cargo compartment is arranged on the vehicle frame and located above the motor and the gearbox. The battery pack is mounted on a bracket to provide power for the electric all-terrain vehicle. The handle assembly is arranged on the cargo compartment and allows an adjustment of the handle assembly to lock or unlock the cargo compartment from the vehicle frame. The walking wheel is arranged on the vehicle frame and includes a rear wheel connected with the gearbox.

19 Claims, 26 Drawing Sheets

(30) Foreign Application Priority Data

| | | |
|---|---|---|
| Jun. 11, 2021 | (CN) | 202110654545.4 |
| Jun. 11, 2021 | (CN) | 202110654571.7 |
| Jun. 11, 2021 | (CN) | 202121314967.9 |
| Jun. 11, 2021 | (CN) | 202121315661.5 |
| Jun. 11, 2021 | (CN) | 202121316067.8 |
| Jun. 11, 2021 | (CN) | 202121316087.5 |
| Jun. 11, 2021 | (CN) | 202121321467.8 |
| Jun. 11, 2021 | (CN) | 202121321592.9 |
| Jun. 11, 2021 | (CN) | 202121321613.7 |
| Jun. 11, 2021 | (CN) | 202121322358.8 |
| Jun. 11, 2021 | (CN) | 202121329868.8 |
| Jun. 25, 2021 | (CN) | 202121438815.X |
| Jun. 25, 2021 | (CN) | 202121439126.0 |

(51) Int. Cl.

| | |
|---|---|
| ***B60K 17/04*** | (2006.01) |
| ***B60L 50/60*** | (2019.01) |
| ***B60N 2/005*** | (2006.01) |
| ***B60N 2/68*** | (2006.01) |
| ***B62D 21/02*** | (2006.01) |
| ***H01M 50/249*** | (2021.01) |
| ***H01M 50/262*** | (2021.01) |
| *B60R 19/24* | (2006.01) |
| *B62D 33/023* | (2006.01) |

(52) U.S. Cl.

CPC ............... *B60N 2/005* (2013.01); *B60N 2/68* (2013.01); *B62D 21/02* (2013.01); *H01M 50/249* (2021.01); *H01M 50/262* (2021.01); *B60R 19/24* (2013.01); *B62D 33/023* (2013.01); *H01M 2220/20* (2013.01)

(56) References Cited

U.S. PATENT DOCUMENTS

| | | | | |
|---|---|---|---|---|
| 2011/0049931 | A1* | 3/2011 | Gagnon | B60P 1/04<br>296/182.1 |
| 2011/0094811 | A1* | 4/2011 | Suzuki | B60K 11/04<br>296/210 |
| 2012/0032465 | A1* | 2/2012 | Morita | B62D 33/08<br>296/26.11 |
| 2012/0193932 | A1* | 8/2012 | King | B62D 47/003<br>296/26.11 |
| 2017/0174141 | A1 | 6/2017 | Jhant et al. | |
| 2018/0001827 | A1* | 1/2018 | Robertson | B60R 11/06 |
| 2019/0185077 | A1* | 6/2019 | Smith | B60K 17/348 |
| 2019/0366829 | A1* | 12/2019 | Avenatti | B60S 11/00 |
| 2021/0237802 | A1* | 8/2021 | Chalifour | B62D 27/00 |
| 2022/0306222 | A1* | 9/2022 | Deckard | B60K 1/04 |

FOREIGN PATENT DOCUMENTS

| | | | |
|---|---|---|---|
| CN | 106904078 | A | 6/2017 |
| CN | 106926751 | A | 7/2017 |
| CN | 108790839 | A | 11/2018 |
| CN | 210309896 | U | 4/2020 |
| CN | 111890949 | A | 11/2020 |
| CN | 214776329 | U | 11/2021 |
| CN | 214776330 | U | 11/2021 |
| CN | 214797545 | U | 11/2021 |
| CN | 215155281 | U | 12/2021 |
| CN | 215155297 | U | 12/2021 |
| JP | H0948340 | A | 2/1997 |

* cited by examiner

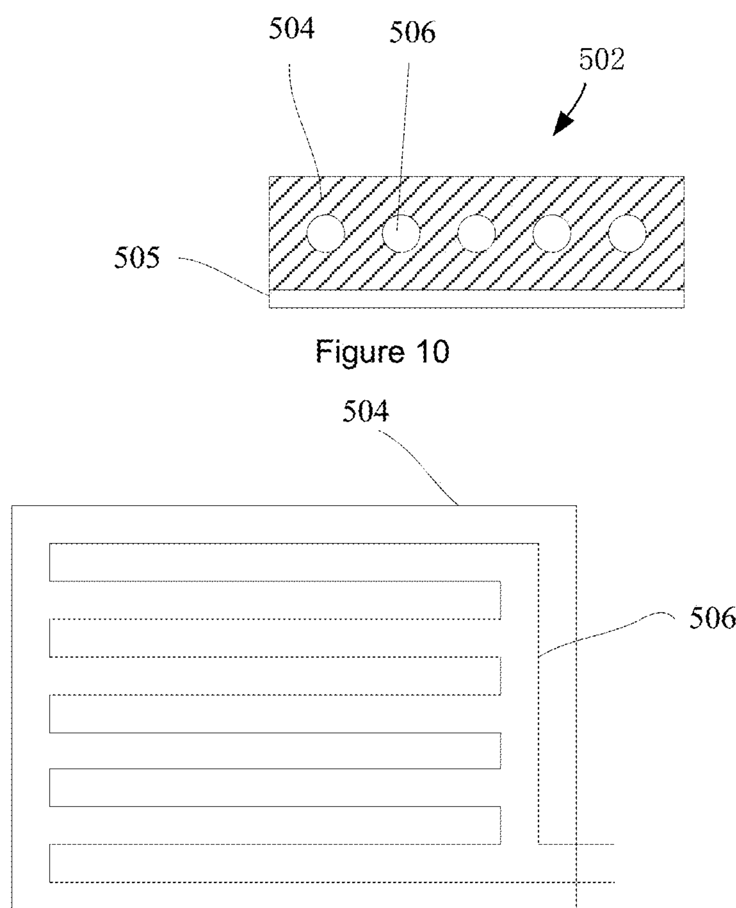
Figure 10
Figure 11
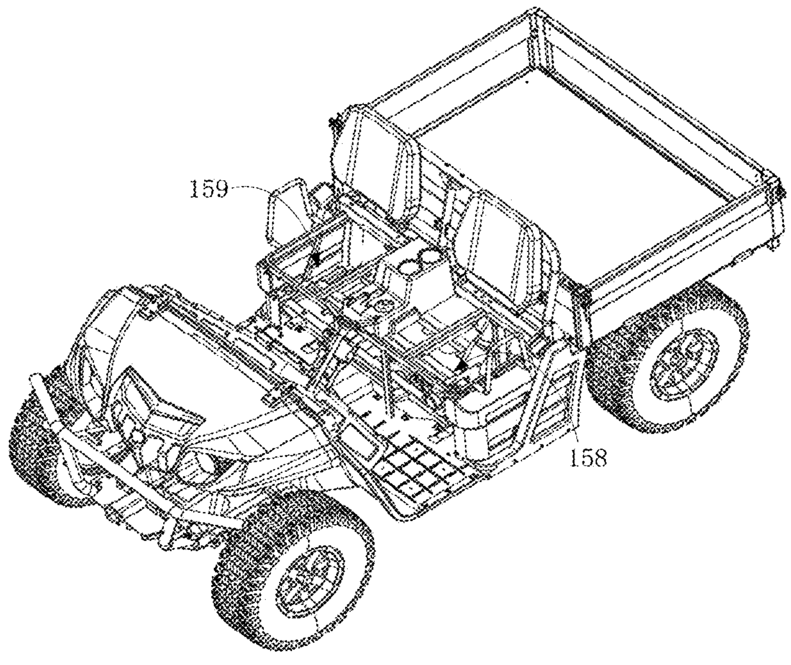
Figure 12

ELECTRIC ALL-TERRAIN VEHICLE AND CONTROL METHOD OF VEHICLE BRAKING

TECHNICAL FIELD

The disclosure belongs to the technical field of vehicles, and in particular relates to an electric all-terrain vehicle and a control method of vehicle braking.

BACKGROUND

An all-terrain vehicle refers to a vehicle that may travel on any terrain, and it may walk freely on terrain where ordinary vehicles are difficult to walk. It is commonly known as a beach vehicle in China. This type of vehicle has a variety of uses and is not limited by road conditions. All-terrain vehicles are usually powered by gasoline or diesel and therefore pollute the environment.

All-terrain vehicles generally use gasoline or diesel, exhaust gas and noise will pollute the environment during operation, the structure of all-terrain vehicles is complicated, and the maintenance cost is relatively high.

SUMMARY

The disclosure provides an electric all-terrain vehicle and a control method of vehicle braking. The electric all-terrain vehicle is provided with a simple structure, may make full use of a space of a vehicle frame, and is convenient for maintenance.

The disclosure provides an electric all-terrain vehicle, which includes a vehicle frame, a motor, a gearbox, a cargo compartment, a battery pack, a handle assembly and a walking wheel. The motor is arranged on the vehicle frame and is located at a rear end of the vehicle frame. The gearbox is arranged on the vehicle frame and is located on a first side of the motor, and the gearbox is connected with the motor. The cargo compartment is arranged on the vehicle frame, and the cargo compartment is located above the motor and the gearbox. The battery pack is mounted on the vehicle frame to provide power for the electric all-terrain vehicle. The handle assembly is arranged on the cargo compartment and being adjustable to lock or unlock the cargo compartment from the vehicle frame. The walking wheel is arranged on the vehicle frame and includes a rear wheel, and the gearbox is connected with the rear wheel.

In some embodiments, the vehicle frame includes a bottom assembly and an upper assembly. The upper assembly is arranged on the bottom assembly, and the upper assembly and the bottom assembly form an accommodation space.

In some embodiments, the vehicle frame further includes a front assembly arranged on the bottom assembly, and the front assembly is located at a front end of the upper assembly.

In some embodiments, the bottom assembly includes two longitudinal beams, a plurality of side beams, a front bumper bracket, and a rear tow hook bracket. The two longitudinal beams are arranged in parallel. The plurality of side beams are respectively arranged on the two longitudinal beams, the side beams are perpendicular to the longitudinal beams and extend to an outside of the accommodation space. The front bumper bracket is arranged at a first end of the longitudinal beam and connects the two longitudinal beams. The rear tow hook bracket is arranged at a second end of the longitudinal beam and connects the two longitudinal beams.

In some embodiments, the bottom assembly further includes at least two intermediate cross beams and a connecting arm. The two intermediate cross beams are arranged in parallel between the two longitudinal beams. Two ends of the connecting arm are respectively connected with the intermediate cross beams.

In some embodiments, the upper assembly includes a seat bucket frame and a seat cushion mounting bracket. The seat bucket frame is arranged on the vehicle frame and parallel to the vehicle frame. The seat cushion mounting bracket is arranged on the seat bucket frame and including a rubber cushion therein.

In some embodiments, the seat is arranged on the seat bucket frame, the seat includes a seat cushion, a bottom of the seat cushion includes a seat cushion fixing column, and the seat cushion fixing column is arranged in the seat cushion mounting bracket and passes through the rubber cushion.

In some embodiments, a first distance is formed between a center of gravity of the battery pack and a front end of the electric all-terrain vehicle, and a range of the first distance is one-third to one-half of a length of the electric all-terrain vehicle.

In some embodiments, the battery pack is provided with a plurality of heating patches, and the heating patches are located on a side wall and a top of the battery pack.

In some embodiments, the electric all-terrain vehicle further includes a controller, and the controller is mounted on the vehicle frame and located at a first side of the battery pack.

In some embodiments, the cargo compartment is turnably connected with the vehicle frame, and a ratio of a distance between a turning center of the cargo compartment and a rear end of the cargo compartment to a length of the cargo compartment is from 0.25 to 0.45.

In some embodiments, the cargo compartment includes a cargo compartment frame and a bottom plate, the bottom plate is arranged on the cargo compartment frame, a lifting bracket is arranged on the cargo compartment frame, and at least one inner hook is arranged on a surface of the bottom plate away from the cargo compartment frame.

In some embodiments, the vehicle frame is provided with an automatic lifting structure, and a first end of the automatic lifting structure is arranged on the vehicle frame, and a second end of the automatic lifting structure is arranged on the lifting bracket.

In some embodiments, the motor includes a motor body an upper connecting plate and a rear connecting plate. The upper connecting plate is arranged on the motor body. The rear connecting plate is arranged on the motor body and opposite to the upper connecting plate.

In some embodiments, the rear connecting plate is connected with the gearbox.

In some embodiments, an output shaft of the motor extends into the gearbox.

In some embodiments, the electric all-terrain vehicle further includes a casing, a front casing, a first limiting plate and an elastic bracket. The casing is arranged on the vehicle frame. The front casing is arranged on the vehicle frame and located at a front end of the casing, and the front casing is connected with the casing through a rotating assembly. The first limiting plate is connected with the vehicle frame and includes a groove. A first end of the elastic bracket is arranged on the front casing, and a second end of the elastic bracket is matched with the groove.

The disclosure further provides a control method of vehicle braking. The vehicle is provided with a motor. The control method of vehicle braking includes:

monitoring a state of the vehicle;

detecting a rotating speed of the motor after the vehicle becomes free;

determining whether the rotating speed of the motor is greater than a safe rotating speed;

determining whether a rotating direction of the motor matches a state of a gear position of the vehicle when the rotating speed of the motor is greater than the safe rotating speed;

the vehicle entering a slope slowing mode when the rotating direction of the motor matches the state of the gear position of the vehicle;

the vehicle entering a slope holding mode when the rotating direction of the motor does not match the state of the gear position of the vehicle;

The disclosure further provides a control method of vehicle braking. The vehicle is provided with an accelerating device. The control method of vehicle braking includes:

monitoring a state of the accelerating device;

obtaining a first time when the accelerating device changes from a first opening degree to a free state;

determining whether the first time is greater than a first threshold;

the vehicle entering a coasting feedback braking mode when the first time is greater than the first threshold;

the vehicle entering an emergency braking mode when the first time is less than the first threshold.

The disclosure further provides a control method of vehicle braking. The vehicle is provided with an accelerating device, a braking device and an execution module. The execution module contains with a motor that drives the vehicle. The control method of vehicle braking includes:

monitoring a state of the vehicle;

detecting a rotating speed of the motor when the accelerating device changes from a certain opening degree to a free state;

determining whether the rotating speed of the motor is greater than a first rotating speed;

detecting whether the braking device is in a free state when the rotating speed of the motor is greater than the first rotating speed;

the vehicle entering a coasting feedback braking mode when the braking device is in a free state;

the vehicle entering a normal feedback braking mode when the braking device has a certain opening degree.

In summary, the disclosure provides the electric all-terrain vehicle and the control method of vehicle braking. The motor and gearbox are please at the rear end of the vehicle frame, the cargo compartment are placed above the motor and gearbox, the battery pack and controller are placed under the seat, and the seat is located at the front end of the cargo compartment, so a space of the vehicle frame may be fully utilized, which is convenient for maintenance. Through using the battery pack as power, the electric all-terrain vehicle will not produce exhaust pollution, and a noise of the electric all-terrain vehicle will also be reduced. At the same time, the vehicle frame is provided with a simple structure and good versatility. The motor and the gearbox are arranged at the rear end of the vehicle frame. Since the rear end of the vehicle frame is provided with a larger space, it is beneficial to overhaul the motor and the gearbox, and the maintenance is simpler.

BRIEF DESCRIPTION OF THE DRAWINGS

FIG. 10 is a cross-sectional view of a heater chip of the disclosure.

FIG. 11 is a schematic view of a resistance heating wire of the disclosure.

FIG. 12 is a perspective view of an electric all-terrain vehicle without a car cushion of the disclosure.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

It should be noted that drawings provided in the embodiments are only illustrative of a basic idea of the disclosure. The drawings only show assemblies related to the disclosure instead of drawing according to the number, shape and size of the assemblies in actual implementation. In actual implementation, the type, quantity and ratio of each assembly may be changed at will, and a layout of the assemblies may also be more complicated.

Figure 1:
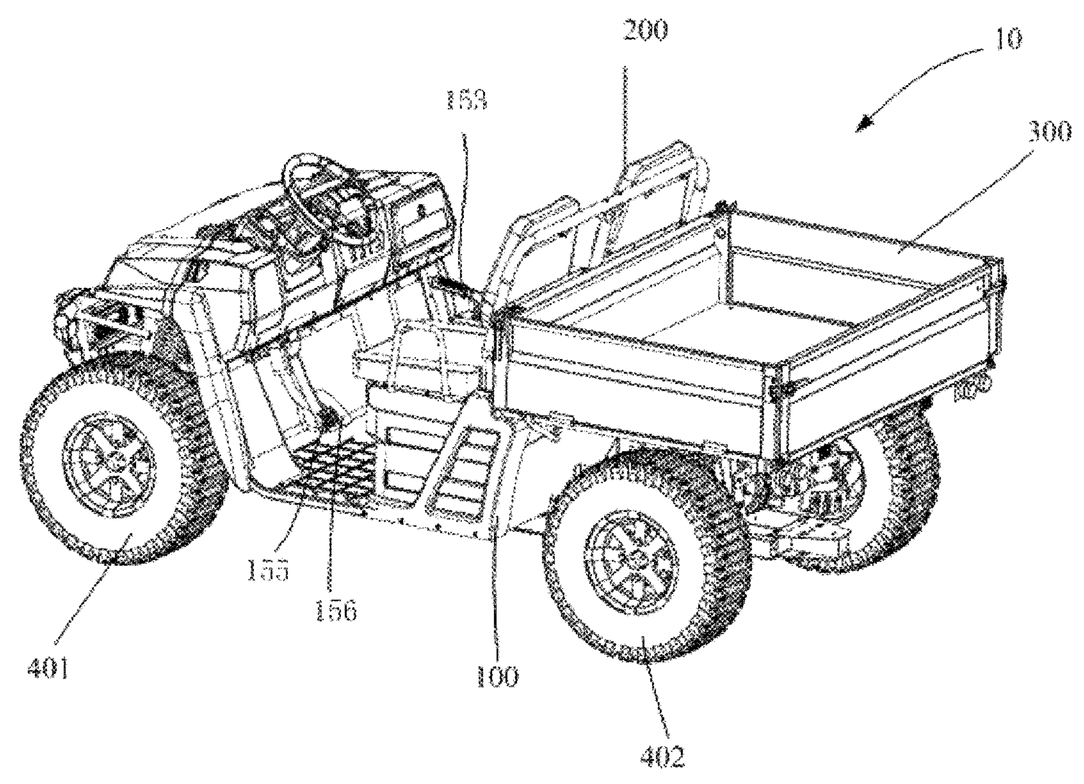
FIG. 1 is structural view of an electric all-terrain vehicle of the disclosure.

Please refer to FIG. 1. This embodiment provides an electric all-terrain vehicle 10, which uses a battery pack as power, so it will not pollute the environment.

Please refer to FIG. 1. In this embodiment, the electric all-terrain vehicle 10 may include a vehicle frame 100, a seat 200 and a cargo compartment 300. The vehicle frame 100 may be a symmetrical structure. The seat 200 is arranged on the vehicle frame 100, the cargo compartment 300 is arranged on the vehicle frame 100, and the cargo compartment 300 may be located behind the seat 200. Front wheels 401 are arranged in front of the vehicle frame 100, rear wheels 402 are arranged behind the vehicle frame 100, and the cargo compartment 300 is located above the rear wheels 402. The cargo compartment 300 may be used to carry heavy objects, for example, a weight from 250 kg to 500 kg. The rear wheel 402 may supply driving force for the electric all-terrain vehicle 10. The front wheels 401 and the rear wheels 402 may also be defined as walking wheels of the electric all-terrain vehicle 10. An accelerating pedal 156 and a braking pedal 155 are further arranged in front of the seat 200, and the accelerating pedal 156 and the braking pedal 155 are respectively used to control an acceleration and deceleration of the vehicle.

Figure 2:
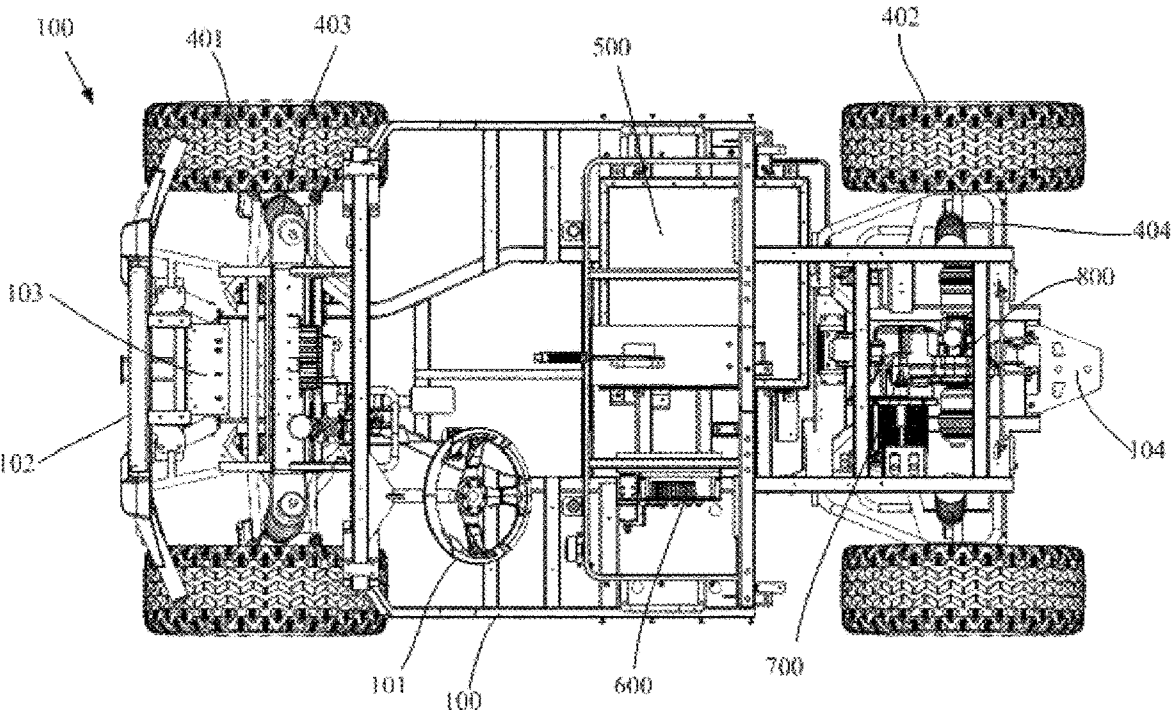
FIG. 2 is a top view of the electric all-terrain vehicle of the disclosure.

Please refer to FIG. 1 and FIG. 2. In this embodiment, a steering wheel 101 is provided on the vehicle frame 100, and the steering wheel 101 may be located in front of the seat 200. The steering wheel 101 is connected with a steering gearbox, the steering gearbox is driven by rotating the steering wheel 101, and the steering gearbox pulls the front wheels 401 to rotate, thereby changing a walking direction of the electric all-terrain vehicle 10. A front bumper 102 is further arranged in front of the vehicle frame 100, and the front bumper 102 may protect the electric all-terrain vehicle 10. At a rear end of the vehicle frame 100 is further provided with a towing connection 104, the towing connection 104 may pull heavy objects, such as a heavy object with a weight from 225 kg to 400 kg. A winch motor 103 is further arranged in front of the vehicle frame 100, and when the electric all-terrain vehicle 10 falls into a muddy area, a fixed object may be dragged so that the electric all-terrain vehicle 10 may get out from the muddy area.

Figure 3:
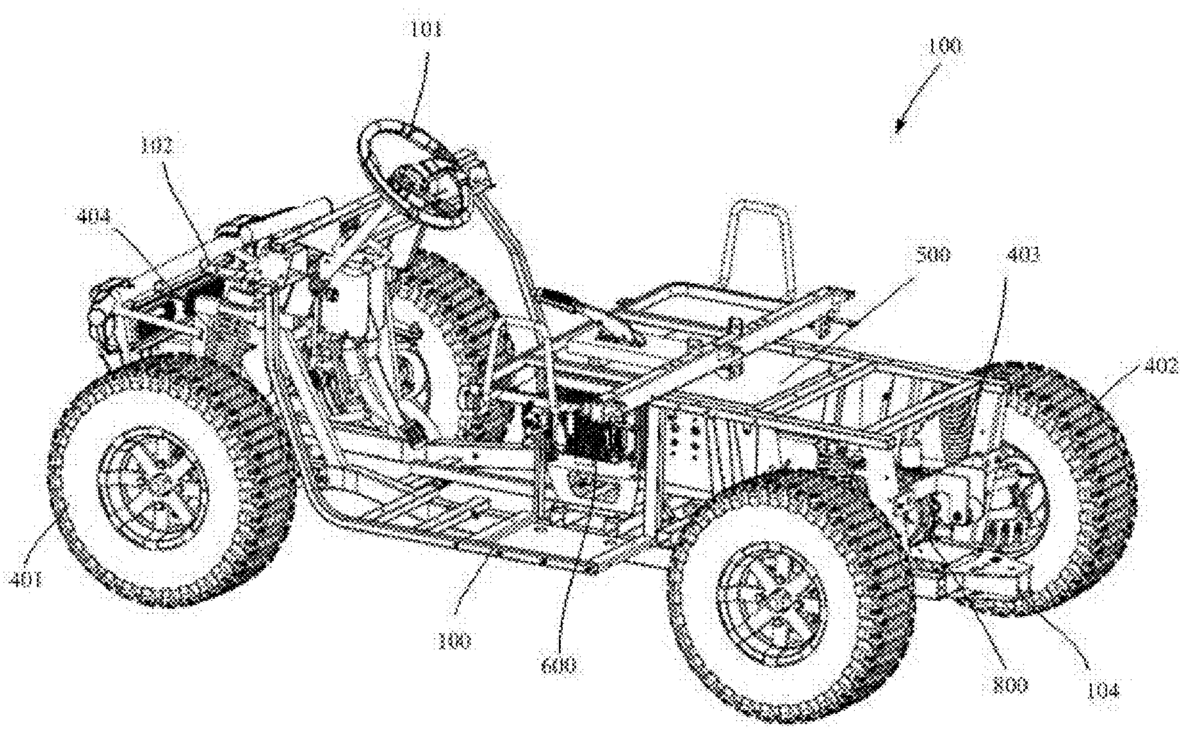
FIG. 3 is a perspective structural view of the electric all-terrain vehicle from another angle of the disclosure.

Please refer to FIG. 2 and FIG. 3. In this embodiment, two front shock absorbing springs 403 are arranged at a front end of the vehicle frame 100, and two rear shock absorbing springs 404 are arranged at the rear end of the vehicle frame 100. The front shock absorbing spring 403 and the rear shock absorbing spring 404 may play a role of buffering, so as to pass through bumpy road sections comfortably.

Please refer to FIG. 2 and FIG. 3. In this embodiment, a battery pack 500 is further arranged on the vehicle frame 100. A controller 600 is arranged on one side of the battery pack 500, the battery pack 500 may supply power for the controller 600, and the battery pack 500 and the controller 600 are located under the seat. A motor 700 and a gearbox 800 are further arranged at the rear end of the vehicle frame 100, and the battery pack 500 may supply power support for the motor 700. When the motor 700 rotates, the gearbox 800 may reduce a rotating speed of the motor and increase a torque of the motor 700, thereby driving the rear wheels 402 and the front wheels 401 to move forward or backward.

Figure 4:
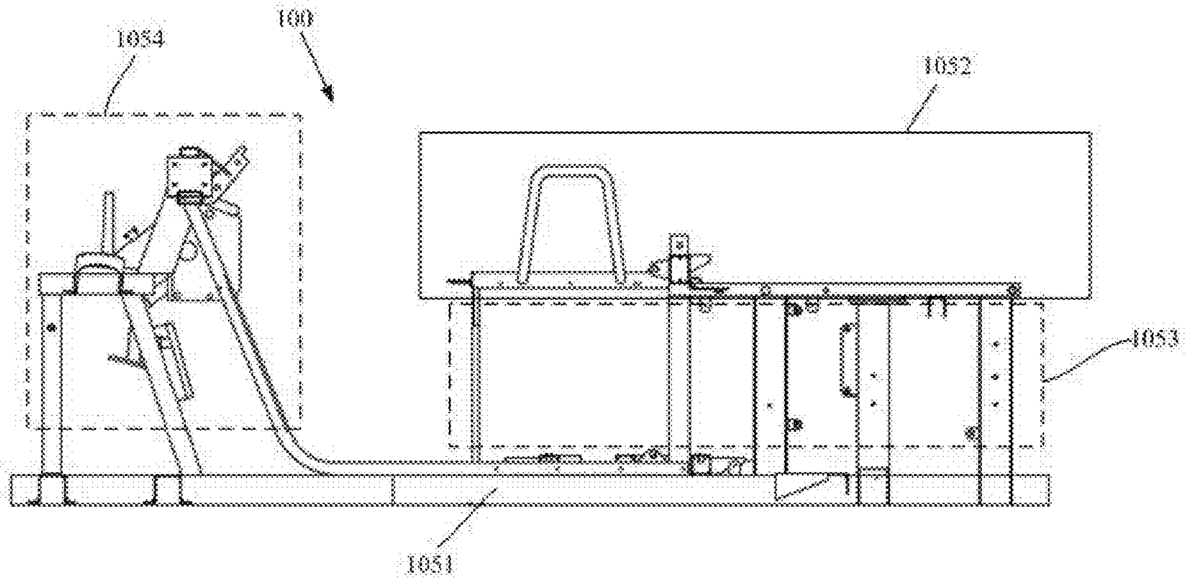
FIG. 4 is a simplified schematic view of the electric all-terrain vehicle of the disclosure.

Please refer to FIG. 4. In this embodiment, the vehicle frame 100 may be divided into a bottom assembly 1051 and an upper assembly 1052. The upper assembly 1052 is connected with and disposed on the bottom assembly 1051, and the upper assembly 1052 and the bottom assembly 1051 form an accommodation space 1053. In this embodiment, battery packs, motors and other components may be arranged in the accommodation space 1053, so as to make full use of a space of the vehicle frame 100, thus simplifying a structure of the vehicle frame 100. The upper assembly

1052 may be used to house components such as seats and a cargo compartment. The vehicle frame 100 may further include a front assembly 1054, the front assembly 1054 may be located in front of the upper assembly 1052, and a front casing may be arranged on the front assembly 1054. In this embodiment, the structure of the vehicle frame 100 is relatively simple. When other components need to be mounted on the vehicle frame 100, they may be fixed on the bottom assembly 1051 through a functional bracket, so the vehicle frame 100 has good versatility.

Figure 5:
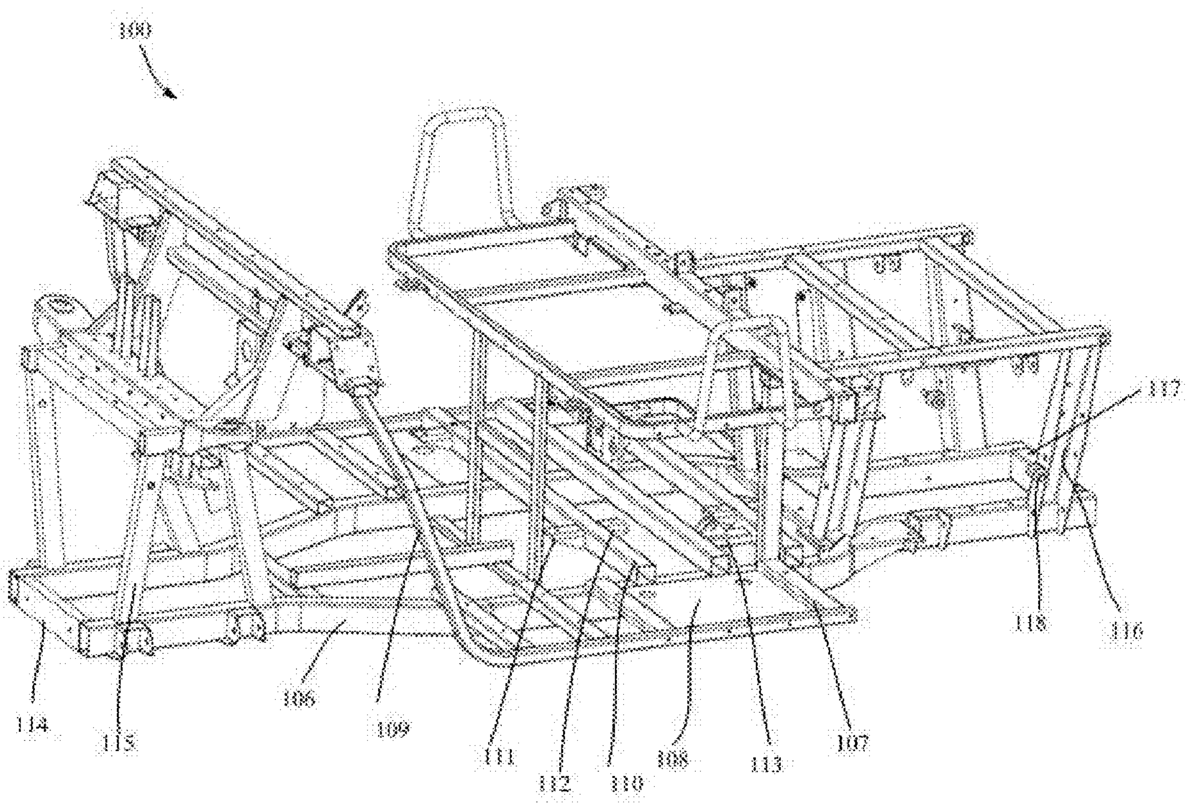
FIG. 5 is a schematic view of a bottom assembly of the disclosure.

Please refer to FIG. 4 and FIG. 5. FIG. 5 shows a basic structural view of the bottom assembly 1051, which may include two longitudinal beams 106 arranged in parallel, which means that the longitudinal beams 106 is provided on the bottom assembly 1051 and forms a basic structure of the bottom assembly 1051. The two longitudinal beams 106 arranged in parallel provide space for the bottom assembly 1051 to mount other assemblies. A plurality of side beams 107 are respectively arranged on the two longitudinal beams 106, and the side beams 107 on the two longitudinal beams 106 are arranged symmetrically. In this embodiment, four side beams 107 may be arranged on each longitudinal beam 106, and the four side beams 107 may be parallel to each other. The side beams 107 are perpendicular to the longitudinal beam 106, a first end of the side beams 107 is fixed on the longitudinal beams 106 by bolts, and a second end of the side beams 107 extends along a direction away from the longitudinal beam 106, thereby increasing a space of the bottom assembly 1051. The side beams 107 and the longitudinal beams 106 may be on a same horizontal plane. The side beams 107 may support an edge beam 109 to ensure a skeleton strength of the vehicle frame 100.

Please refer to FIG. 5. In this embodiment, two longitudinal beams 106 are respectively provided with a charger mounting plates 108, and each charger mounting plate 108 may be located between two adjacent side beams 107. The charger mounting plate 108 may be on the same horizontal plane as the longitudinal beam 106. The charger mounting plate 108 may be a rectangular structure, and some components such as a charger and a power unit may be arranged on the vehicle frame 100 through the charger mounting plate 108. In some embodiments, the charger mounting plate 108 may also prevent dust, branches, etc. from entering the battery pack from a bottom of the vehicle frame 100. In this embodiment, the bottom assembly 1051 may further include the edge beam 109, and the edge beam 109 may be bent, which means that the edge beam 109 includes a horizontal part and an inclined part. There may also be a fillet edge between the horizontal part and the inclined part. The horizontal portion may be parallel to the longitudinal beam 106. The horizontal part may be connected with the side beam 107, which means that the side beam 107 is arranged between the longitudinal beam 106 and the horizontal part, and the charger mounting plate 108 is also arranged between the longitudinal beam 106 and the horizontal part. The inclined part of the edge beam 109 is inclined to the front assembly and is connected with the front assembly. The skeleton strength of the vehicle frame 100 may be increased through an arrangement of the edge beam 109.

Please refer to FIG. 5. In this embodiment, a plurality of battery supporting beams 110 are arranged on the longitudinal beams 106, for example, three battery supporting beams 110 are arranged on the longitudinal beams 106. The battery supporting beams 110 are arranged on a top of the longitudinal beams 106, these battery supporting beams 110 are parallel to each other, and the battery supporting beams 110 and the longitudinal beams 106 are on the same level. The plurality of battery support beams 110 are mounted transversely on the two longitudinal beams 106. The battery supporting beam 110 may extend from an edge of the bottom assembly to between the longitudinal beams 106, which means that a width of the battery supporting beam 110 is greater than a width between two longitudinal beams 106. A first end of the battery supporting beam 110 is flush with a first end of one of the charger mounting plates 108 away from a first of the longitudinal beams 106, and then crosses the first of the longitudinal beams 106 so that a second end of the battery supporting beam 110 is flush with a second of the longitudinal beams 106. Through arranging a plurality of battery supporting beams 110 on the longitudinal beam 106, the battery pack may slide into the accommodation space from the battery supporting beams 110, thus facilitating a replacement of the battery pack. In this embodiment, a first battery pack bracket 111 and a second battery pack bracket 112 are further provided on the battery supporting beam 110, the first battery pack brackets 111 and the second battery pack brackets 112 are connected to the battery support beams 110. The first battery pack bracket 111 and the second battery pack bracket 112 may be arranged on the battery supporting beams 110 which are on two sides. The first battery pack bracket 111 and the second battery pack bracket 112 may fix different types of battery packs. Different types of battery packs may be battery packs with different capacities and sizes. The first battery pack bracket 111 and the second battery pack bracket 112 may be located on both sides of the battery supporting beam 110. The first battery pack bracket 111 and the second battery pack bracket 112 are, for example, arranged at both ends of the battery supporting beam 110. When the battery pack is arranged on the first battery pack bracket 111 or the second battery pack bracket 112, the battery pack may be fixed by bolts. A motor lower bracket 113 is further arranged on the battery supporting beam 110, and the motor lower bracket 113 is used for mounting the motor. For example, one end of the motor is connected with the vehicle frame 100 by screws.

Figure 6:
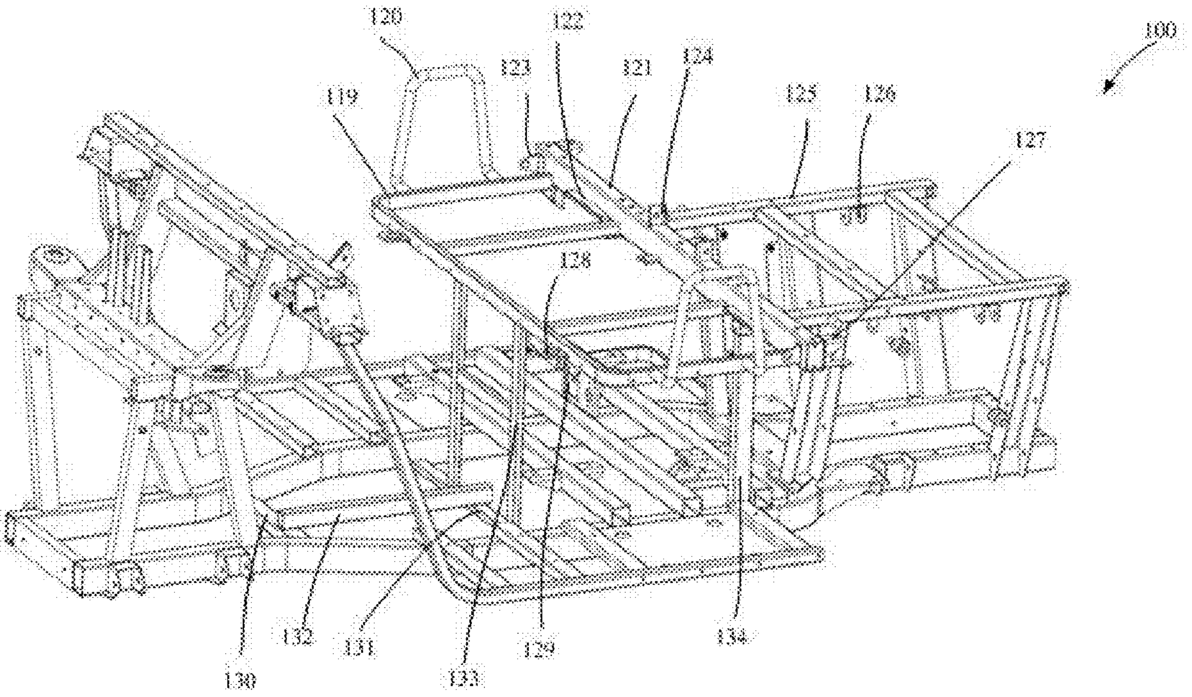
FIG. 6 is a schematic of a upper assembly of the disclosure.

Please refer to FIG. 5. In this embodiment, a front bumper bracket 114 is further arranged at front ends of the two longitudinal beams 106, and the front bumper bracket 114 may be parallel to the battery supporting beam 110. The front bumper bracket 114 is used to arrange the front bumper so as to protect the vehicle frame 100. The front end of the longitudinal beam 106 is further provided with a front swing arm 115, a first end of the front swing arm 115 may be fixed on the longitudinal beam 106 by a front swing arm bracket, and a second end of the front swing arm 115 may be connected with the front assembly, thereby supporting the front assembly. The front swing arm 115 may be located on a rear side of the front bumper bracket 114. A rear trailer hook bracket 117 is arranged at a tail or a rear end of the two longitudinal beams 106, a trailer connection may be arranged on the rear trailer hook bracket 117. A rear swing arm 116 is further arranged at a rear end of the longitudinal beam 106, a first end of the rear swing arm 116 is fixed on the longitudinal beam 106 by a rear swing arm bracket, and a second end of the rear swing arm 116 is connected with the upper assembly for supporting the upper assembly. The rear swing arm 116 may be arranged obliquely on the longitudinal beam 106. Inclination directions of these rear swing arms 116 are different, thereby forming a good strength supporting point. A gas spring bracket 118 is arranged on the rear swing arm 116, and the gas spring bracket 118 is used to fix one end of a gas spring. Please refer to FIG. 6. FIG. 6 shows a basic structural view of the upper assembly. The upper assembly may include a seat bucket frame 119 and the seat bucket frame 119 is provided on the upper assembly 1052. The seat bucket frame 119 is used to place the seat. A first end of the seat bucket frame 119 is fixed on a seat bucket rear beam 121, for example, is fixed on the seat bucket rear beam 121 by welding. The seat bucket rear beam 121 is connected to a rear end of the seat bucket frame 119 of the upper assembly 1052. A plane formed by the seat bucket frame 119 and the seat bucket rear beam 121 is parallel to the bottom assembly. The seat bucket rear beam 121 may also provide strength support for mounting the seat backrest bracket and mounting other accessories. At the same time, the seat bucket rear beam 121 may also be connected with a rear connection point of a roof frame to provide strength for the vehicle frame 100. A seat armrest 120 is further arranged at both ends of the seat bucket frame 119. The seat armrest 120 is, for example, welded to the seat bucket frame 119.

Please refer to FIG. 6. In this embodiment, a seat fixing bracket 122 is also arranged on the seat bucket rear beam 121, for example, two seat fixing brackets 122 are arranged on the seat rear beam 121, so two seat fixing brackets 122 may be included in this embodiment. The seat fixing bracket 122 is located in the seat bucket frame 119, and a seat cushion mounting bracket 128 is further arranged at a front end of the seat fixing bracket 122. The seat cushion mounting bracket 128 is located on the seat bucket frame 119, and a center of the seat cushion mounting bracket 128 and a center of the seat fixing bracket 122 are located on a same straight line. When a rear limiting bracket of a seat cushion is clipped on the seat fixing bracket 122, and a front limiting bracket of the seat cushion is fixed on the seat cushion mounting bracket 128 by bolts, the seat cushion may be fixed on the seat bucket frame 119.

Please refer to FIG. 6. In this embodiment, seat belt buckle brackets 123 are arranged at both ends of the seat bucket rear beam 121, and two seat belt locking brackets 124 are arranged at a middle of the seat bucket rear beam 121. The seat belt buckle bracket 123 is located on a contact surface between the seat bucket rear beam 121 and the seat bucket frame 119. The seat belt locking bracket 124 is located on a top of the seat bucket rear beam 121. The seat belt buckle bracket 123 corresponds to the seat belt locking bracket 124 one by one. One end of a seat belt may be fixed on the seat belt buckle bracket 123, and a seat belt buckle is fixed on the seat belt locking bracket 124 by screws. Therefore, when a user sits on the seat cushion, a safety of the user may be improved with the seat belt. A structure of the seat belt buckle bracket 123 and the seat belt locking bracket 124 is basically the same. Both the seat belt buckle bracket 123 and the seat belt locking bracket 124 may be an ear structure with through holes.

Please refer to FIG. 6. In this embodiment, seat backrest brackets 127 are further arranged at both ends of the seat bucket rear beam 121, and the seat backrest brackets 127 are arranged opposite to the seat bucket frame 119. The seat backrest bracket 127 is used to mount the seat back, thereby improving a stability of the seat back. A cargo compartment mounting bracket 125 is further arranged behind the seat bucket rear beam 121, and the cargo compartment mounting bracket 125 may be welded on the seat bucket rear beam 121. The cargo compartment mounting bracket 125 is used to connect the cargo compartment and the vehicle frame. In this embodiment, the cargo compartment may be mounted on the vehicle frame 100 through pin shafts, gaskets and cotter pins. The cargo compartment mounting bracket 125 is, for example, in a rectangular structure. The cargo compartment mounting bracket 125 is fixed on the longitudinal member 106 through, for example, a plurality of rear swing arms 116. A rear shock absorber upper bracket 126 is further arranged on the cargo compartment mounting bracket 125, and the rear shock absorber upper bracket 126 may be arranged on a horizontal beam of the cargo compartment mounting bracket 125, for example. The rear shock absorber upper bracket 126 may be arranged in a direction facing the longitudinal beam 106. One end of a rear shock absorber may be fixed by the rear shock absorber upper bracket 126.

Please refer to FIG. 5 and FIG. 6. In this embodiment, a first connecting beam 130 and a second connecting beam 131 are further arranged between the two longitudinal beams 106. The first connecting beam 130 and the second connecting beam 131 are connected to and extending transversely between the two longitudinal beams 106 of the bottom assembly and the first connecting beam 130 is parallel to the second connecting beam 131. The first connecting beam 130 is further parallel to the battery supporting beam 110. The first connecting beam 130 is further connected with the second connecting beam 131 through a connecting arm 132, and a center of the connecting arm 132 may be located on a center of the bottom assembly. The connecting arm 132 may increase a stability of the first connecting beam 130 and the second connecting beam 131. A first supporting beam 133 is arranged on the second connecting beam 131. Upper ends of the first supporting beam 133 are connected to support the seat bucket frame 119, lower ends of the first supporting beam 133 are connected to the connecting beam 131, which means that the first supporting beam 133 is vertically fixed on a bracket between the second connecting beam 131 and the seat bucket frame 119, thus realizing a function of supporting the seat bucket frame 119. Two second supporting beams 134 are arranged on a rear side of the first supporting beam 133, and the two second supporting beams 134 may be located on the two longitudinal beams 106. A second supporting beam 134 is fixed between the longitudinal beam 106 and the seat bucket frame 119. The other second supporting beam 134 is arranged between the longitudinal beam 106 and the cargo compartment mounting bracket 125. A supporting effect on the seat bucket frame 119 and the cargo compartment mounting bracket 125 may also be strengthened by the two second supporting beams 134. A charging port bracket 129 is further arranged on the seat bucket frame 119, and the charging port bracket 129 may be an ear structure with a through hole through which a charging line may be connected to the battery pack to charge the battery pack.

Figure 7:
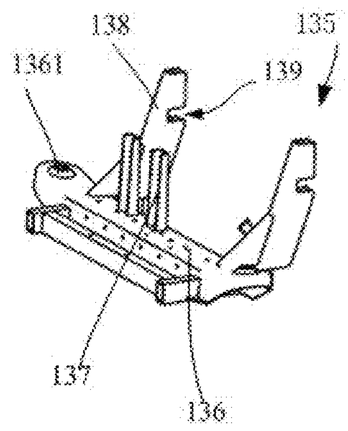
FIG. 7 is a structural view of a front shock absorber upper bracket of the disclosure.

Please refer to FIG. 4, FIG. 5 and FIG. 7. In this embodiment, the front assembly 1054 is located at a front of the bottom assembly 1051. The front assembly 1054 includes the front shock absorber bracket 135. The front shock absorber bracket 135 includes a shock absorbing beam 136 that may be fixed to the longitudinal beam 106 through the front swing arm 115. Both ends of the shock absorbing beam 136 include shock absorbing through holes 1361 through which a front shock absorber may be fixed on the shock absorbing beam 136. A plurality of converter brackets 137 are further arranged on the shock absorbing beam 136, for example, two converter brackets 137 are arranged on the shock absorbing beam 136. The converter bracket 137 is arranged vertically on the shock absorbing beam 136, for example. A converter may be fixed on the vehicle frame 100 through the converter bracket 137. The converter is, for example, a DC converter. Connecting pieces 138 are further arranged at both ends of the shock absorbing beam 136, and the two connecting pieces 138 are arranged in parallel. The connecting piece 138 further includes a notch 139, which is used to connect to a front cover bracket, so as to realize a connection between the front shock absorber bracket 135 and other components.

Figure 8:
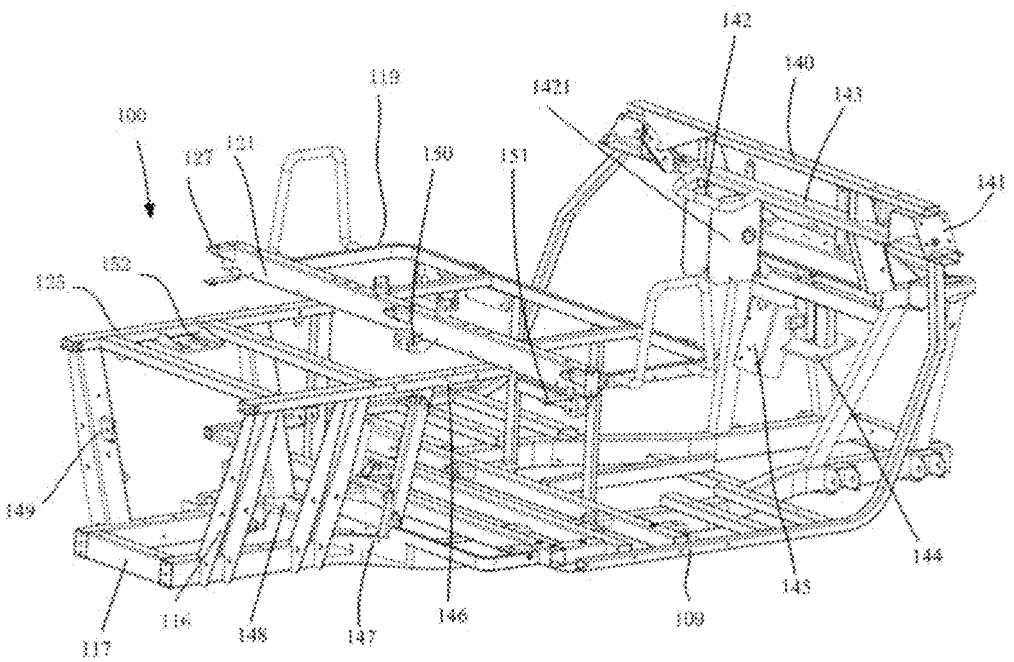
FIG. 8 is a second perspective structural view of the electric all-terrain vehicle from another angle of the disclosure.

Please refer to FIG. 7 and FIG. 8. In this embodiment, the vehicle frame 100 may further include a front machine cover first bracket 143 and a front machine cover second bracket 140. The front machine cover second bracket 140 is located on the front machine cover first bracket 143, and the two ends of the front machine cover first bracket 143 and the front machine cover second bracket 140 are connected by a roof frame front supporting bracket 141. The roof frame front supporting bracket 141 is further connected with the edge beam 109. A front connection point of a roof frame may be fixed on the roof frame front supporting bracket 141 by bolts. A front cover may be fixed on the front machine cover second bracket 140 by bolts. The connecting piece 138 is engaged with the front machine cover first bracket 143 through the notch 139, and a top of the connecting piece 138 abuts against the front machine cover second bracket 140. A braking pedal bracket 142 is further arranged on the front machine cover first bracket 143, a steering column bracket 1421 is arranged on the front machine cover first bracket 143 simultaneously, and the braking pedal bracket 142 is located on the steering column bracket 1421. A brake is fixed on the braking pedal bracket 142. A steering column may be fixed on the steering column bracket 1421. A steering machine bracket 144 and an accelerator bracket 145 are further arranged at the front end of the vehicle frame 100. A steering machine (steering gear) may be bolted to the steering machine bracket 144 and an accelerator pedal may be bolted to the accelerator bracket 145. The steering machine may further be connected with the steering wheel. When the steering wheel is rotated, the steering machine is pulled, thereby pulling the front wheels to rotate, thereby realizing a steering function. When the accelerator pedal is depressed, a power of the electric all-terrain vehicle 10 may be increased.

Please refer to FIG. 8. In this embodiment, a lock tongue 146 is further arranged on the cargo compartment mounting bracket 125, and the lock tongue 146 may be located on both sides of the cargo compartment mounting bracket 125. When the cargo compartment is provided with a flip handle, the lock tongue 146 may block a lock hook of the flip handle, thereby fixing the cargo compartment on the cargo compartment mounting bracket 125. Rear stabilizer bar brackets 147 are respectively arranged on the two longitudinal beams 106, and the rear stabilizer bar brackets 147 may fix the rear stabilizer bar on the vehicle frame 100 through hoops and bolts. When the rear wheel is mounted on the vehicle frame 100, some functional components may further be arranged on the rear stabilizer bar bracket 147. A gearbox front bracket 148 is further arranged on the longitudinal beam 106, and a gearbox rear bracket 149 is further arranged on the rear swing arm 116. The gearbox rear bracket 149 is used for mounting a buffer bracket of gearbox. The gearbox may be arranged between the gearbox rear bracket 149 and the gearbox front bracket 148. The gearbox may reduce the rotating speed of the motor and increase the torque of the motor. The gearbox may further be connected with the rear wheels to drive the rear wheels to rotate.

Please refer to FIG. 8. In this embodiment, a parking cable bracket 150 is further arranged on the seat bucket rear beam 121. The parking cable bracket 150 is, for example, arranged on a side of the seat bucket rear beam 121 close to the cargo compartment mounting bracket 125, and the parking cable bracket 150 is used for fixing a parking cable and mounting a parking braking light switch. Side guard brackets 151 are further arranged at both ends of the seat bucket rear beam 121, and the side guard brackets 151 are further arranged on a side of the seat bucket rear beam 121 close to the cargo compartment mounting bracket 125. And the side guard bracket 151 may be located under the seat belt buckle bracket 123 as may be seen from FIG. 8, the edge beam 109 is provided with threaded holes. Threaded holes are also arranged on the seat bucket frame 119, and threaded holes are also arranged on the side guard bracket 151. Therefore, the threaded holes on a side guard may be aligned with the threaded holes on the edge beam 109, the seat bucket frame 119 and the side guard bracket 151, and the side guard is fixed between the edge beam 109 and the seat bucket frame 119 by screws. The side guard may be arranged at both ends of the battery pack to protect the battery pack.

Please refer to FIG. 2, FIG. 5, FIG. 6 and FIG. 9. In this embodiment, the battery pack 500 is located under the seat bucket frame 119, which means that the battery pack 500 is located under the seat 200. The battery pack 500 may include a battery body 501, and the battery body 501 may be a lithium battery, which has characteristics of long duration life, light weight, and strong adaptability too high and low temperatures. A plurality of heating patches 502 is arranged on an outside of the battery body 501, and the heating patches 502 are arranged on a side wall and a top of the battery body 501, for example. The heating patch 502 is arranged on the outside of the battery body 501, so it is easier for a replacement. In this embodiment, heating patches 502 of different shapes may further be designed, so that a heating effect of the heating patches 502 may be improved. The heating patch 502 may heat the battery body 501. A fixing part 503 is further arranged around the battery body 501. The fixing part 503 may correspond to the first battery pack bracket 111 or the second battery pack bracket 112, which means that a number of the first battery pack bracket 111 or the second battery pack bracket 112 is the same as a number of the fixing parts 503, and then the battery pack 500 is fixed on the battery supporting beam 110 by bolts. In this embodiment, the seat is located above the battery pack 500, which may enable a center of gravity of the electric all-terrain vehicle 10 to move forward, so that a load distribution of the walking wheels is more uniform, and a driving stability is better. In this embodiment, a length of the battery pack 500 is, for example, from 400 mm to 440 mm, a width of the battery pack 500 is, for example, from 450 mm to 470 mm, and an output power of the battery pack 500 is, for example, from 0 KW to 15 KW. Please refer to FIG. 10 and FIG. 11. In this embodiment, the heating patch 502 may include an insulation layer 504, and the insulation layer 504 is bonded to the battery body 501 through a heat-conducting silica gel 505. A resistance heating wire 506 is arranged in the insulation layer 504. The resistance heating wire 506 may be tiled in the insulation layer 504. The resistance heating wire 506 is arranged in the insulation layer 504 in a serpentine shape, for example, and extends to an outside of the insulation layer 504. In some embodiments, the resistance heating wire 506 may also be arranged in a ring shape, for example, in a circle ring shape. A thickness of the heating patch 502 is, for example, from 1 mm to 2 mm, such as 1.5 mm. When the resistance heating wire 506 is energized by an external power source, the resistance heating wire 506 may generate heat, and the heat is transferred to the battery body 501 through the heat-conducting silica gel 505, which means that the battery body 501 is heated by means of external heating, thereby increasing a temperature of the battery body 501.

Figure 9:
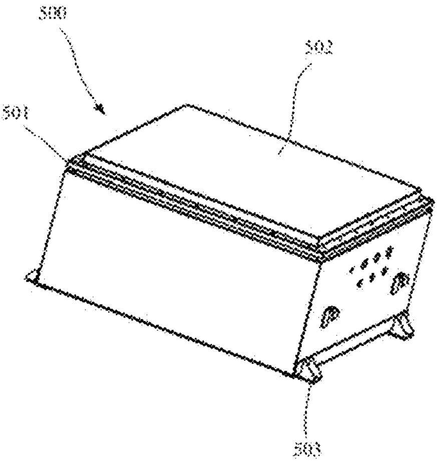
FIG. 9 is a structural view of a battery pack of the disclosure.

Please refer to FIG. 2, and FIG. 9 through FIG. 10. In this embodiment, when the electric all-terrain vehicle 10 is in a low-temperature environment (less than zero degrees), and when the electric all-terrain vehicle 10 is started, the battery pack management system detects that the temperature of the battery pack 500 is too low, the electric all-terrain vehicle 10 emits a low-temperature warning light, and the resistance heating wire 506 may be conductive through an external power source, so that the heat generated by the resistance heating wire 506 is transferred to the battery body 501. In this embodiment, a safe temperature control value is set for the heating patch 502. When a temperature of the heating patch 502 is higher than 55° C., a temperature control switch is cut off. When the temperature of the heating patch 502 is lower than 40° C., the temperature control switch is closed, so that the temperature of the heating patch 502 is within a safe range. In this embodiment, the heating patch 502 may quickly heat the battery body 501, so that the battery body 501 can work normally at a lower temperature and improve an output efficiency of the battery pack 500.

Figure 16:
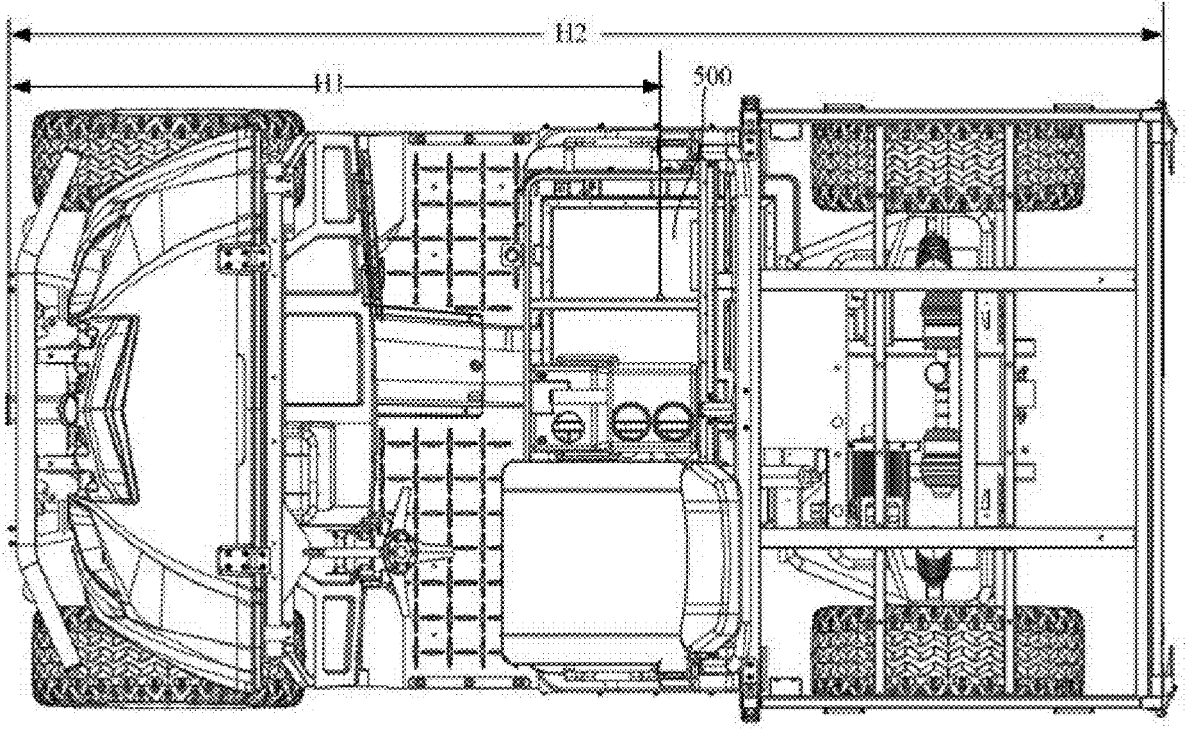
FIG. 16 is another top view of the electric all-terrain vehicle of the disclosure.

Please refer to FIG. 1 and FIG. 16. In this embodiment, a distance from a center of gravity of the battery pack 500 to a front end of the electric all-terrain vehicle 10 is defined as a first distance H1, and a range of the first distance H1 is, for example, from one-third of a vehicle length H2 to one-half of the vehicle length H2. The battery pack 500 is arranged near a front end of the vehicle. When the cargo compartment 300 carries heavy loads, the center of gravity of the vehicle will not move backwards, which ensures a stability of the vehicle. The vehicle length H2 is, for example, 2667 mm, and the first distance H1 is, for example, 1163 mm. In this embodiment, the battery pack 500 is arranged in a middle of the vehicle near the front end, so that the center of gravity of the battery pack 500 is located near the front end of the vehicle. Such arrangement may enable the vehicle to reach a balance, and prevent the center of gravity of the vehicle from moving backward after the cargo compartment 300 is loaded which may cause a phenomenon such as head tilting and overturning occurs.

Figure 13:
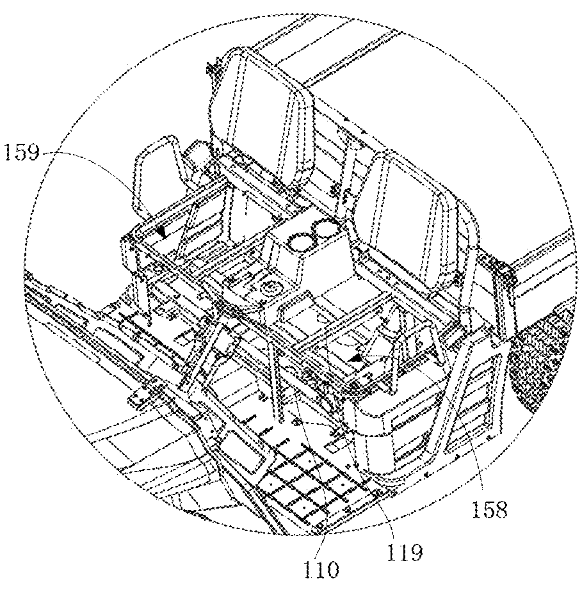
FIG. 13 is a partial structural view of FIG. 12 of the disclosure.
Figure 14:
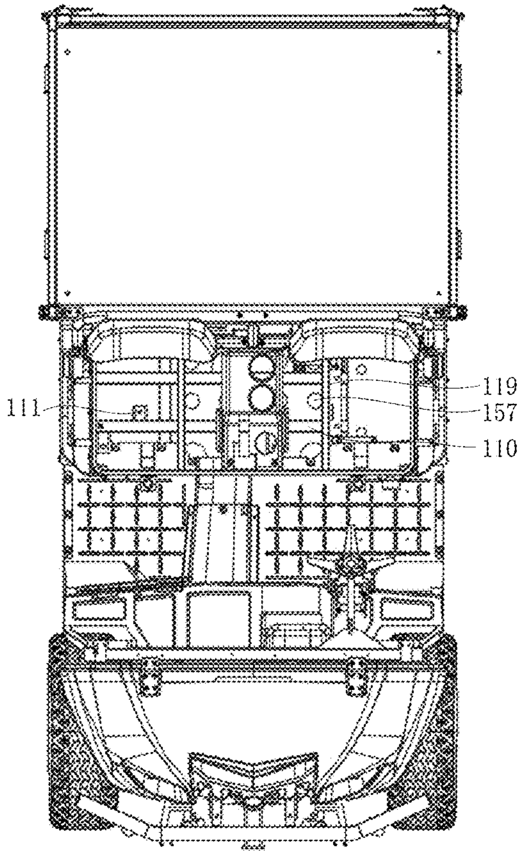
FIG. 14 is a top view of an electric all-terrain vehicle without a car cushion of the disclosure.
Figure 15:
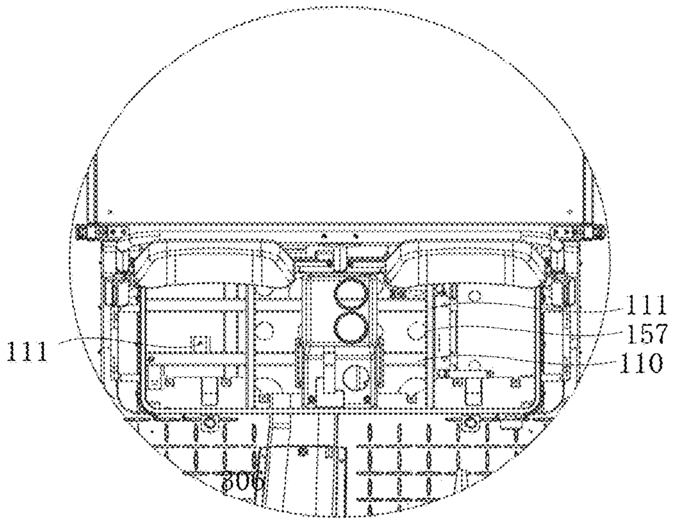
FIG. 15 is a partial structural view of FIG. 14 of the disclosure.

Please refer to FIG. 1 through FIG. 4 and FIG. 17. In this embodiment, the battery pack 500 and the controller 600 are arranged in the accommodation space 1053. The battery pack 500 and the controller 600 may be arranged under the seat 200. The battery pack 500 is arranged under an auxiliary seat, for example, and the controller 600 is arranged under a main seat, which means that the controller 600 is arranged at one side of the battery pack 500 Specifically, as shown in FIG. 12 and FIG. 13, the controller 600 is located in a first accommodation portion 158 under the main seat, and the battery pack 500 is located in the second accommodation portion 159 under the auxiliary seat. A bottom of the controller 600 is fixed on the battery pack supporting beam 110, and a top of the controller 600 is fixed in the seat bucket frame 119, which means that the top of the controller 600 is fixed on a seat bucket bracket 1191 and the controller 600 is vertically arranged between the bottom assembly 1051 and the upper assembly 1052. The two sides of the controller 600 may be in contact with air, so as to speed up a heat dissipation of the controller 600. The seat bucket bracket 1191 may be perpendicular to the rear seat bucket rear beam 121. The seat bucket bracket 1191 may further be used to support the seat. In this embodiment, two seat bucket brackets 1191 may be arranged in parallel in the seat bucket frame 119. Of course, more seat bucket brackets 1191 may also be arranged. In this embodiment, the battery pack 500 and the controller 600 are fixed under the seat 200, so that a rear of the vehicle has a larger accommodation space, which is convenient for maintenance and electrical connection of the vehicle.

Figure 17:
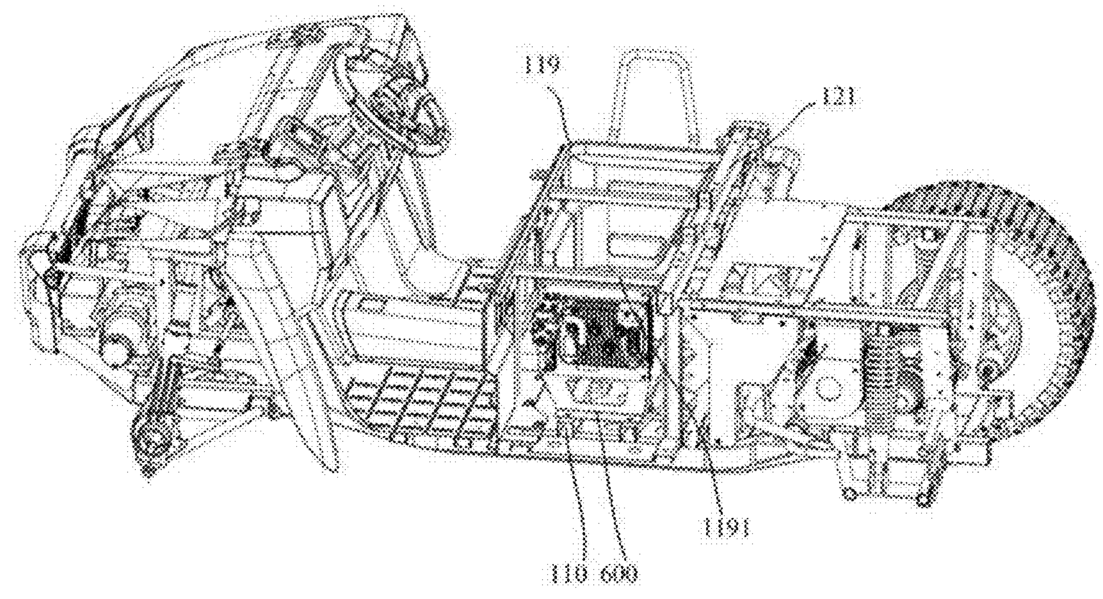
FIG. 17 is a schematic view of a position of a controller of the disclosure.
Figure 18:
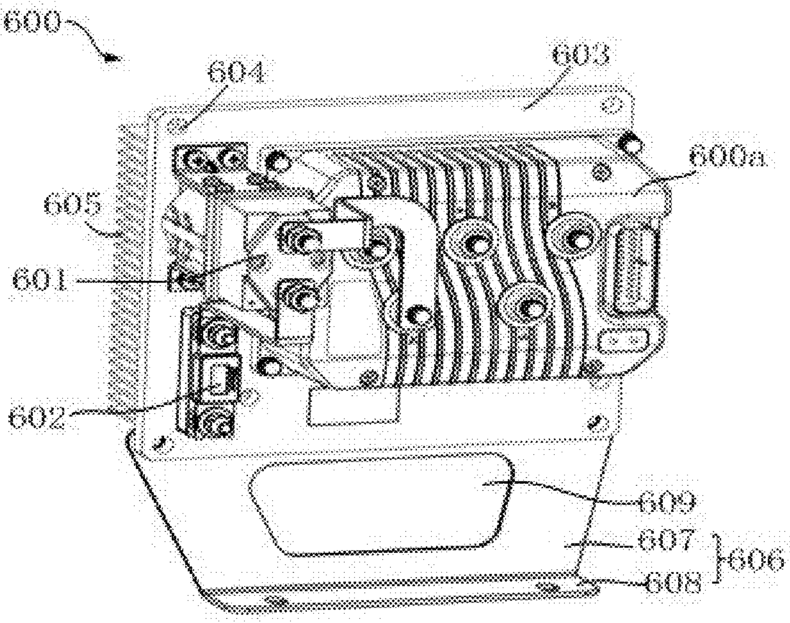
FIG. 18 is a structural view of the controller of the disclosure.

Please refer to FIG. 17 and FIG. 18. In this embodiment, the controller 600 may include a control panel 600*a*, a contactor 601, a fuse component 602, a heat dissipation plate 603 and a first connecting plate 606. The control panel 600*a*, the contactor 601 and the fuse component 602 are fixed on the heat dissipation plate 603. A top of the heat dissipation plate 603 may be fixed to the seat bucket bracket 1191 through a first through hole 604. A bottom of the heat dissipation plate 603 may be fixed to the first connecting plate 606 through the first through hole 604, and the first connecting plate 606 may be fixed to the battery supporting beam 110, so as to realize a fixing of the controller 600. The two sides of the heat dissipation plate 603 are not in contact with the vehicle frame, which increases a contact area between the heat dissipation plate 603 and the air, thereby increasing a cooling effect of the controller 600.

Please refer to FIG. 18. In this embodiment, the heat dissipation plate 603 is, for example, a rectangular structure, and one side of the heat dissipation plate 603 is a smooth plane for fixing the control panel 600*a*, the fuse component 602 and the contactor 601. The control panel 600*a* is completely attached to the heat dissipation plate 603. The other side of the heat dissipation plate 603 is provided with a plurality of groove surfaces 605, the groove surfaces 605 are perpendicular to a side surface of the heat dissipation plate 603, and dense grooves are formed on the other side surface of the heat dissipation plate 603 to increase the contact area with the air and strengthen a heat dissipation effect of the controller 600. The heat dissipation plate 603 is made of metal, such as aluminum alloy, which is strong and has good thermal conductivity. When the controller 600 is mounted, the side surface of the heat dissipation plate 603 on which the control panel 600*a* is fixed faces an outside of the accommodation space, and the side surface with dense grooves faces the accommodation space.

Please refer to FIG. 17 and FIG. 18. In this embodiment, the first connecting plate 606 may include a first connecting surface 607 and a second connecting surface 608. The first connecting surface 607 is used for connecting the heat dissipation plate 603 and the second connecting surface 608. A top of the first connecting surface 607 is fixed on a side of the first connecting plate 606 with the groove surface 605. In this embodiment, the first connecting surface 608 and the second connecting surface 608 are arranged at a certain angle. An angle range between the first connecting surface 607 and the second connecting surface 608 is, for example, from 75° to 89°, thus ensuring that a center of gravity of the controller 600 falls on the second connecting surface 608 when the controller 600 is fixed on the vehicle frame. A second through hole 609 is further arranged on the first connecting surface 607, and the second through hole 609 allows air to flow into the accommodation space, thereby increasing the heat dissipation effect of the battery pack 500 and the controller 600. In this embodiment, the second connecting surface 608 is, for example, a horizontal surface, and a through hole is arranged on the second connecting surface 608, so that the controller 600 may be fixed to the battery supporting beam 110 through the through hole.

Figure 19:
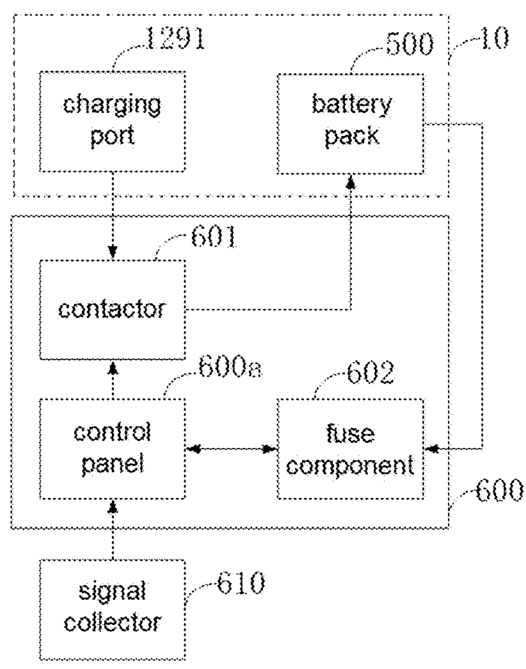
FIG. 19 is an electrical connection view of the controller of the disclosure.

Please refer to FIG. 17 through FIG. 19. In this embodiment, the control panel 600*a* is fixed on the heat dissipation plate 603 and is located on the smooth plane of the heat dissipation plate 603. The control panel 600*a* is electrically connected with the battery pack 500 through the fuse component 602, and the control panel 600*a* is further electrically connected with the contactor 601 and a signal collector 610. The control panel 600*a* is used to adjust an overall state of the electric all-terrain vehicle 10, wherein the overall state includes, for example, starting and shutting down, charging state, and driving state of the electric all-terrain vehicle 10. The signal collector 610 includes, for example, a signal collector 610 for braking, accelerator, and/or gear position, and a signal collector 610 for temperature, and/or state of charge of the battery pack 500, and the like. The contactor 601 is fixed on the heat dissipation plate 603 and is arranged on a same plane as the control panel 600*a*. The contactor 601 is provided with multiple ports, for example including a first port, a second port and a trigger port (not shown in the figure). The first port is electrically connected with a charging port 1291, the second port is electrically connected with the battery pack 500, and the trigger port is electrically connected with the signal collector 610. The contactor 601 is in a normally open state. When the charging port 1291 is connected with an external power source, the contactor 601 is normally open, and the external power source cannot charge the battery pack 500. When the trigger port of the signal collector 610 receives a charging trigger signal, the contactor 601 is closed, and the external power source charges the battery pack 500 through the charging port 1291. In this embodiment, the charging trigger signal is provided by the control panel 600*a*, and when the state of charge of the battery pack 500 and a temperature of a control device are within a set threshold, the control panel 600*a* sends the charging trigger signal. In other embodiments, a trigger condition of the charging trigger signal may be set according to actual requirements.

Please refer to FIG. 17 through FIG. 19. In this embodiment, the fuse component 602 is fixed on the heat dissipation plate 603, and the fuse component 602 is arranged on the same plane as the control panel 600*a* and on a same side as the contactor 601. One end of the fuse component 602 is electrically connected with the battery pack 500, and the other end of the fuse component 602 is electrically connected with the control panel 600*a*. When a current in a circuit is large or a leakage occurs, the fuse component 602 is automatically turned off, so that the battery pack 500 may not supply power to electrical components of a whole vehicle, and the vehicle stops working. When the temperature of the controller 600, the battery pack 500 or other electrical components collected by the signal collector 610 is greater than the set threshold, the control panel 600*a* sends a signal to turn off the fuse component 602, so that the battery pack 500 may not supply power to the electrical components of the whole vehicle, and the vehicle stops working.

Figure 20:
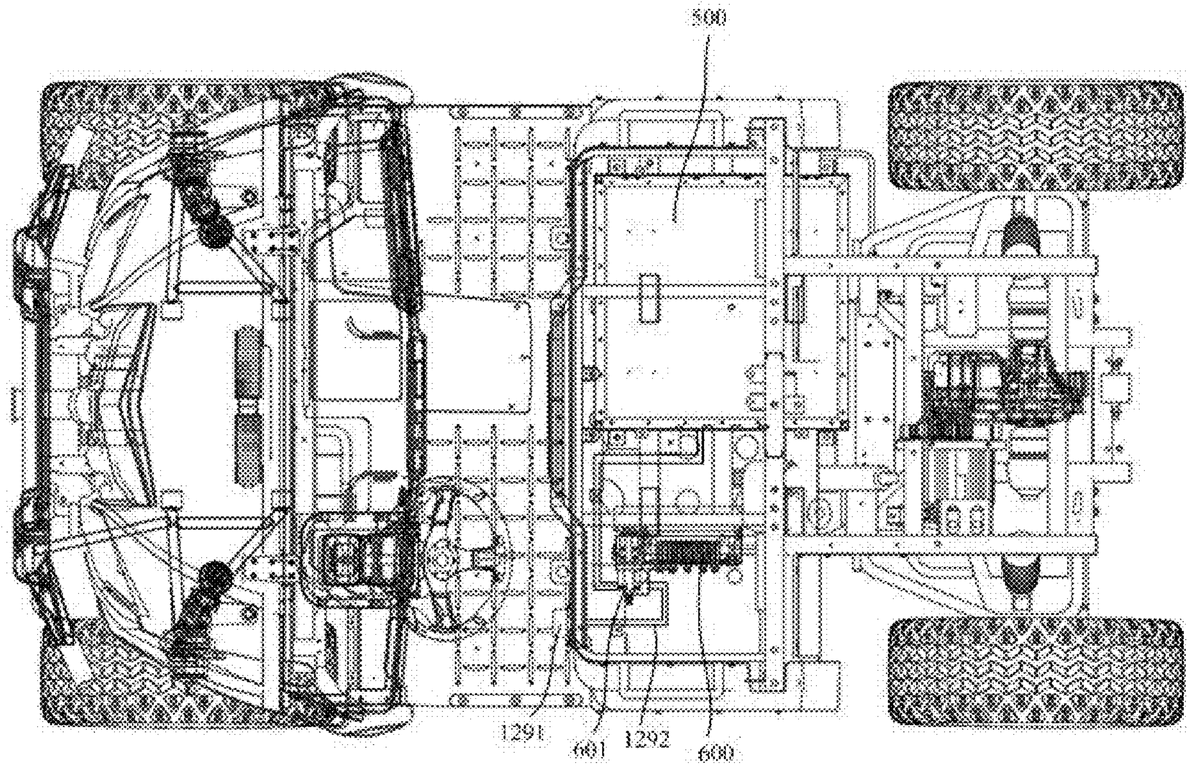
FIG. 20 is a charging connection view of the battery pack of the disclosure.

Please refer to FIG. 6, FIG. 19 through FIG. 20. In this embodiment, the charging port 1291 is located at a bottom of the seat cushion of the main seat, and is fixed on the charging port bracket 129. The charging port 1291 is electrically connected with the battery pack 500 through a charging cable 1292. Moreover, the contactor 601 of the controller 600 is electrically connected between the charging port 1291 and the battery pack 500. The charging port 1291 is first electrically connected with the contactor 601 through the charging cable 1292, and then electrically connected with the battery pack 500 through the charging cable 1292. When the battery pack 500 needs to be charged, the charging port 1291 is connected with the external power source, and when the contactor 601 is closed, the charging port 1291 charges the battery pack 500. The charging port 1291 is arranged under the main seat, and is close to the controller 600 and the battery pack 500, which simplifies a connection route and effectively prevents the charging port 1291 from colliding with a moving object when the electric all-terrain vehicle 10 is charging, so as to ensure a charging safety of the vehicle.

Please refer to FIG. 14 through FIG. 15, and FIG. 17 through FIG. 18. In an embodiment of the disclosure, on the bottom component 1051, and near a position of the battery pack 500 and the controller 600, a plurality of ventilation holes 157 are arranged, which means that bottoms of the battery pack 500 and the controller 600 are provided with ventilation holes 157. The ventilation holes 157 at the bottom of the battery pack 500, the second through hole 609 and the ventilation holes 157 at the bottom of the controller 600 form an air passage, so that the battery pack 500 and the controller 600 in the accommodation portion have a better heat dissipation effect. A radius of the ventilation hole 157 is smaller than a length and width of the battery pack 500 and the controller 600. A radius range of the ventilation hole 157 is, for example, from 50 mm to 100 mm. While not destroying a supporting function of the vehicle frame, an area of the ventilation hole 157 is increased, so that the vehicle has a better heat dissipation effect during a driving process.

Figure 21:
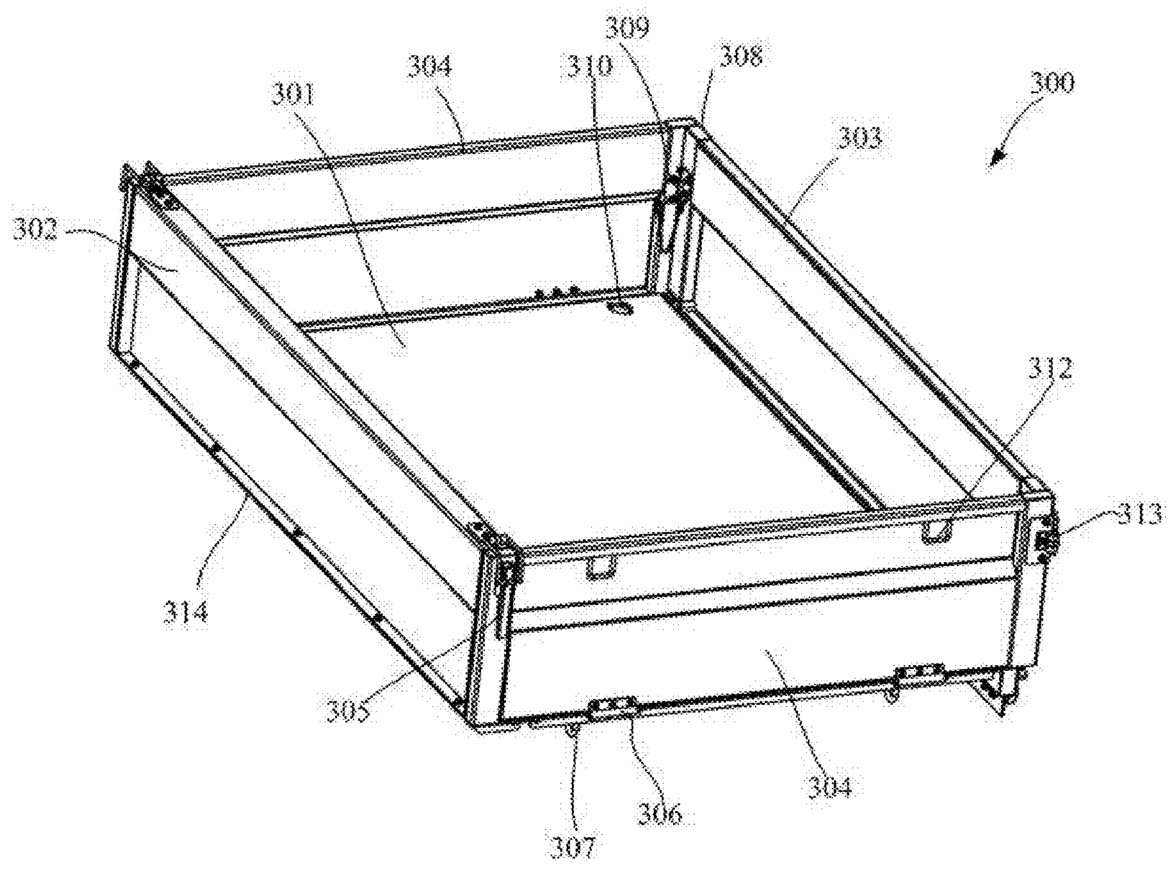
FIG. 21 is a structural view of a cargo compartment of the disclosure.

Please refer to FIG. 1 and FIG. 21. In this embodiment, the cargo compartment 300 is arranged on the vehicle frame 100 and located at a rear end of the seat 200. The cargo compartment 300 is used to carry goods. The cargo compartment 300 may be a symmetrical structure, such as a rectangular symmetrical structure. The cargo compartment 300 may include a bottom plate 301, a front fence 302 is arranged at a front end of the bottom plate 301, and a rear fence 303 is arranged at a rear end of the bottom plate 302. Side fences 304 are arranged on both sides of the bottom plate 301. The front fence 302 and the rear fence 303 have a same structure. The side fence 304 is arranged between the front fence 302 and the rear fence 303, thereby forming a housing area on the bottom plate 301, so that cargo may be carried. In this embodiment, the front fence 302 and the side fence 304 are connected through a side fence handle 305, which means that a handle part of the side fence handle 305 is arranged on the side fence 304, and a hook part is arranged on the front fence 302. When the handle part is pulled upward, the hook part is separated from the front fence 302 so that the side fence 304 may be opened. When the handle part is pulled downward, the hook part is fixed on the front fence 302, so that the side fence 304 may be fixed. The rear fence 303 and the side fence 304 may be connected through a rear fence handle 313, and a working principle of the rear fence handle 313 is basically the same as that of the side fence handle 305, which will not be repeated here. In this embodiment, a number of the rear fence handle 313 and the front fence handle 305 are the same, for example, two.

Figure 22:
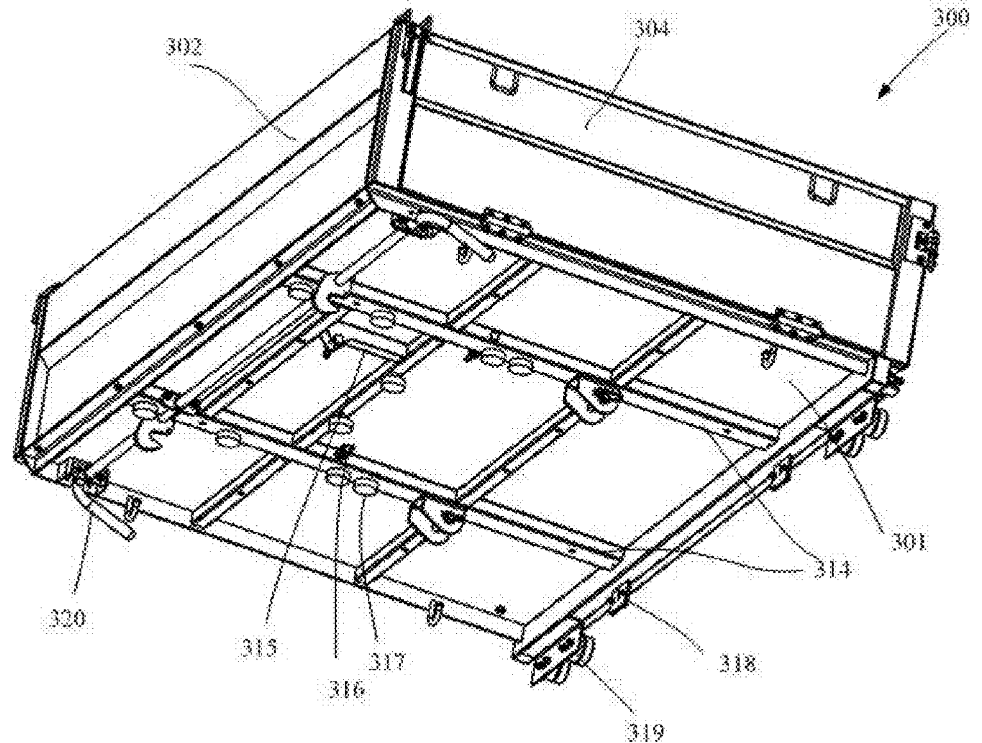
FIG. 22 is a bottom structure view of the cargo compartment of the disclosure.

Please refer to FIG. 1 and FIG. 21 through FIG. 22. In this embodiment, the bottom plate 301 is fixed on a cargo compartment frame 314, and the cargo compartment frame 314 is fixed on the vehicle frame 100. The front fence 302 is fixed to the bottom plate 301 by bolts, for example. The side fence 304 is fixed to the bottom plate 301 through a hinge 306, which means that a first end of the hinge 306 is fixed on the bottom plate 301, and a second end of the hinge 306 is fixed on the side fence 304, so that the side fence 304 may rotate around the hinge 306. A positioning block may further be arranged on the side fence 304, and when the side fence 304 is closed, the side fence 304 may be aligned to eliminate noise. The rear fence 303 may further be fixed on the cargo compartment frame 314 and the bottom plate 301 by pin shafts, which means that the rear fence 303 and the front fence 302 may be detachably fixed on the bottom plate 301, so it is beneficial to save transportation space and facilitate packaging and transportation. A cargo compartment hook 307 is further arranged on the cargo compartment frame 314, and the cargo compartment hook 307 may be located under the side fence 304. When the cargo is placed on the cargo compartment 300, a rope may be fixed on the cargo compartment hook 307, so that the cargo may be fixed. Of course, in some embodiments, the cargo compartment hook 307 may further be connected with the vehicle frame 100, so as to fix the cargo compartment 300 on the vehicle frame 100.

Please refer to FIG. 21. In this embodiment, a blocking cover 308 is further arranged at a contact area between the rear fence 303 and the side fence 304, which means that the blocking cover 308 is arranged between the rear fence 303 and the side fence 304. The blocking cover 308 is, for example, buckled on the rear fence 303 and the side fence 304, so that the rear fence 303 and the side fence 304 are in close contact. A limiting zipper 309 is further arranged on the rear fence 303, and the limit zipper 309 is located inside the cargo compartment 300. When the rear fence 303 and the side fence 304 are unfolded, the rear fence 303, the side fence 304 and the bottom plate 301 form a larger bottom plate through the limiting zipper 309, so that a larger volume of goods may be transported. A plurality of internal hooks 310 are further arranged in the bottom plate 301, and the internal hooks 310 may be used to fix the goods and prevent the goods from moving. A fence hook 312 is further arranged on the side fence 304, and when the side fence 304 is unfolded, goods may be fixed through the fence hook 312. For example, at least two fence hooks 312 are arranged on each side fence 304, for example, two or three or more fence hooks 312 are arranged. In this embodiment, a length of the cargo compartment 300 is, for example, from 800 mm to 2000 mm, a width of the cargo compartment 300 is, for example, from 800 mm to 1700 mm, and a height of the cargo compartment 300 is, for example, from 220 mm to 500 mm.

Please refer to FIG. 22. FIG. 22 is a schematic view of a bottom of the cargo compartment 300. The bottom plate 301 is arranged on the cargo compartment frame 314, and the cargo compartment frame 314 may be composed of criss-cross supporting frames. A lifting bracket 315 is arranged on the cargo compartment frame 314, and the lifting bracket 315 is used for connecting a lifting mechanism, so that an efficiency of turning over the cargo compartment 300 may be improved. A gas spring upper bracket 316 is arranged on the cargo compartment frame 314, for example, two gas spring upper brackets 316 are arranged on the cargo compartment frame 314, so that two gas springs may be arranged on the cargo compartment frame 314, and the gas spring may assist in turning the cargo compartment 300. In this embodiment, the gas spring upper bracket 316 is, for example, arranged along a length direction of the cargo compartment 300 and at 0.6 to 0.78 of the length of the cargo compartment 300, which means that a ratio of a distance between the gas spring upper bracket 316 and a rear end of the cargo compartment 300 to the length of the cargo compartment 300 may be from 0.6 to 0.78, thereby improving a working efficiency of the gas spring. A plurality of adjustable limiting blocks 317 are arranged on the cargo compartment frame 314, which means that the adjustable limiting blocks 317 are located between the vehicle frame 100 and the cargo compartment 300, which may play a role of load bearing and shock absorption. The adjustable limiting block 317 may further be adjusted up and down, which may make up a gap between the cargo compartment 300 and the vehicle frame 100. A reflective sign bracket 318 is further arranged at a tail of the cargo compartment frame 314, and the reflective sign bracket 318 is used for mounting a reflective sign, so that a safety of the electric all-terrain vehicle may be ensured. A tail light bracket 319 is further arranged at the tail of the cargo compartment frame 314, and the tail light bracket 319 is used for mounting a tail light. A handle assembly 320 is further arranged on a front part of the cargo compartment frame 314, and the handle assembly 320 is fixed on the cargo compartment frame 314 by bolts. The handle assembly 320 is used to flip the cargo compartment 300 and is easy to operate. In this embodiment, a ratio of a distance between the handle assembly 320 and the rear end of the cargo compartment 300 to the length of the cargo compartment is, for example, from 0.75 to 1, thereby facilitating a fixing of the cargo compartment 300 and a flipping operation.

Figure 23:
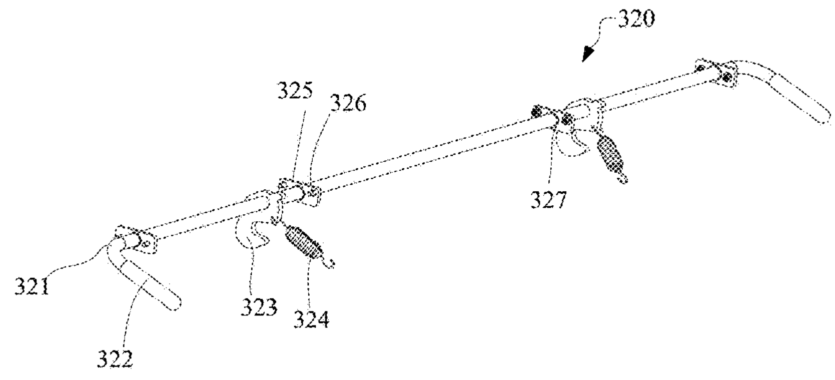
FIG. 23 is a structural view of a handle assembly of the disclosure.

Please refer to FIG. 22 and FIG. 23. FIG. 23 is a structural view of the handle assembly 320. The handle assembly 320 has a symmetrical structure, and the handle assembly 320 is an integral structure, which is easy to disassemble. The handle assembly 320 includes a handle body 321, and two ends of the handle body 321 are bent into a handle shape. Handle covers 322 are arranged at both ends of the handle body 321. A hanging hook 323 is arranged on a middle area of the handle body 321, and a fixing piece 325 is arranged beside the hanging hook 323, which means that the handle body 321 passes through the hanging hook 323 and the fixing piece 325 in turn. A combination bolt 326 is arranged on the fixing piece 325, and an area of the handle body 321 located between the fixing piece 325 and the hanging hook 323 may be clamped on the cargo compartment frame 314 and fixed by the combination bolt 326. Therefore, the handle body 321 may be fixed on the cargo compartment frame 314. An oil-free bushing 327 is further arranged at an area where the fixing piece 325 is in contact with the handle body 314, so that a frictional force between the handle body 321 and the fixing piece 325 may be improved. A return spring 324 is further arranged on the hanging hook 323, and an end of the return spring 324 is further arranged on the vehicle frame 100. The two ends of the handle body 321 are further provided with fixing pieces 325, which means that four fixing pieces 325 are arranged on the handle body 321. The fixing piece 325 is fixed on the cargo compartment frame 314 through the combination bolt 326, so the handle body 321 is fixed on the cargo compartment frame 314.

Figure 24:
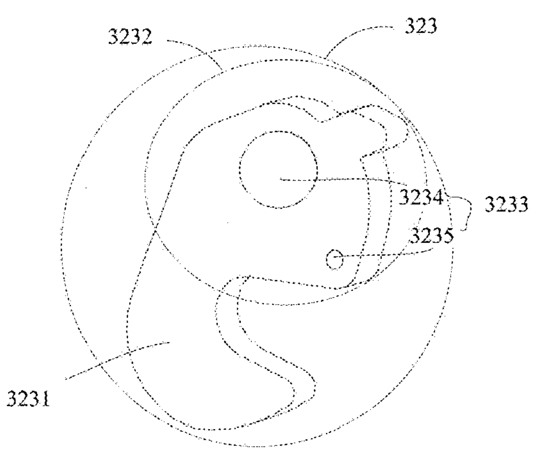
FIG. 24 is a schematic view of a hook structure of the disclosure.
Figure 25:
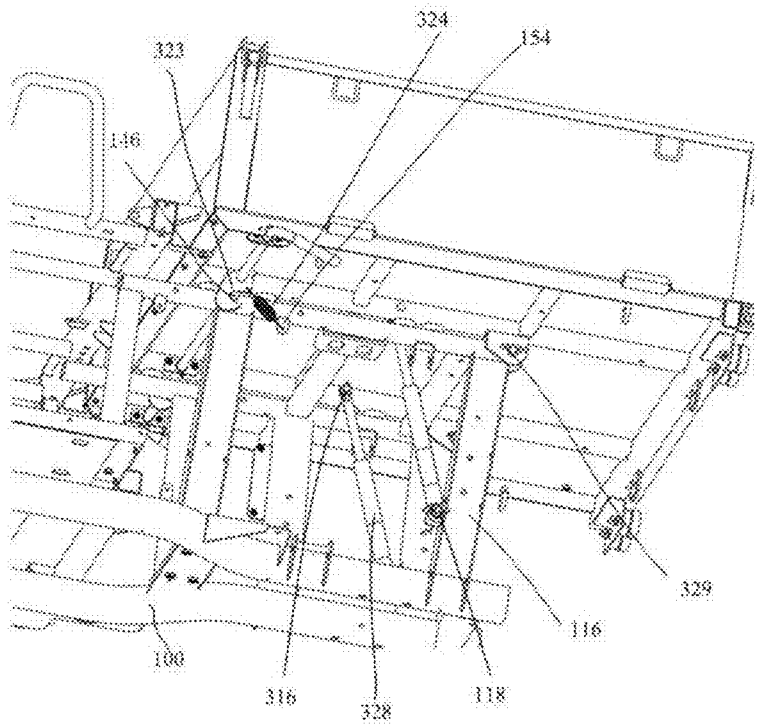
FIG. 25 is a connection view of the cargo compartment and a vehicle frame of the disclosure.

Please refer to FIG. 23 through FIG. 25. In this embodiment, an opening part 3231 of the hanging hook 323 hooks the lock tongue 146 on the vehicle frame 100, and an end of the return spring 324 is connected with a return spring bracket 154 on the vehicle frame 100. Specifically, as shown in FIG. 24, the hanging hook 323 includes the opening part 3231 and a hanging plate 3232, the hanging plate 3232 is provided with an opening hole 3233, and the opening hole 3233 is arranged on the hanging plate 3232. The opening part 3231 is arranged at a bottom of the hanging plate 3232 and connected with the bottom of the hanging plate 3232. The opening hole 3233 includes a first opening hole 3234 and a second opening hole 3235, and the second opening hole 3235 is arranged on one side of the first opening hole 3234. The first opening hole 3234 of the hanging hook 323 is used for the handle body 321 to pass through, the second opening hole 3235 is connected with the return spring 324, and the opening part 3231 engages the lock tongue 146. Therefore, the hanging hook 323 is used to engage the cargo compartment 300 with the vehicle frame 100. Two ends of the gas spring 328 are respectively connected with the gas spring bracket 118 and the gas spring upper bracket 316. A specification of the gas spring 328 is, for example, from 25 kg to 80 kg, so it is convenient to purchase and replace. The cargo compartment 300 is further fixed on the vehicle frame 100 through a flip bracket 329, which means that the cargo compartment 300 may be flipped around the flip bracket 329. The flip bracket 329 is, for example, arranged at a rear end of the cargo compartment frame 314. For example, a ratio of a distance between the flip bracket 329 and the rear end of the cargo compartment 300 to the length of the cargo compartment 300 may be from 0.25 to 0.45, so that a center of gravity of the cargo may be closer to a flipping axis, so that a flipping moment may be reduced. In this embodiment, a flipping center of the cargo compartment 300 may be arranged at a middle position of the cargo compartment 300, so that flipping the cargo compartment 300 saves more effort. When it is necessary to fix the cargo compartment 300 on the vehicle frame 100, the handle cover 322 may be held and the handle body 321 may be flipped, so that the hanging hook 323 hooks the lock tongue 146 on the vehicle frame 100, and the return spring 324 may assist the hanging hook 323 to hook the lock tongue 146 firmly. When the cargo compartment 30 needs to be turned over, the handle cover 322 is held and the handle body 321 is turned in an opposite direction, so that the hanging hooks 323 are separated from the lock tongue 146 and the cargo compartment 300 may be turned over. In this embodiment, the handle assembly 320 may enable the flipping moment of the cargo compartment to be smaller, and the operation is easier. Simultaneously, in order to turn over the cargo compartment 300 conveniently, two gas springs 328 are arranged at the bottom of the cargo compartment 300, so efforts may be saved. The handle assembly 320 has relatively high rigidity, and the hanging hook 323 and the lock tongue 146 may withstand a force of 5000N. The handle assembly 320 has no plastic deformation and has high reliability.

Figure 26:
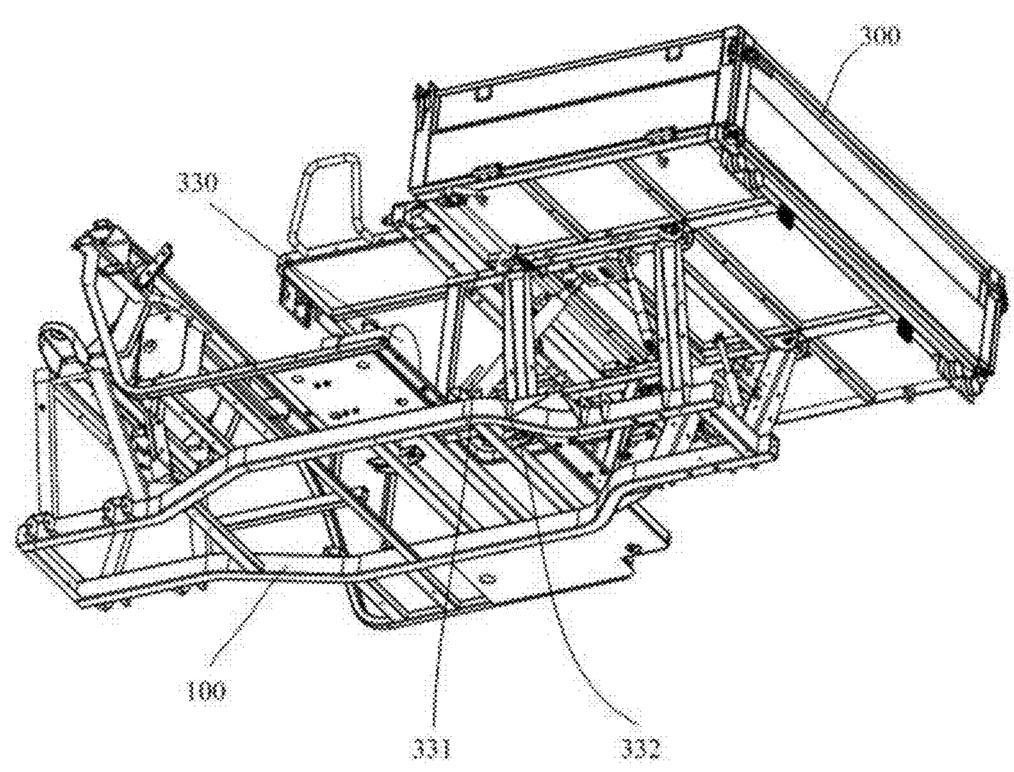
FIG. 26 is a schematic view of a hydraulic power unit of the disclosure.

Please refer to FIG. 22 and FIG. 26. In this embodiment, hydraulic power may also be used to flip the cargo compartment 300. A hydraulic power unit 330 is arranged on the vehicle frame 100, and the hydraulic power unit 330 is connected with a hydraulic cylinder 332 through a hydraulic oil pipe 331. A first end of the hydraulic cylinder 332 is fixed on the vehicle frame 100 through a pin assembly, and a second end of the hydraulic cylinder 332 is fixed on the lifting bracket 315 through the pin assembly. A mounting angle of an electric lifting of the hydraulic cylinder 332 is from 45° to 90°, for example, 60°. A lifting force may be from 3000N to 25000N. A motor voltage of the hydraulic power unit 330 may be 12V or 24V. When the hydraulic cylinder 332 works, a front end of the cargo compartment 300 may be lifted upwards, so as to realize a turnover of the cargo compartment 300. Of course, in some embodiments, the hydraulic power unit 330, the hydraulic oil pipe 331 and the hydraulic cylinder 332 may also be replaced by an electric lifting mechanism. A first end of the electric lifting mechanism is fixed on the vehicle frame 100 through a pin shaft, and a second end of the electric lifting mechanism is fixed on the lifting bracket 315 through a pin shaft assembly. A control switch of the electric lifting mechanism may be arranged on an instrument panel. A mounting angle of the electric lifting mechanism may also be from 45° to 90°, such as 70°. A voltage of the electric lifting mechanism may be 12V, 24V, 36V, 48V, 72V, 84V or 96V. A lifting force of the electric lifting mechanism may be 3000N to 25000N.

Please refer to FIG. 22 and FIG. 26. In this embodiment, the operator may turn over the cargo compartment 300 by flipping the handle assembly 320 or the hydraulic cylinder 332, so that a modification requirement of switching between a manual turning over cargo compartment 300 and a power turning over cargo compartment 300 may be realized. For example, when the cargo compartment 300 is turned over manually, the handle assembly 320, the gas spring 328 and the return spring 324 may be mounted on the cargo compartment frame 314. For example, when the cargo compartment 300 is turned over by power, a mounting of the handle assembly 320, the gas spring 328 and the return spring 324 may not be mounted on the cargo compartment frame 314.

Figure 27:
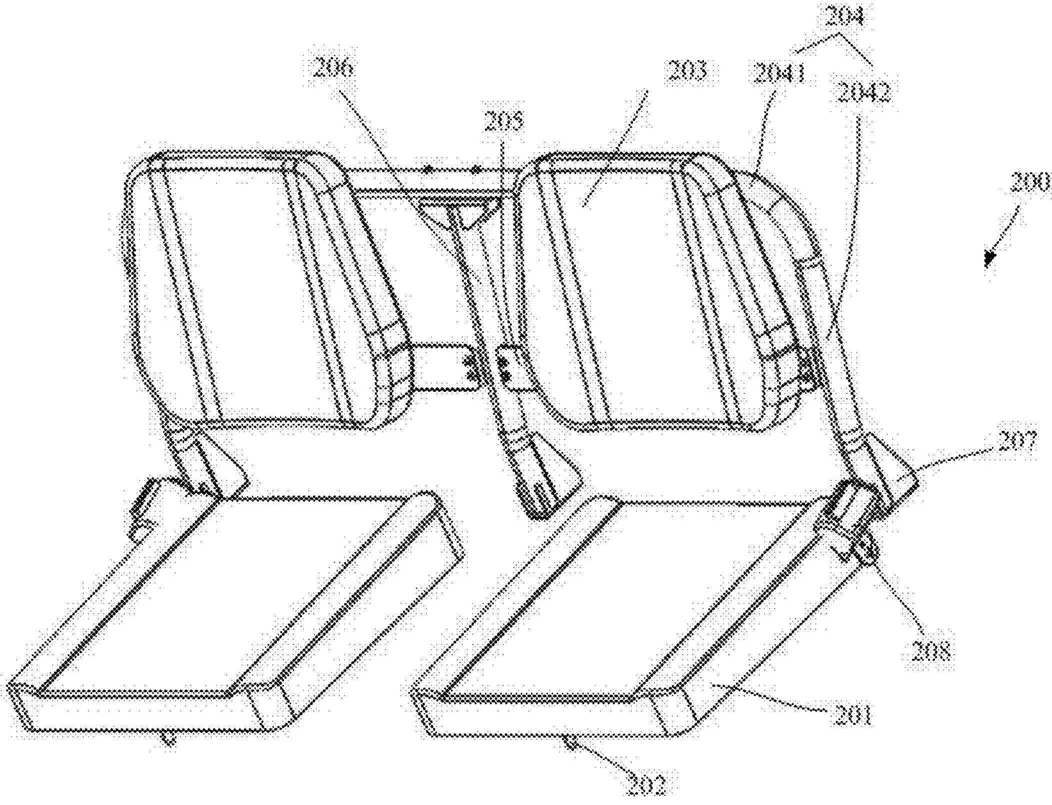
FIG. 27 is a structural view of a seat of the disclosure.

Please refer to FIG. 1 through FIG. 2 and FIG. 27. In this embodiment, the seat 200 may include two seat cushions 201, the battery pack 500 may be located under the left seat cushion 201, and the controller 600 may be located under the right seat cushion 201. At least one seat cushion fixing column 202 is further arranged on a back of the seat cushion 201, and the seat cushion fixing column 202 may be arranged at a front end of the seat cushion 201. The seat cushion fixing column 202 is, for example, perpendicular to a back surface of the seat cushion 201. A top of the seat cushion 201 is further provided with a backrest 203, the backrest 203 and the seat cushion 201 may be arranged at a certain angle, and the angle between the backrest 203 and the seat cushion 201 is, for example, from 100° to 110°. Therefore, when the operator sits on the seat cushion 201, the backrest 203 may improve the operator's comfort and reduce fatigue. Of course, in some embodiments, the seat 200 may further include three seat cushions 201 or more seat cushions 201. A length of the seat cushion 201 is, for example, from 400 mm to 450 mm, and a width of the seat cushion 201 is, for example, from 400 mm to 450 mm.

Please refer to FIG. 6 and FIG. 27. In this embodiment, a backrest bracket 204 is further arranged at a rear end of the seat cushion 201, and the backrest bracket 204 is used to support the backrest 203. The backrest bracket 204 may include a backrest cross bar 2041 and a backrest longitudinal bar 2042. The backrest longitudinal bar 2042 is arranged, for example, at both ends of the backrest cross bar 2041, and the backrest longitudinal bar 2042 and the backrest crossbar 2041 are connected by chamfering. The backrest 203 protrudes from the backrest longitudinal bar 2042, so the operator may be prevented from contacting the backrest cross bar 2041, which is beneficial to improve comfort. A backrest supporting frame 206 is further arranged on the backrest cross bar 2041, the backrest supporting frame 206 is for example arranged between two backrest longitudinal bars 2042, then the two backrests 203 may further be separated by the backrest supporting frame 206. Two ends of the backrest 203 are respectively fixed on the backrest supporting frame 206 and the backrest longitudinal rod 2042 through the connecting piece 205, thus realizing a fixing of the backrest 203. A backrest fixing bracket 207 is further arranged on a free end of backrest longitudinal bar 2042 and a free end of backrest supporting frame 206, the backrest fixing bracket 207 is located opposite to the seat backrest bracket 127, and backrest fixing bracket 207 is arranged on a side of the backrest cross bar 2042 away from the seat cushion 201. A bottom of the backrest fixing bracket 207 may be a plane, and a through hole is arranged in the plane. When a bolt is arranged in the through hole, the backrest fixing bracket 207 may be fixed on the seat backrest bracket 127, which means that the backrest bracket 204 is fixed on the seat bucket rear beam 121. Therefore, in this embodiment, the backrest bracket 204 may be disassembled conveniently, which is beneficial for replacing the backrest bracket 204. A seat belt structure 208 is further arranged at the rear end of the seat cushion 208, and the seat belt structure 208 may be mounted on the seat belt buckle bracket 123. When using the seat belt structure 208, the seat belt buckle may be fixed on the seat belt locking bracket 124, thereby improving a safety of the operator.

Figure 28:
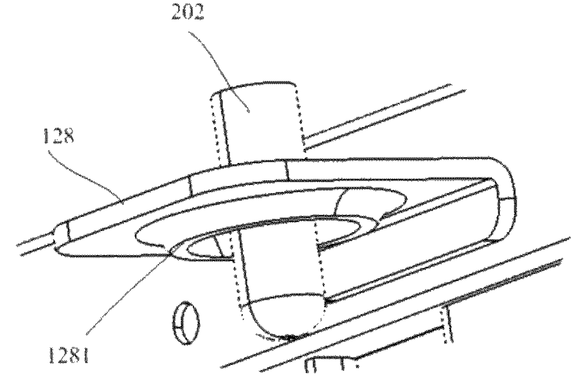
FIG. 28 is a mounting view of the seat of the disclosure.

Please refer to FIG. 6 and FIG. 28. In this embodiment, when the seat cushion 201 is fixed on the seat bucket frame 119, the rear end of the seat cushion 201 may be fixed on the seat fixing bracket 122. For example, the rear end of the seat cushion 201 is rotatably fixed on the seat fixing bracket 122. Then the seat cushion fixing column 202 is arranged in the seat cushion mounting bracket 128, and the rubber cushion 1281 is arranged in the seat cushion mounting bracket 128. When the seat cushion fixing column 202 passes through the rubber cushion 1281, the rubber cushion 1281 may lock the seat cushion fixing column 202, and may further play a role of shock absorption. When the seat cushion 201 needs to be opened, the front end of the seat cushion 201 may be lifted upwards, so that the seat cushion fixing column 202 is separated from the seat cushion mounting bracket 128. Therefore, it is convenient to disassemble the seat cushion 201, which is beneficial to maintenance of the battery pack 500 and the controller 600.

Figure 29:
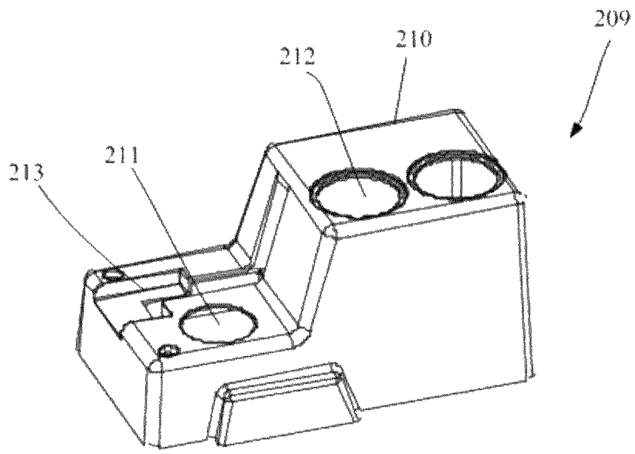
FIG. 29 is a structural view of a cup holder of the disclosure.

Please refer to FIG. 26 and FIG. 29. A cup holder 209 may further be arranged between the two seat cushions 201, and the cup holder 209 may include a first base 210, which may be in a stepped shape. The first base 210 is provided with a first cup hole 211 and a second cup hole 212, a height of the second cup hole 212 is greater than a height of the first cup hole 211. Therefore, water cups of different heights may be placed on the first base 210. The first cup hole 211 is arranged at a front end of the first base 210, and the second cup hole 212 is arranged at a rear end of the first base 210. A handbrake fixing area 213 is further arranged on one side of the first water cup hole 211, which means that a handbrake may be arranged in the handbrake fixing area 213. Of course, in some embodiments, a cover body may further be arranged on the first water cup hole 211, so as to seal the first water cup hole 211, which means to turn the first water cup hole 211 into a storage space.

Figure 30:
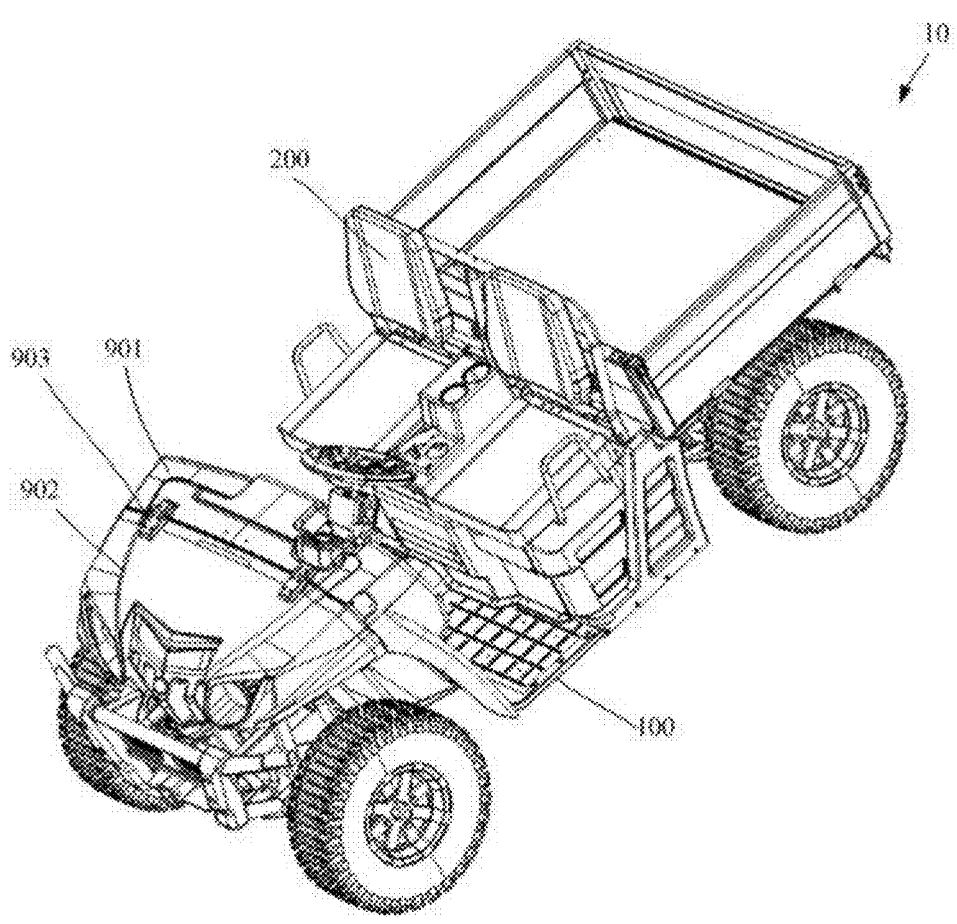
FIG. 30 is a third perspective view of the electric all-terrain vehicle of the disclosure.

Please refer to FIG. 4 and FIG. 30. In this embodiment, the electric all-terrain vehicle 10 may further include a casing 901 and a front casing 902. The casing 901 and the front casing 902 are arranged on the front assembly 1054, which means that the casing 901 and the front casing 902 are both arranged on the vehicle frame 100. The casing 901 is located at a front end of the seat 200, and the front casing 902 is located at a front end of the casing 901. The front casing 902 and the casing 901 are connected by a rotating assembly 903, so when the front casing 902 is opened, the front casing 902 may be turned over freely. The rotating assembly 903 is, for example, a pin shaft assembly.

Figure 31:
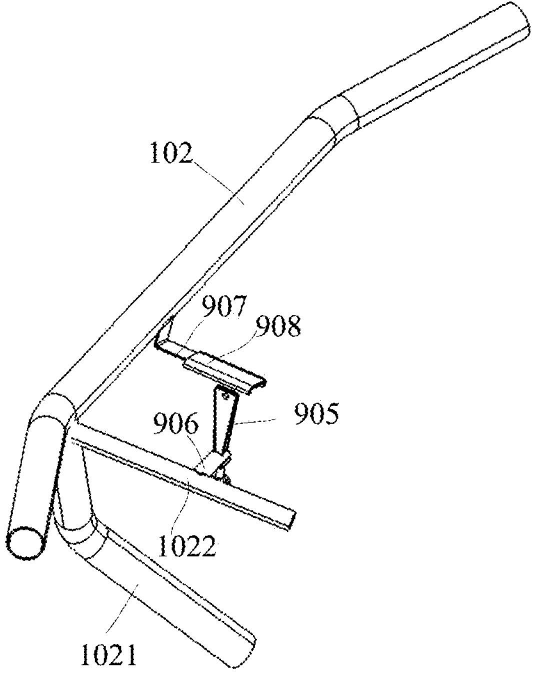
FIG. 31 is a position view of a rubber bracket and a second limiting plate of the disclosure.

Please refer to FIG. 30 and FIG. 31. In this embodiment, the front bumper 102 is further arranged in front of the front casing 902, and the front bumper 102 may be used to protect the front casing 902. The front bumper 102 is provided with a front bumper supporting beam 1021, and the front bumper supporting beam 1021 is used to support the front bumper 102, which means that a first end of the front bumper supporting beam 1021 is welded on the front bumper 102, and a second end is welded on the vehicle frame 100. Therefore, the front bumper 102 may be fixed to a front end of the front casing 902. It should be noted that only one front bumper supporting beam 1021 is shown in FIG. 31, and the front bumper 102 is fixed on the vehicle frame 100, for example, through two front bumper supporting beams 1021, and the two front bumper supporting beams 1021 are symmetrically arranged on the front bumper 102. A safety bar bracket 1022 is arranged on the front bumper supporting beam 1021, and the safety bar bracket 1022 is used for fixing a first limiting plate 906. The safety bar bracket 1022 is for example arranged on a top of the front bumper supporting beam 1021, which means that the safety bar bracket 1022 is for example arranged at a position where the front bumper supporting beam 1021 is close to the front bumper 102. The safety bar bracket 1022 may extend into the front casing 902 so as to fix the first limiting plate 906.

Please refer to FIG. 31. In this embodiment, an elastic bracket 905 is matched with the first limiting plate 906, the elastic bracket 905 is used to be connected with the front casing 902, and enables the front end of the front casing 902 to lean against a second limiting plate 908. Therefore, the elastic bracket 905 may play a role of fixing and at the same time play a role of shock absorption. A material of the elastic bracket 905 may be rubber material. The second limiting plate 908 is fixed on a second limiting plate bracket 907, and one end of the second limiting plate bracket 907 is fixed on the front bumper 102 and extends inside the front casing 902. The second limiting plate bracket 907 is located on a central area of the front bumper 102. It should be noted that, since a structure in FIG. 31 is a symmetrical structure, only one first limiting plate 906, one elastic bracket 905, one second limiting plate bracket 907 and one second limiting plate 908 are shown in FIG. 31.

Figure 32:
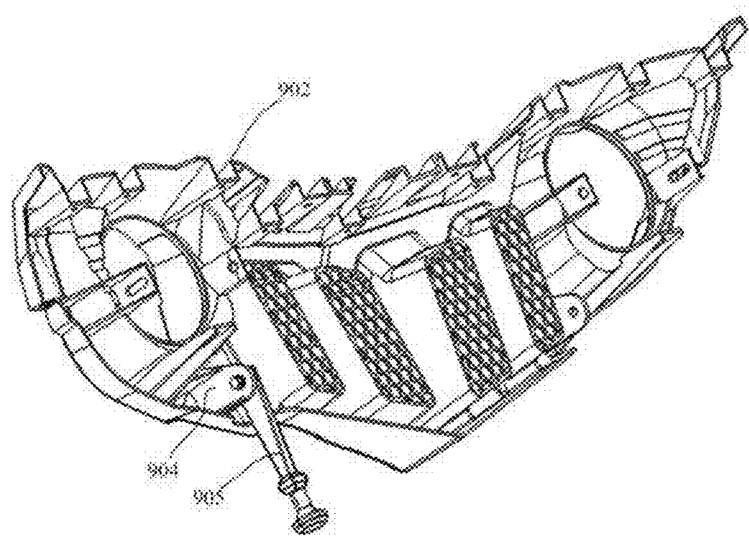
FIG. 32 is a connection view of the rubber bracket and a casing of the disclosure.

Please refer to FIG. 31 and FIG. 32. In this embodiment, a second connecting plate 904 is arranged at a bottom of the front casing 902. When a top of the elastic bracket 905 is aligned with the second connecting plate 904, the second connecting plate 904 and the elastic bracket 905 may be fixed by bolts, which means that the elastic bracket 905 is fixed on the front casing 902. When the front casing 902 covers on the vehicle frame 100, the front end of the front casing 902 is in contact with the second limiting plate 908 by pulling the elastic bracket 905 downward. Then the elastic bracket 905 is fixed on the first limiting plate 906 to realize a fixing of the front casing 902. In this embodiment, the second limiting plate 908 is, for example, made of rubber material, so it may play a role of shock absorption. In some embodiments, the front end of the front casing 902 may directly contact the frame, so the second limiting plate 908 does not need to be arranged.

Figure 33:
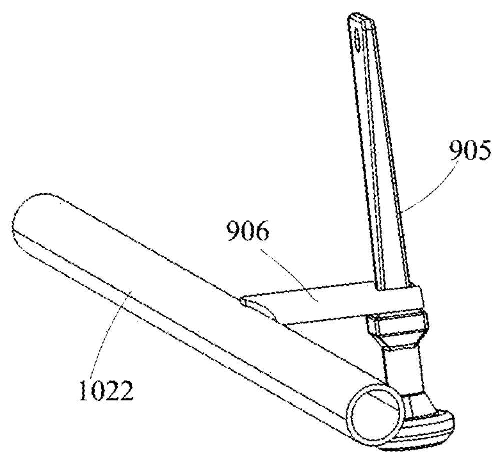
FIG. 33 is a partially enlarged view of FIG. 31 of the disclosure.
Figure 34:
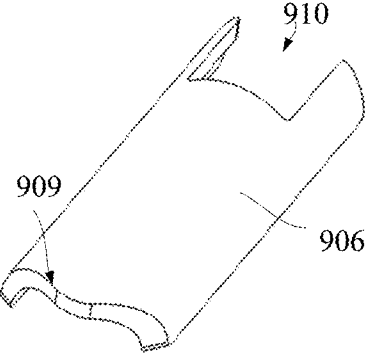
FIG. 34 is a structural view of a first limiting plate of the disclosure.

Please refer to FIG. 33 and FIG. 34. In this embodiment, a first end of the first limiting plate 906 is fixed on the safety bar bracket 1022, and a second end of the first limiting plate 906 is connected with the elastic bracket 905. The first end 909 of the first limiting plate 906 may be welded and fixed on the safety bar bracket 1022. The first limiting plate 906 may be arranged at an angle to the safety bar bracket 1022, of course, the first limiting plate 906 may also be perpendicular to the safety bar bracket 1022. A groove 910 is arranged on a second end of the first limiting plate 906, and the groove 910 extends toward an inside of the first limiting plate 906 along the second end. The groove 910 is used to fix the elastic bracket 905, which means to place the elastic bracket 905 in the groove 910.

Figure 35:
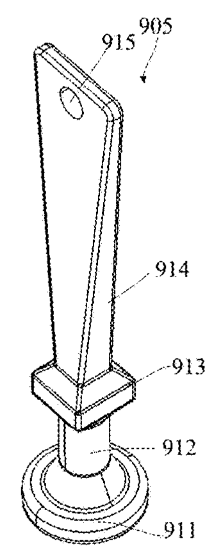
FIG. 35 is a structural view of the rubber bracket of the disclosure.

Please refer to FIG. 32, FIG. 34 and FIG. 35. In this embodiment, the elastic bracket 905 may include a second base 911, a first supporting body 912, a limiting block 913 and a second supporting body 914. The second base 911 is connected with the first supporting body 912, which means that the first supporting body 912 is vertically arranged on the second base 911. The limiting block 913 is located on the first supporting body 912, and the limiting block 913 is, for example, a cube structure. The first supporting body 912 is, for example, a cylindrical structure, and the second base 911 is, for example, a cylindrical structure. A width of the limiting block 913 is greater than a width of the first supporting body 912, and the width of the limiting block 913 is smaller than a width of the second base 911. Of course, the width of the limiting block 913 may also be equal to the width of the second base 911. The second supporting body 914 is arranged on the limiting block 913. A height of the second supporting body 914 may be greater than a height of the first supporting body 912. A width of the second supporting body 914 gradually increases from a bottom to a top, and a thickness of the second supporting body 914 gradually decreases from the bottom to the top, which means that the top of the second supporting body 914 has a larger area. A fixing hole 915 is further arranged on the top of the second supporting body 914. When the top of the second supporting body 914 is attached to the second connecting plate 904, the fixing hole 915 is aligned with a connecting hole on the second connecting plate 904. Then bolts are placed in the fixing holes 915 and the connecting hole, so that the elastic bracket 905 may be fixed on the front casing 902. In this embodiment, since the top of the second supporting body 914 has a larger surface area, there is a larger contact area between the second supporting body 914 and the second connecting plate 904, thus improving a connection stability. In this embodiment, when the elastic bracket 905 is connected with the first limiting plate 906, the second supporting body 914 may be placed in the groove 910, and at the same time, due to a function of the limiting block 913, the elastic bracket 905 is connected with the first limiting plate 906. It should be noted that the width of the limiting block 913 may be greater than a width of the groove 910, and the width of the bottom of the second supporting body 914 may be equal to or smaller than the width of the groove 910. Therefore, it is convenient to place the second supporting body 914 in the groove 910. In this way, the operator may pull the elastic bracket 905 through the second base 911, which is easy to grasp and operate. Of course, in some embodiments, the first supporting body 912 may also be placed in the groove 910, and then the second base 910 plays a limiting role. Of course, when the first supporting body 912 is arranged in the groove 910, the limiting block 913 and the second base 911 may respectively contact two sides of a first limiting plate 906 thereby increasing the connection stability.

Figure 36:
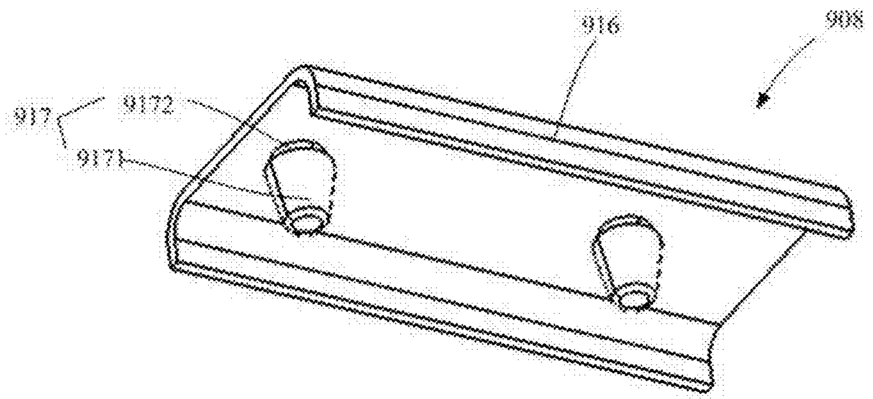
FIG. 36 is a structural view of the second limiting plate of the disclosure.

Please refer to FIG. 31 and FIG. 36. In this embodiment, the second limiting plate 908 may include a rubber plate 916 and a rubber fixing column 917. The rubber fixing column 917 is arranged on a bottom of the rubber plate 916. Both sides of the rubber plate 916 are bent. The rubber fixing column 917 may include a main body part 9171 and a contact part 9172, and the contact part 9172 is further connected with the rubber plate 916. The main body part 9171 is, for example, a circular truncated structure, and a diameter of a top of the main body part 9171 is larger than a diameter of a bottom of the main body part 9171, so it is convenient to arrange the rubber fixing column 917 in the fixing hole. The contact part 9172 is, for example, a cylinder, and a diameter of the contact part 9172 may be smaller than the diameter of the top of the main body part 9171. When the rubber plate 916 is placed on the second limiting plate bracket 907, a top surface of the second limiting plate bracket 907 is attached to a bottom surface of the rubber plate 916. Then the rubber fixing column 917 is placed in the fixing hole on the second limit plate bracket 907, which means that the main body part 9171 is first arranged in the fixing hole. Then the fixing hole is contacted with the contact part 9172. Since the diameter of the top of the main body part 9171 is larger, it may play a limiting role, which means that the second limiting plate 908 may be firmly fixed on the second limiting plate bracket 907. In this embodiment, bent parts on both sides of the rubber plate 916 cover a side wall of the second limiting plate bracket 907, so that the front casing 902 may be prevented from contacting the side wall of the second limiting plate bracket 907 and the front casing 902 may be protected.

Please refer to FIG. 30 through FIG. 36. In this embodiment, when the front casing 902 needs to be covered, the elastic bracket 905 is pulled down, and then the elastic bracket 905 is fixed in the groove 910. Then the front end of the front casing 902 is enabled to abut against the second limiting plate 908, so as to fix the front casing 902. When the front casing 902 needs to be turned over, the elastic bracket 905 is moved to one side, which means that the elastic bracket 905 is separated from the groove 910 and the first limiting plate 906. And then the front casing 902 is lifted up, so that the front casing 902 turns around the rotating assembly 903. In this embodiment, when the front casing 902 is turned over, the operation is convenient, safe and reliable, and it is beneficial to the maintenance.

Please refer to FIG. 2. In this embodiment, the motor 700 is arranged at the rear end of the vehicle frame 100, and the gearbox 800 is further arranged at the rear end of the vehicle frame 100. The motor 700 is connected with the gearbox 800. The cargo compartment may be located above the motor 700 and the gearbox 800, which means that the gearbox 800 and the motor 700 are located between the cargo compartment and the vehicle frame 100. Therefore, the space of the vehicle frame 100 may be fully utilized, and at the same time, it is also beneficial to maintain the gearbox 800 and the motor 700.

Figure 37:
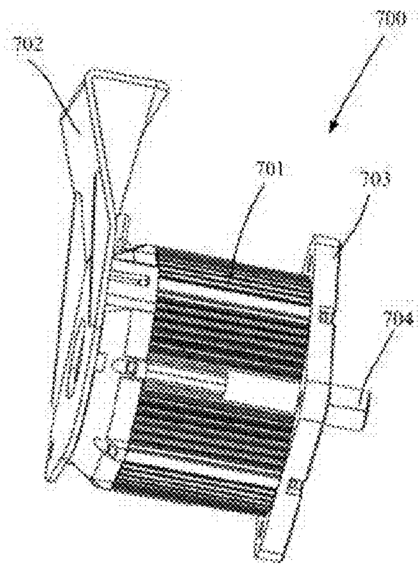
FIG. 37 is a structural view of a motor assembly of the disclosure.
Figure 38:
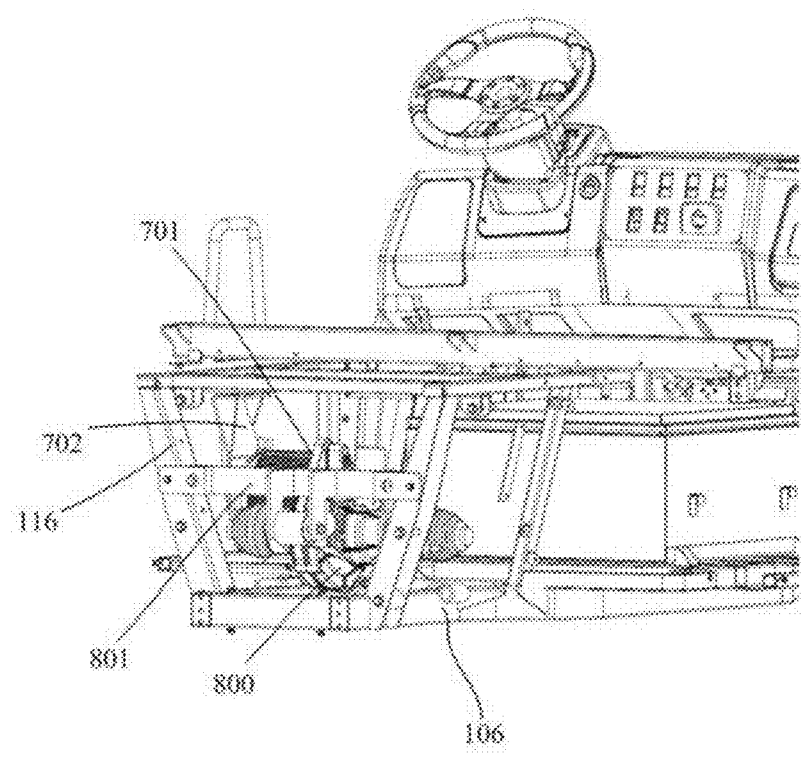
FIG. 38 is a structural view of a motor and a gearbox of the disclosure.

Please refer to FIG. 8, FIG. 37 and FIG. 38. In this embodiment, the motor 700 may include a motor body 701, and an upper connecting plate 702 is mounted on a tail of the motor body 701. A top of the upper connecting plate 702 may be connected with the cargo compartment mounting bracket 125. The top of the upper connecting plate 702 may be in contact with an upper connecting plate bracket 152, and then the upper connecting plate 702 and the upper connecting plate bracket 152 are fixed by bolts, thereby fixing the motor body 701 on the vehicle frame 100. A rear connecting plate 703 is further arranged on the motor body 701, and the rear connecting plate 703 is used for connecting with the gearbox 800. The rear connecting plate 703 is located on one side of an output shaft 704. The rear connecting plate 703 is connected with the gearbox 800 through bolts, so that the output shaft 704 is arranged in the gearbox 800. A rear end of the gearbox 800 is fixed on the rear swing arm 116 through a buffer bracket 801, and two ends of the buffer bracket 801 are respectively connected with the gearbox rear bracket on the rear swing arm 116. A front end of the gearbox 800 is further connected with the gearbox front bracket, so that the gearbox 800 is fixed on the vehicle frame 100.

Please refer to FIG. 1 through FIG. 3. In this embodiment, the battery pack 500 and the controller 600 are located under the seat 200. The battery pack 500 is located at a front end of the motor 700, and the motor 700 and the gearbox 800 are located below the cargo compartment 300, so the space of the vehicle frame 100 may be fully utilized. The battery pack 500 is electrically connected with the controller 600, and the controller 600 controls a rotation of the motor 700. Since the motor 700 is connected with the gearbox 800, the gearbox 800 may reduce the rotating speed of the motor 700, increase the torque of the motor 700, and then drive the rear wheels 402 forward or backward. When the steering wheel is rotated, the front wheels 401 may be driven to rotate, so that the walking direction of the electric all-terrain vehicle 10 may be changed. When the electric all-terrain vehicle 10 is stopped, the electric all-terrain vehicle 10 may be prevented from moving by pulling a parking brake 153.

Please refer to FIG. 1 through FIG. 3. In this embodiment, when the electric all-terrain vehicle 10 is driving on a flat road, a driving speed of the electric all-terrain vehicle 10 may be from 20 km/h to 30 km/h, for example, 25 km/h. When the electric all-terrain vehicle 10 is running on a slope, the driving speed of the electric all-terrain vehicle 10 may be from 10 km/h to 15 km/h, for example, 12 km/h. In some embodiments, a speed reduction ratio of the electric all-terrain vehicle 10 may be 11.7, and a diameter D1 of the front wheel 401 or the rear wheel 402 may be 0.609 m. A diameter D of the output shaft of the motor of the electric all-terrain vehicle 10 may be 0.02 m. A coefficient $\mu$ of rolling friction of the electric all-terrain vehicle 10 is 0.05. When the electric all-terrain vehicle 10 is running on a slope, a slope angle $\alpha$ may be 20°. A gravity G of the electric all-terrain vehicle 10 may be 9200N. A component F2 of gravity of the electric all-terrain vehicle 10 perpendicular to the slope which exerts on the slope may be 8645N. A friction force f of the electric all-terrain vehicle 10 may be 432N. A component F1 of gravity of the electric all-terrain vehicle 10 along a slope direction may be 3145N. A slope traction force F of the electric all-terrain vehicle 10 may be 3577N. A flat traction force F of the electric all-terrain vehicle 10 may be 460N. A climbing motor torque T of the electric all-terrain vehicle 10 may be 93 Nm, a climbing motor rotating speed n may be 1019 r/min, a climbing speed V1 may be 2.78 m/s, and a flat walking speed V2 may be 6.67 m/s. According to the above parameters, a motor power P of the electric all-terrain vehicle 10 on flat road is calculated that $P=F*V=G*\mu*V2=9200*0.05*6.67=3067$ W. A climbing motor power P of this electric all-terrain vehicle 10 is calculated that $P=F*V=G*\mu*V1=9200*\sin((20/180)*3.14)+9200*\cos((20/180)*3.14)*0.05*2.77=9937$ W. A motor torque of the electric all-terrain vehicle 10 on a flat road is $T=F*D1/2/(\text{speed reduction ratio})=460*0.609/2/11.7=12$ Nm. The climbing motor torque of the electric all-terrain vehicle 10 is $T=F*D1/2/(\text{speed reduction ratio})=3577*0.609/2/11.7=93$ Nm. According to the above calculation results and an actual situation, the power P of the motor may be 5 KW. A driving range of the electric all-terrain vehicle 10 may be greater than 60 km, for example 80 km. A battery life of the electric all-terrain vehicle 10 may be 60/24=2.5 H. A battery capacity may be 3.067 KW*2.5 H=7.67 KWh. In some embodiments, a discharge current of the battery pack 500 may be from 100 A to 200 A, and the battery capacity of the battery pack 500 may be 8 kwh.

Figure 39:
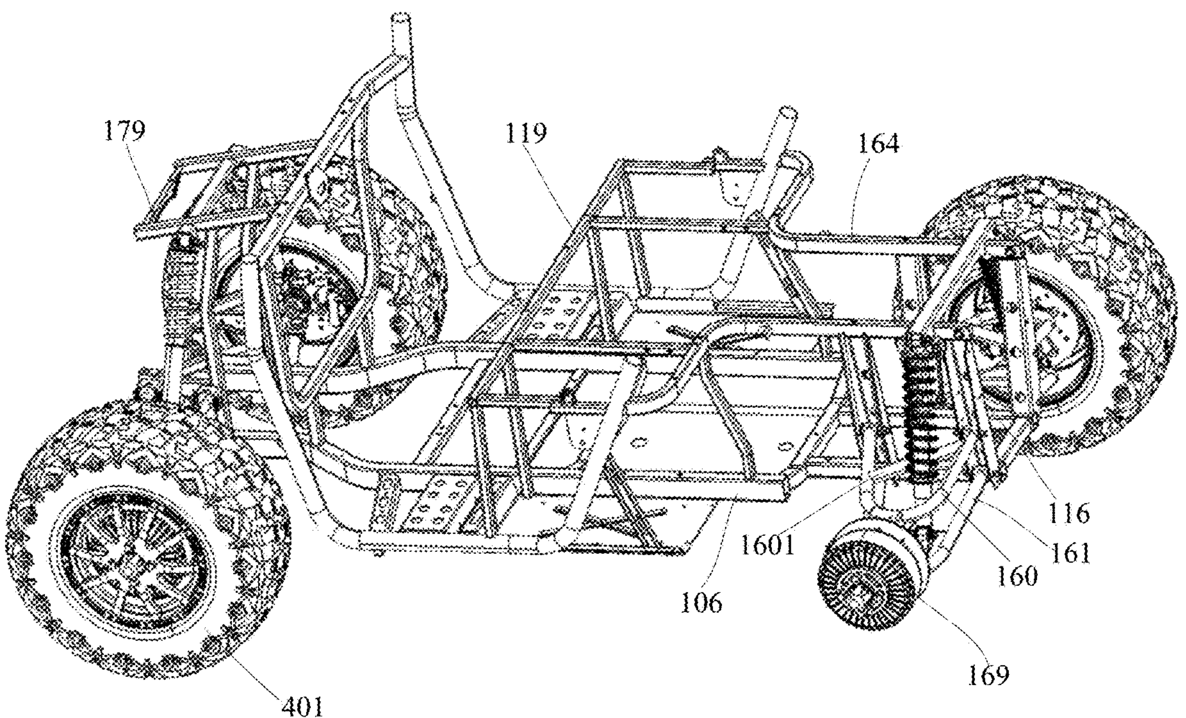
FIG. 39 is another structural view of the electric all-terrain vehicle of the disclosure.

Please refer to FIG. 39. In this embodiment, the rear end of the longitudinal beam 106 is further provided with a first rear rocker arm 160 and a second rear rocker arm 161. The first rear rocker arm 160 is located above the second rear rocker arm 161. Structures of the first rear rocker arm 160 and the second rear rocker arm 161 are basically the same. Both ends of the first rear rocker arm 160 are respectively fixed on the two rear swing arms 116, so that the first rear rocker arm 160 extends to an outside of the vehicle frame, thereby forming a bent end on the outside of the vehicle frame. Similarly, the second rear rocker arm 161 forms a bent end on the outside of the vehicle frame. These two bent ends may be used to attach a rear steering knuckle. A first fixing piece 1601 is further arranged between the first rear rocker arms 160, and the first fixing piece 1601 may play a role in reinforcing the first rear rocker arm 160 and improving a stability of the first rear rocker arm 160.

Figure 40:
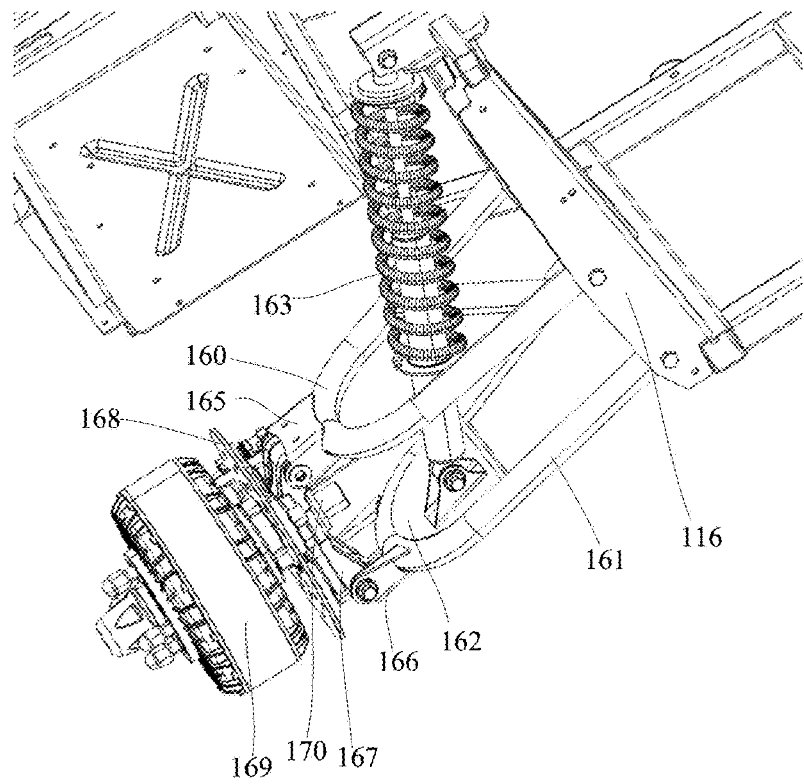
FIG. 40 is a mounting structural view of a rear hub motor of the disclosure.

Please refer to FIG. 39 and FIG. 40. In this embodiment, a tray 162 is further arranged on the second rear rocker arm 161, and the tray 162 may be located at a front end of the second rear rocker arm 161, which means that the tray 162 is near the bent end of the second rear rocker arm 161. The vehicle frame 100 is further provided with a rear shock absorber 163, a first end of the rear shock absorber 163 is fixed on the tray 162, and a second end of the rear shock absorber 163 is fixed on the cargo compartment supporting beam 164. The rear shock absorber 163 further passes through an inside of the first rear rocker arm 160 without being in contact with the first rear rocker arm 160. Both ends of the rear shock absorber 163 are respectively fixed on the tray 162 and the cargo compartment supporting beam 164 by bolts. The rear shock absorber 163 is, for example, arranged obliquely between the tray 162 and the cargo compartment supporting beam 164. A first connecting component 165 and a second connecting component 166 are respectively arranged on the bent ends of the first rear rocker arm 160 and the second rear rocker arm 161. The first connecting component 165 and the second connecting component 166 may respectively connect a top and a bottom of the rear steering knuckle 167. A first end of the first connecting component 165 is welded on the bent end of the first rear rocker arm 160, and a second end of the first connecting component 165 is fixed on the top of the rear steering knuckle 167 by bolts. A first end of the second connecting component 166 is welded to the bent end of the second rear rocker arm 161, and a second end of the second connecting component 166 is fixed to the bottom of the rear steering knuckle 167 by bolts. The rear steering knuckle 167 may drive a steering of the rear wheel 402. A rear brake disc 168 and a rear hub motor 169 are sequentially arranged outside the rear steering knuckle 167, which means that the rear brake disc 168 is located between the rear steering knuckle 167 and the rear hub motor 169. The rear hub motor 169 may drive the rear wheel to rotate, and the rear brake disc 168 may decelerate the rear wheel.

Figure 41:
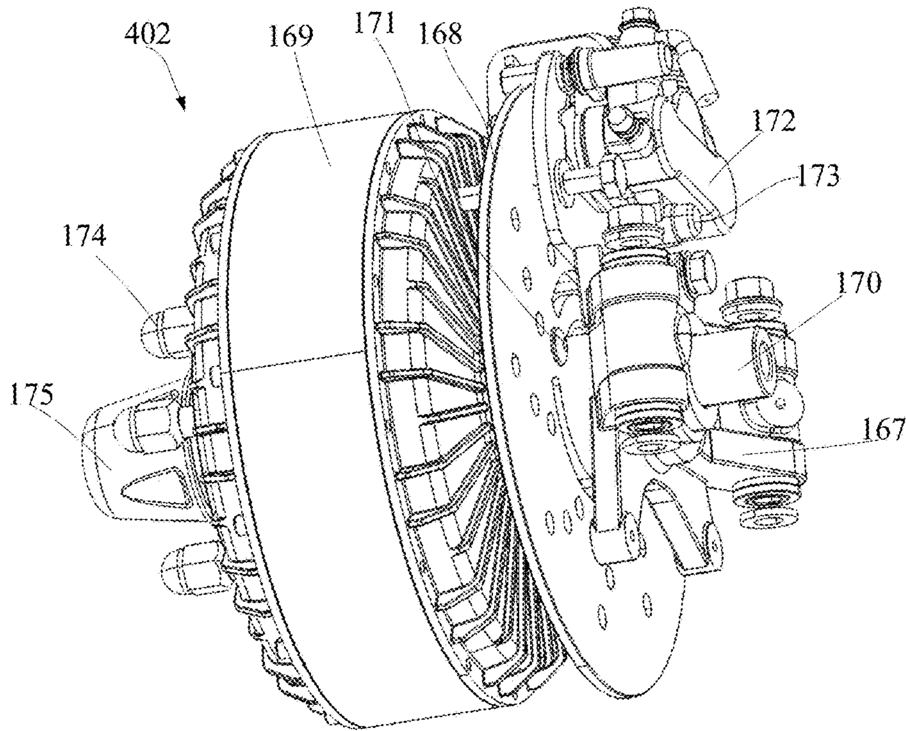
FIG. 41 is a mounting structural view of the rear hub motor, a rear steering knuckle, a rear brake disc and a rear braking caliper of the disclosure.

Please refer to FIG. 40 and FIG. 41. In this embodiment, the rear hub motor 169 is fixed on the rear steering knuckle 167 through a rear feather key 170. The rear feather key 170 is arranged on an output shaft of the rear steering knuckle 167 and extends toward the rear steering knuckle 167. One end of the rear feather key 170 extends out of a central hole of the rear steering knuckle 167, and then a fixing nut is arranged at an end of the rear feather key 170 near the rear steering knuckle 167, so that the rear hub motor 169 is fixed on the rear steering knuckle 167. A rear brake disc 168 is arranged inside the rear hub motor 169, and the rear brake disc 168 may be fixed on the rear hub motor 169 by a plurality of rear brake disc fixing bolts 171. When the rear hub motor 169 rotates, the rear brake disc 168 also rotates accordingly. A rear brake caliper 172 is further arranged on the rear steering knuckle 167, and the rear brake caliper 172 is fixed on the rear steering knuckle 167 by a rear brake caliper fixing bolt 173. The rear brake caliper 172 surrounds part of the rear brake disc 168, which means that part of the rear brake disc 168 is located within the rear brake caliper 172. When the electric all-terrain vehicle 10 is walking, the rear brake disc 168 rotates through following a rotation of the rear hub motor 169. When braking, the rear brake caliper 172 clamps part of the rear brake disc 168, thereby realizing the braking of the vehicle.

Figure 42:
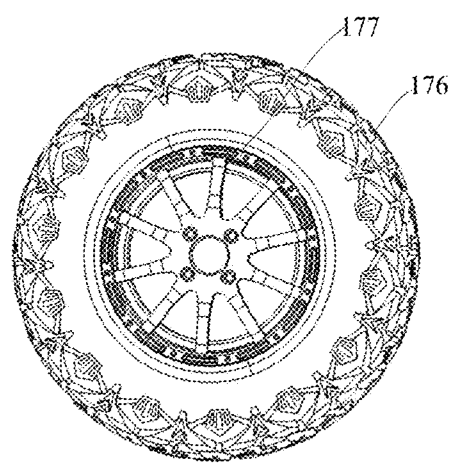
FIG. 42 is a structural view of a rear wheel of the disclosure.

Please refer to FIG. 41 and FIG. 42. In this embodiment, a rear tire nut 174 and a rear hub cover 175 are arranged outside the rear hub motor 169. A rear hub 177 is arranged inside a rear tire 176. The rear hub 177 is connected with the rear hub motor 169 when the rear tire 176 is placed on the rear hub motor 169. Then the rear wheel hub 177 is fixed on the rear hub motor 169 by the rear tire nut 174. The rear hub cover 175 is placed on the rear wheel hub 177 simultaneously, and the rear hub cover 175 may be located at a central position of rear wheel hub 177, which means that the rear hub cover 175 may be located on a transmission shaft in a center of rear hub 177. The rear hub cover 175 may protect the transmission shaft, such as preventing rainwater from corroding the transmission shaft.

Please refer to FIG. 1 through FIG. 41. In this embodiment, the electric all-terrain vehicle 10 is a two-wheel drive electric vehicle, which means that the rear wheels 402 generate a driving force. Therefore, there is no need to use a driving motor and a gearbox with complex structures, so the structure of the vehicle frame 100 may be simplified and the versatility of the vehicle frame 100 may be improved. In this embodiment, the battery pack and the controller are arranged on the vehicle frame 100 at the same time, and the battery pack and the controller are located under the seat 200, thus improving a space utilization rate of the vehicle frame 100.

Figure 43:
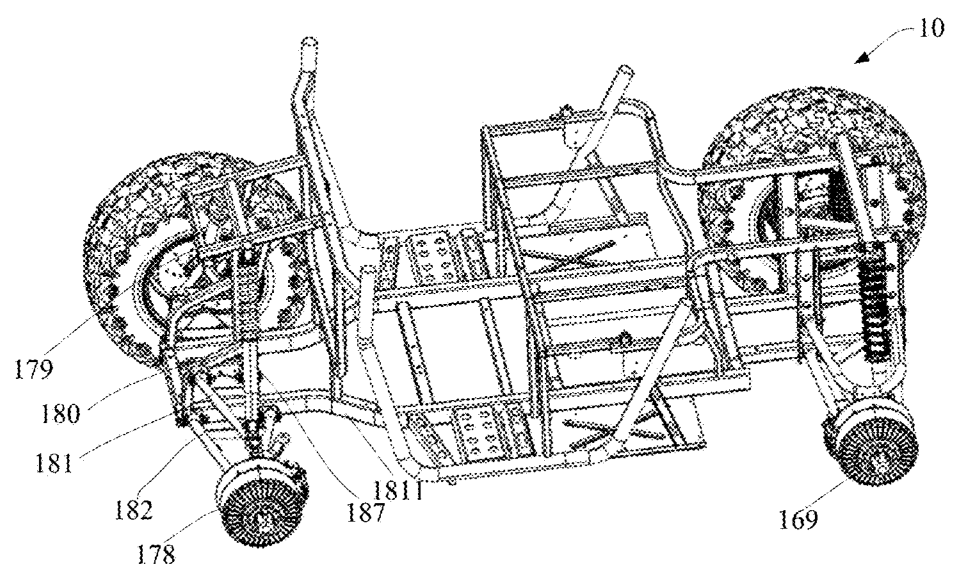
FIG. 43 is yet another structural view of the electric all-terrain vehicle of the disclosure.

Please refer to FIG. 1 and FIG. 43. In order to further improve a power performance of the electric all-terrain vehicle 10, the electric all-terrain vehicle 10 may further be set as a four-wheel drive electric vehicle, which means that the electric all-terrain vehicle 10 may include a rear hub motor 169 and a front hub motor 178, that is, the electric all-terrain vehicle 10 may include front drive wheels and rear drive wheels. A structure and arrangement of the rear hub motor 169 may refer to the above description, and a structure and arrangement of the front hub motor 178 will be explained below.

Please refer to FIG. 43 through FIG. 46. In this embodiment, a front shock absorber upper bracket 179 is arranged at the front end of the longitudinal beam 106. The front shock absorber upper bracket 179 may be fixed on the longitudinal beam 106 through a front fixing bracket 180, which means that a first end of the front fixing bracket 180 is fixed on the longitudinal beam 106, and a second end of the front fixing bracket 180 is fixed on the front shock absorber upper bracket 179. A first front rocker arm 181 is arranged on the front fixing bracket 180, a second front rocker arm 182 is arranged on the longitudinal beam 106, and the first front rocker arm 181 is located above the second front rocker arm 182. Structures of the first front rocker arm 181 and the second front rocker arm 182 are basically the same. A second fixing component 183 is further arranged inside the second front rocker arm 182. The second fixing component 183 is parallel to the longitudinal beam 106. The second fixing component 183 may play a role of reinforcing the second front rocker arm 182. Similarly, a fixing component is further arranged inside the first front rocker arm 181. A first end of the first front rocker arm 181 is fixed on the front fixing bracket 180 by bolts, and a second end of the first front rocker arm 181 is bolted on a top of a front steering knuckle 184. A first end of the second front rocker arm 182 is fixed on the longitudinal beam 106 by a bolt, and a second end of the second front rocker arm 182 is connected to the bottom of the front steering knuckle 184 by a bolt. The first front rocker arm 181 may include a first front rocker arm bracket 1811 and a second front rocker arm bracket 1812. The first front rocker arm bracket 1811 and the second front rocker arm bracket 1812 are arranged at an angle, which means that a second end 1814 of the first front rocker arm bracket 1811 is in contact with the second end 1816 of the second front rocker arm bracket 1812, thereby forming the second end of the first front rocker arm 181. A first end 1813 of the first front rocker arm bracket 1811 and a first end 1815 of the second front rocker arm bracket 1812 extend in different directions, and the two first ends are connected with the longitudinal beam 106, therefore, the two first ends may be defined as the first end of the first front rocker arm 181. Similarly, the first end and the second end of the second front rocker arm 182 have a same structure as that of the first front rocker arm 181.

Please refer to FIG. 43 through FIG. 46. In this embodiment, the first front rocker arm 181 and the second front rocker arm 182 may place the ball-shaped connector 185 on a top and bottom of the front steering knuckle 184 respectively. A ball-shaped nut 186 is then arranged at a bottom of the ball-shaped connector 185, thereby fixing the first front rocker arm 181 and the second front rocker arm 182 to the top and bottom of the front steering knuckle 184, respectively. A front shock absorber 187 is further included between the first front rocker arm 181 and the front shock absorber upper bracket 179, a first end of the front shock absorber 187 is fixed on the first front rocker arm 181 by a bolt, and a second end of the front shock absorber 187 is fixed on the front shock absorber upper bracket 179 by a bolt. Since the first end of the front shock absorber 187 is fixed on an end of the first front rocker arm 181 near the front steering knuckle 184, the front shock absorber 187 may be fixed obliquely between the front shock absorber upper bracket 179 and the first front rocker arm 181. The front shock absorber 187 may play a shock absorbing role and reduce a bumping of the vehicle.

Figure 44:
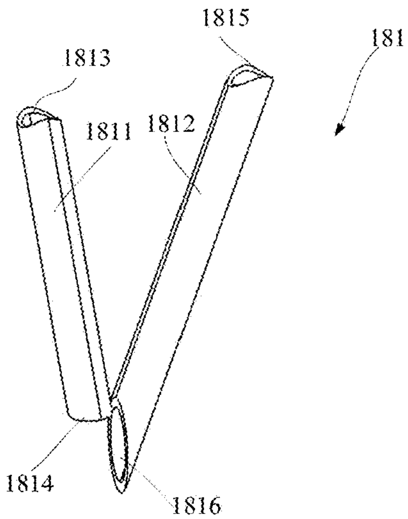
FIG. 44 is a structural view of a first front rocker arm of the disclosure.
Figure 45:
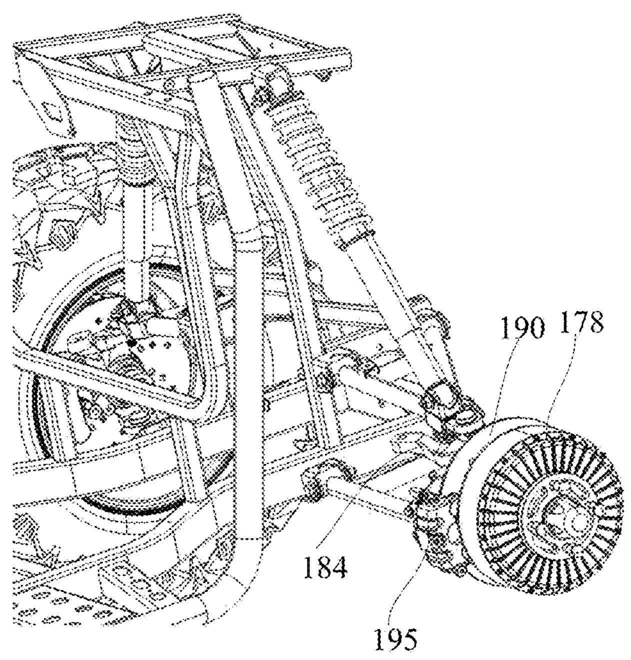
FIG. 45 is a mounting structural view of a front hub motor of the disclosure.
Figure 46:
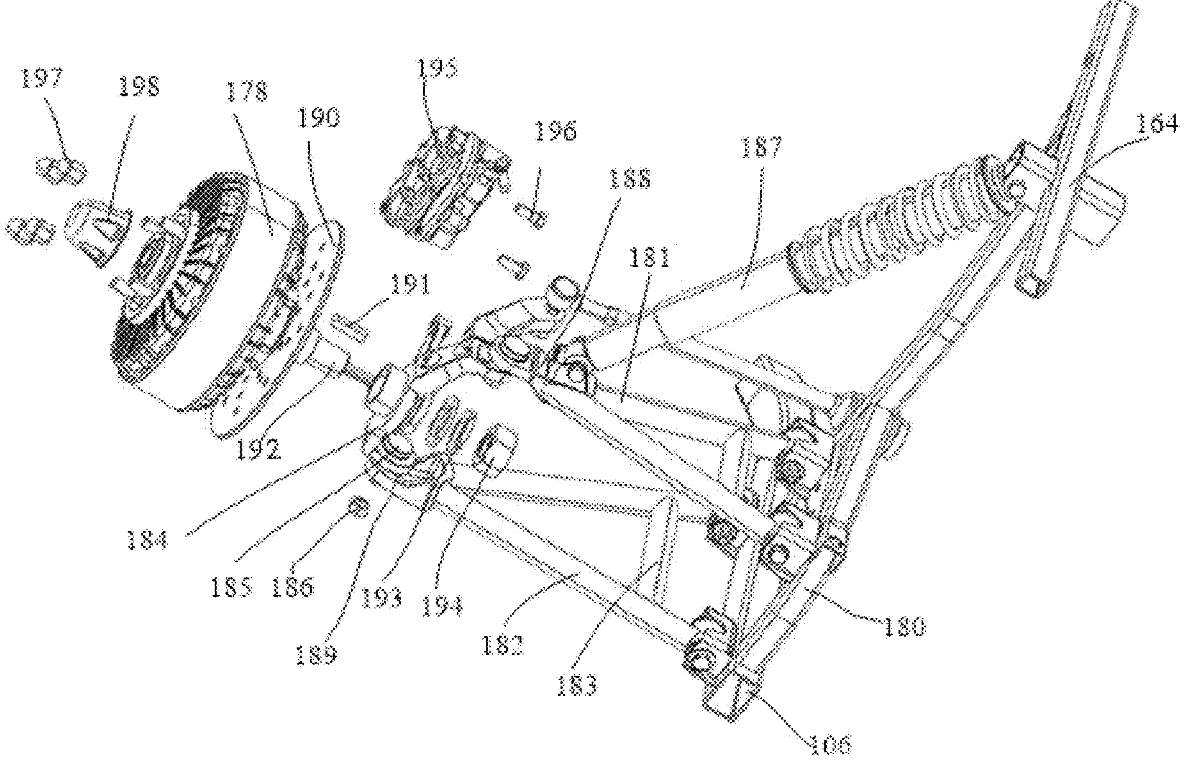
FIG. 46 is an exploded structural view of the front hub motor of the disclosure.
Figure 47:
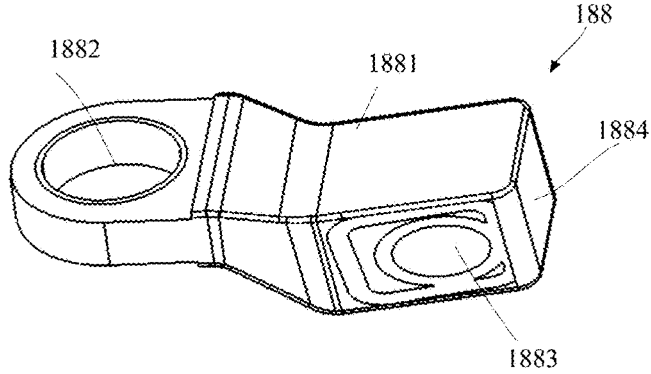
FIG. 47 is a structural view of a first ball-shaped connector arm of the disclosure.

Please refer to FIG. 44, FIG. 46 and FIG. 47. In this embodiment, a first ball-shaped connector 188 is connected with the second end of the first front rocker arm 181, and a connection between the first front rocker arm 181 and the front steering knuckle 184 is realized through the first ball-shaped connector 188. A top surface 1881 of the first ball-shaped connector 188 is a plane, so a lower bracket of the front shock absorber 187 may be arranged on the top surface 1881. A front end of the first ball-shaped connector 188 is provided with a first ball joint hole 1882, and the first ball joint hole 1882 may be located on a ball joint hole at a top of the front steering knuckle 184, which means that the ball-shaped connector 185 passes through the first ball joint hole 1882 and the ball joint hole at the top of the front steering knuckle 184 in sequence. A side wall 1883 of the first ball-shaped connector 188 may be in contact with the second end 1816 of the second front rocker arm bracket 1812, for example, the side wall 1883 and the second end 1816 are fixed by welding. A back surface 1884 of the first ball-shaped connector 188 may be in contact with the second end 1814 of the first front rocker arm bracket 1811, for example, the back surface 1884 and the second end 1814 are fixed by welding.

Figure 48:
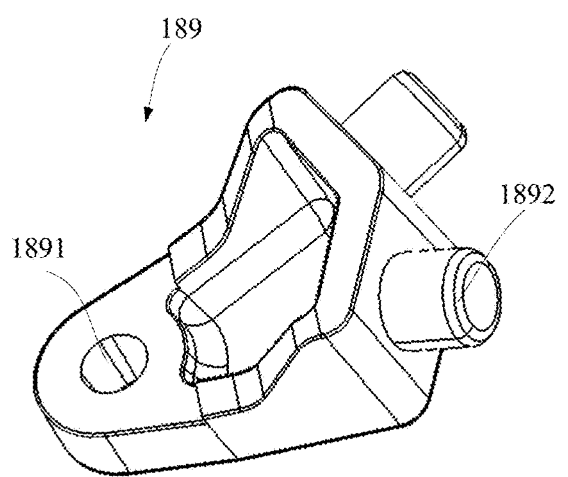
FIG. 48 is a structural view of a second ball-shaped connector arm of the disclosure.

Please refer to FIG. 44, FIG. 46 and FIG. 48. In this embodiment, the second front rocker arm 182 is connected with the front steering knuckle 184 through a second ball-shaped connector 189. A front end of the second ball-shaped connector 189 is provided with a second ball joint hole 1891, and the second ball joint hole 1891 is located below the ball joint hole at the bottom of the front steering knuckle 184, which means that the ball-shaped connector 185 passes through the ball joint hole at the bottom of the front steering knuckle 184 and the second ball joint hole 1891 sequentially.

Two connecting columns 1892 are further arranged at a rear end of the second ball-shaped connector 189, and these two connecting columns 1892 are used to connect two brackets of the second front rocker arm 182, thereby realizing a connection between the second front rocker arm 182 and the front steering knuckle 184.

Please refer to FIG. 1 and FIG. 46. In this embodiment, the front hub motor 178 is arranged outside the front steering knuckle 184, and a front brake plate 190 is arranged on the front hub motor 178. The front brake plate 190 is fixed on the front hub motor 178 by, for example, a plurality of front brake plate fixing bolts 191, so when the front hub motor 178 rotates, the front brake plate 190 rotates accordingly. The front hub motor 178 may be connected on the front steering knuckle 184 through a front feather key 192, which means that the front feather key 192 is arranged on an output shaft of the front hub motor 178, and the front feather key 192 extends toward the front steering knuckle 184. The front feather key 192 passes through a center hole of the front steering knuckle 184 and extends toward the longitudinal beam 106. The front feather key 192 is arranged, for example, on the output shaft of the front hub motor 178. In some embodiments, a connecting device may also be arranged on the output shaft of the front hub motor 178, and then the front feather key 192 may be arranged on the connecting device. A front fixing gasket 193 and a front fixing nut 194 are further arranged on an end of the front feather key 192 near the front steering knuckle 184, so that the front feather key 192 may be fixed on the front steering knuckle 184, thus the front brake plate 190 and front hub motor 178 are fixed on the front steering knuckle 184. A front brake caliper 195 is further arranged on the front steering knuckle 184, and the front brake caliper 195 may be fixed on the front steering knuckle 184 by a front brake caliper fixing bolt 196, and part of the front brake plate 190 is located inside the front brake caliper 195. When the electric all-terrain vehicle 10 is braked, the front brake caliper 195 clamps the part of the front brake plate 190, so as to brake the electric all-terrain vehicle 10. A front tire nut 197 and a front hub cover 198 are further arranged outside the front hub motor 178. A mounting mode of the front hub cover 198 and the front tire nut 197 may refer to a mounting mode of the rear hub cover and the rear tire nut.

Please refer to FIG. 43. In this embodiment, the electric all-terrain vehicle 10 is the four-wheel electric drive vehicle, so the electric all-terrain vehicle 10 may have greater power performance, which means that the electric all-terrain vehicle 10 may have a faster walking speed.

Figure 49:
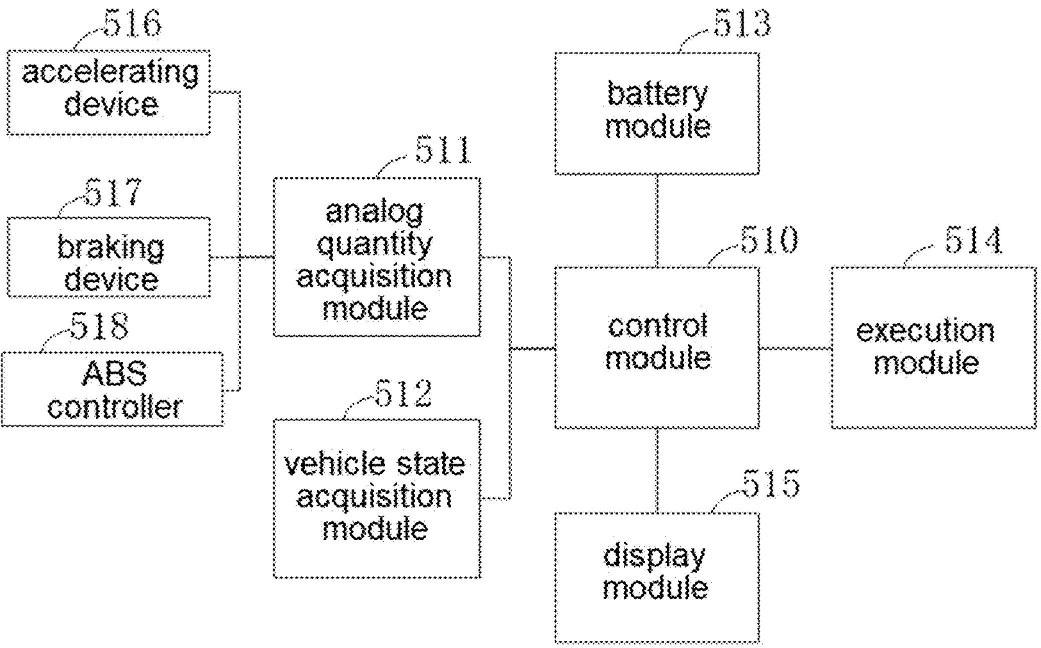
FIG. 49 is a block view of a control system of vehicle braking of the disclosure.

Please refer to FIG. 1 and FIG. 49. The disclosure provides an electric vehicle, which is generally equipped with a braking device 517 and an accelerating device 516. When the vehicle needs to be accelerated, a driver operates the accelerating device 516, and the vehicle accelerates. When the vehicle needs to be braked, the driver operates the braking device 517 to decelerate the vehicle. And when braking, the vehicle may only reduce an output torque or speed of the vehicle according to an opening degree of the braking device 517 to achieve an effect of fast braking. When an emergency occurs, only changing the output torque or rotating speed of the vehicle according to the opening degree of the braking device 517 is not enough to meet needs of users. The disclosure provides a control method and system of the vehicle, which has a pre-judgment function, and according to the driver's intention, brakes more quickly during an emergency braking to prevent danger. And when braking, an energy feedback may be performed.

Please refer to FIG. 49. FIG. 49 shows a control system of a vehicle braking provided by the disclosure, including an analog quantity acquisition module 511, a vehicle state acquisition module 512, a battery module 513, a display module 515, a control module 510 and an execution module 514.

Please refer to FIG. 49 and combined with FIG. 1. In an embodiment of the disclosure, the analog quantity acquisition module 511 is connected with the accelerating device 516, the braking device 517, and the control module 510 of the vehicle, and the analog quantity acquisition module 511 are used to collect state information of the accelerating device 516 and state information of the braking device 517. The disclosure does not limit an actual structure of the accelerating device 516 and the braking device 517. The accelerating device 516 may be a pedal box form, such as an accelerating pedal 156, or it may be a handheld form. In this embodiment, the accelerating device 516 is, for example, the accelerating pedal, and the braking device 517 is, for example, the braking pedal 155. The control module 510 recognizes the driver's intention according to changes in the opening degrees of the accelerating device 516 and the braking device 517 and changes in a rate of the opening degrees. For example, by an operating time interval between the accelerating device 516 and the braking device 517, a speed at which the accelerating device 516 is released and a speed at which the braking device 517 is stepped on, it is possible to identify whether the driver's intention of braking is an emergency braking or normal braking, and then an output mode of the execution module 514 is adjusted. In this embodiment, the analog quantity acquisition module 511 is further connected with the control module 510, and in other embodiments, the analog quantity acquisition module 511 may be integrated in the control module 510.

Please refer to FIG. 49. In an embodiment of the disclosure, the analog quantity acquisition module 511 is further connected with an ABS controller 518 (Anti-lock Brake System), and the analog quantity acquisition module 511 collects information of the anti-lock brake system of the vehicle to prevent wheels from locking up during an emergency braking. The anti-lock brake system continuously detects a rotating speed of each wheel through a speed sensor mounted on each wheel or transmission shaft, and obtains a wheel slip ratio, compares it with an ideal slip ratio, and makes a decision to increase or decrease a braking pressure of a brake, and the execution module is ordered to adjust the braking pressure in time to keep the wheels in an ideal braking state.

Please refer to FIG. 49. In an embodiment of the disclosure, the vehicle state acquisition module 512 is used to collect real-time state information of the vehicle. The real-time state information of the vehicle may include, for example, vehicle speed, battery power information, motor state information, handbrake state information, and real-time fault information of the vehicle. The control module 510 changes an output state of the execution module 514 according to the real-time state information of the vehicle. The vehicle state acquisition module 512 may be connected with the control module 510 in a wireless and/or wired manner. The vehicle state acquisition module 512 may be sent to the control module 510 of the whole vehicle through a CAN line. The vehicle state acquisition module 512 may also send fault information to remote personnel for fault diagnosis.

Please refer to FIG. 49. In an embodiment of the disclosure, the battery module 513 provides kinetic energy for a walking of the vehicle, and the battery module 513 may also store energy feedback by the execution module 514 when the vehicle is braking.

Please refer to FIG. 49. In an embodiment of the disclosure, the control module 510 serves as a center of the control system of the vehicle braking, and an output of the execution module 514 is controlled according to the information of other modules. Wherein, the execution module 514 includes, for example, the motor. The control module 510 may perform a torque distribution according to a maximum output torque of the motor, a minimum output torque of the motor, a rated speed of the motor, a real-time allowable charging power of the battery, a real-time allowable discharging power of the battery, and a required torque of the vehicle, and control the execution module 514 to work. The control module 510 may be a part-time motor controller, or it may be a dedicated logic processor. The control module 510 may be, for example, a general processor, including a central processing unit (CPU for short), a network processor (NP for short), etc. It may also be a digital signal processor (DSP for short), an application specific integrated circuit (ASIC for short), a field-programmable gate array (FPGA for short) or other programmable logic devices, discrete gate or transistor logic devices, discrete hardware components. In this embodiment, the control module 510 includes a first processing unit 5101, a second processing unit 5102, a third processing unit 5103 and a fourth processing unit 5104.

Please refer to FIG. 49. In an embodiment of the disclosure, the execution module 514 includes an electric drive module, such as the motor, and the execution module 514 is used to provide driving force for the vehicle. At the same time, the execution module 514 is also used to execute an energy feedback function. When the vehicle is braking or coasting slowly, the execution module 514 converts kinetic energy during braking or coasting into electrical energy and stores it in the battery module 513 according to instructions of the control module 510, so as to avoid wasting the kinetic energy of the vehicle by frictional heat through a traditional mechanical brake. The disclosure is not limited to a number of specific devices in the execution module 514, and the execution module 514 includes, for example, one or more motors.

Please refer to FIG. 49. In an embodiment of the disclosure, the display module 515 is connected with the control module 510, and may also be connected with the vehicle state acquisition module 512 or the battery module 513. The display module 515 is used to display the state information of the vehicle, such as displaying battery power information, vehicle speed, etc. The display module 515 may further obtain and display a driving distance of remaining power according to battery power information. The display module 515 may further display fault information of the vehicle to remind the driver to pay attention to relevant conditions of the vehicle, so as to achieve a better effect of human-computer interaction. In this embodiment, the display module 515 may include an instrument on the vehicle, a driver's mobile phone or other electronic devices. The display module 515 may be connected with the control module 510 in a wireless and/or wired manner. Information of the display module 515 may be sent to the control module 510 of the whole vehicle through the CAN line.

Please refer to FIG. 49. In an embodiment of the disclosure, the control system of the vehicle braking provided in the disclosure may further include a storage module (not shown in the figure), and the storage module stores various braking modes when the vehicle is braking. The storage module is preferably integrated in the control module 510, and may further be electrically connected with the control module 510. The storage module may further include a random access memory (RAM for short), and may further include a non-volatile memory, such as at least one disk memory. The storage module may further be an internal memory of a random access memory (RAM) type. The control module 510 and the storage module may be integrated into one or more independent circuits or hardware, such as application specific integrated circuit (ASIC).

Please refer to FIG. 49. In an embodiment of the disclosure, the various braking modes when the vehicle brakes include a coasting feedback braking mode. When the vehicle is in the coasting feedback braking mode, the accelerating device 516 and the braking device 517 of the vehicle are both in a free state, the vehicle is coasting and the execution module 514 performs energy feedback, converting kinetic energy during coasting into electrical energy and storing it in the battery module 513. And when coasting, according to a vehicle weight and speed from a subjective experience of most drivers and passengers, a coasting braking force is 18% to 25% of a maximum braking force of the motor, and preferably 20%. At this time, the driver and passengers feel more comfortable and do not feel the braking. At this time, a coasting braking torque $T2=T1/5$, where T1 is a maximum braking torque of the motor at different speeds. Therefore, the coasting braking torque may be specifically obtained by a following formula: $T2=(N*P)/(5*r)$. Wherein, N is a braking coefficient. In this embodiment, N is, for example, 9550, P is a maximum braking power of the motor, and r is a real-time rotating speed of the motor.

Please refer to FIG. 49. In an embodiment of the disclosure, the multiple braking modes may further include an emergency braking mode. When the vehicle is in the emergency braking mode, the execution module 514 outputs a maximum reverse torque, and the vehicle brakes urgently.

Please refer to FIG. 49. In an embodiment of the disclosure, the multiple modes further include a normal feedback braking mode. At this time, the execution module 514 of the vehicle brakes according to the opening degree of the braking device 517, and at the same time, the execution module 514 recovers energy, converting kinetic energy during coasting into electrical energy and storing it in the battery module 513. When the vehicle is in the normal feedback braking mode, a braking torque is: $T=(N*P*y2)/(y1*r)$. Wherein, N is the braking coefficient. In this embodiment, N is, for example, 9550, P is the maximum braking power of the motor, y1 is a signal voltage corresponding to the braking device 517 when the opening degree of the braking device 517 is 100%, y2 is a real-time signal voltage of the braking device 517, and r is a real-time rotating number of the motor.

Please refer to FIG. 49 through FIG. 56. In the control method of the vehicle braking provided in the disclosure, the driver's intention is identified by comprehensively considering status information of accelerating device 516 and braking device 517 of the vehicle and changes in the status information. During emergency braking, it provides additional braking force to stop the vehicle as soon as possible, which realizes a maximum energy feedback during braking. And when there is no braking intention, it may intelligently brake according to environmental conditions, thereby improving a driving safety.

Figure 51:
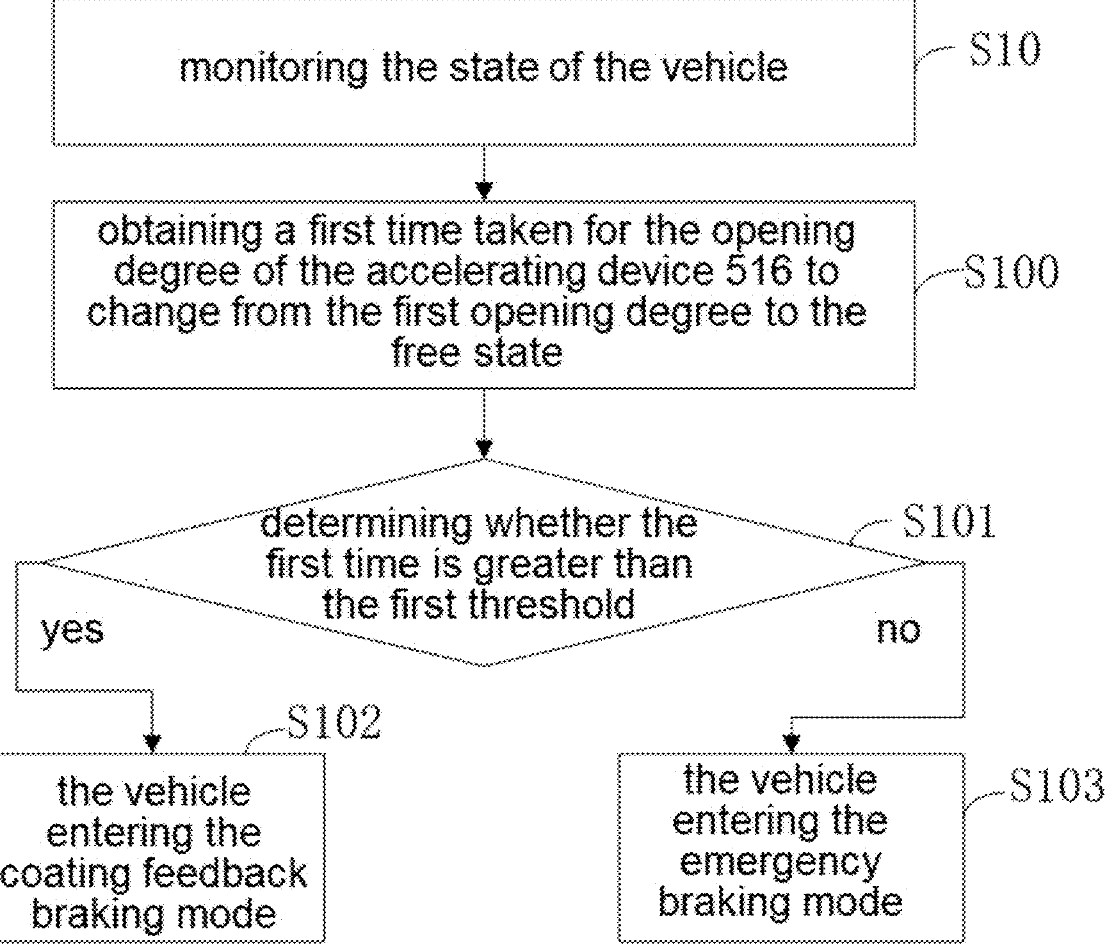
FIG. 51 is a flowchart of a control method of vehicle braking of the disclosure.
Figure 52:
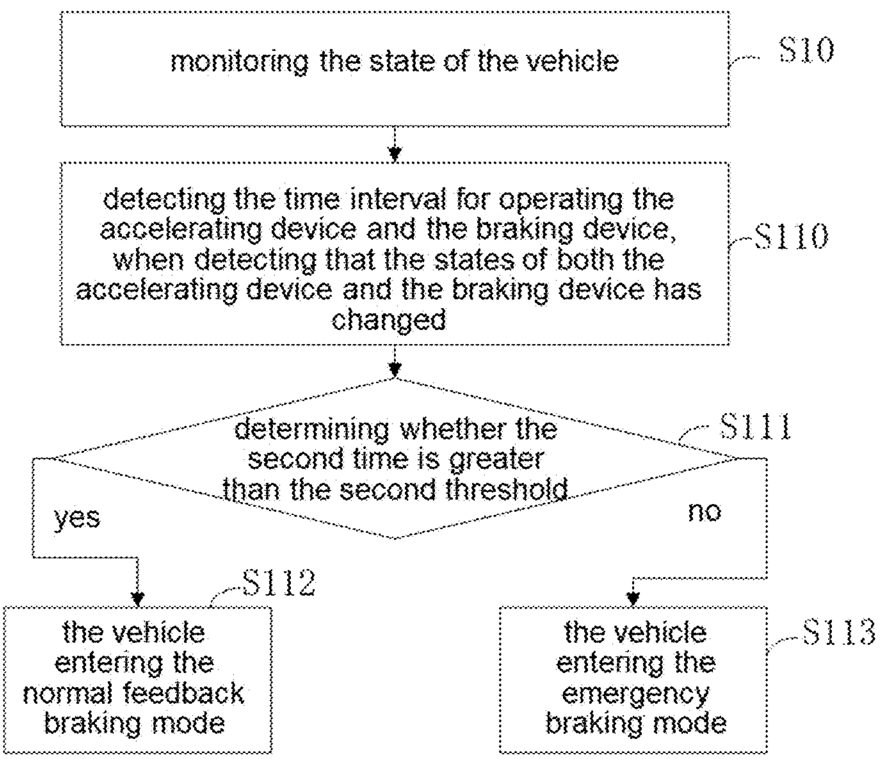
FIG. 52 is a second flowchart of a control method of vehicle braking of the disclosure.
Figure 53:
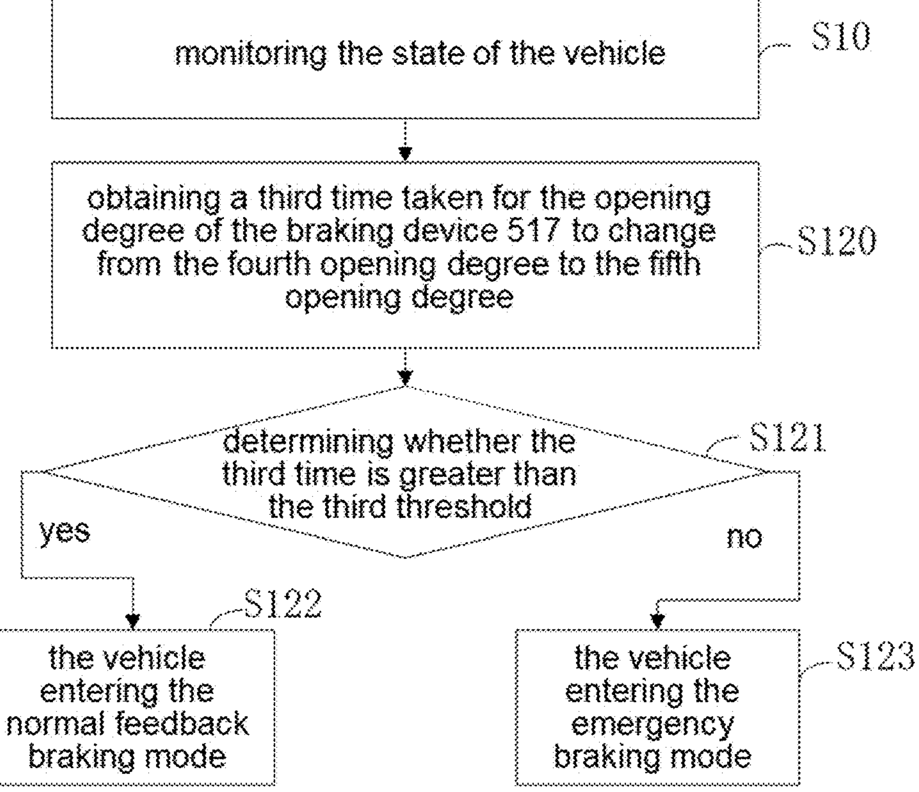
FIG. 53 is a third flowchart of a control method of vehicle braking of the disclosure.

FIG. 51 through FIG. 53 are schematic flowcharts of a first embodiment of the control method of the vehicle braking of the disclosure. An embodiment of the disclosure provides the control method of the vehicle braking, the method may be executed by any device for executing the control method of the vehicle braking, and the device may be implemented by software and/or hardware. In this embodiment, the device may be integrated in the vehicle.

On a basis of the above-mentioned braking system of the vehicle in FIG. 49, please refer to in FIG. 51, in an embodiment of the disclosure, the control method of the vehicle braking provided in the disclosure may includes:

S10: monitoring a state of the vehicle.

In this embodiment, monitoring the state of the vehicle specifically includes monitoring states of the braking device 517 and the accelerating device 516. The analog quantity acquisition module 511 is connected with the braking device 517 and the accelerating device 516, and the analog quantity acquisition module 511 is used to detect the states of the braking device 517 and the accelerating device 516 in real time, and convert opening degree states of the braking device 517 and the accelerating device 516 into analog input. In this embodiment, when defining a free state of the accelerating device 516, the opening degree of the accelerating device 516 is 0%, and a signal voltage corresponding to the accelerating device 516 is a first voltage, and the first voltage is, for example, 0 mv. When the accelerating device 516 is stepped on by the driver, the opening degree of the accelerating device 516 is 100%, the signal voltage corresponding to the accelerating device 516 is a second voltage, and the second voltage x1 is, for example, 100 mv. And the opening degree of the accelerating device 516 has a linear relationship with the signal voltage corresponding to the accelerating device 516. When defining the free state, the opening degree of the braking device 517 is 0%, and the signal voltage corresponding to the braking device 517 is a third voltage, and the third voltage is, for example, 0 mv. When the braking device 517 is stepped on by the driver, the opening degree of the braking device 517 is 100%, and the signal voltage corresponding to the braking device 517 is a fourth voltage, and the fourth voltage y1 is, for example, 100 mv. And the opening degree of the braking device 517 has a linear relationship with the signal voltage corresponding to the braking device 517. A real-time voltage of the braking device 517 is a fifth voltage y2 during braking, and a real-time voltage of the accelerating device 516 is a sixth voltage x2 during accelerating. And at any moment, only one of the accelerating device 516 and the braking device 517 has an opening degree greater than 0%.

Figure 50:
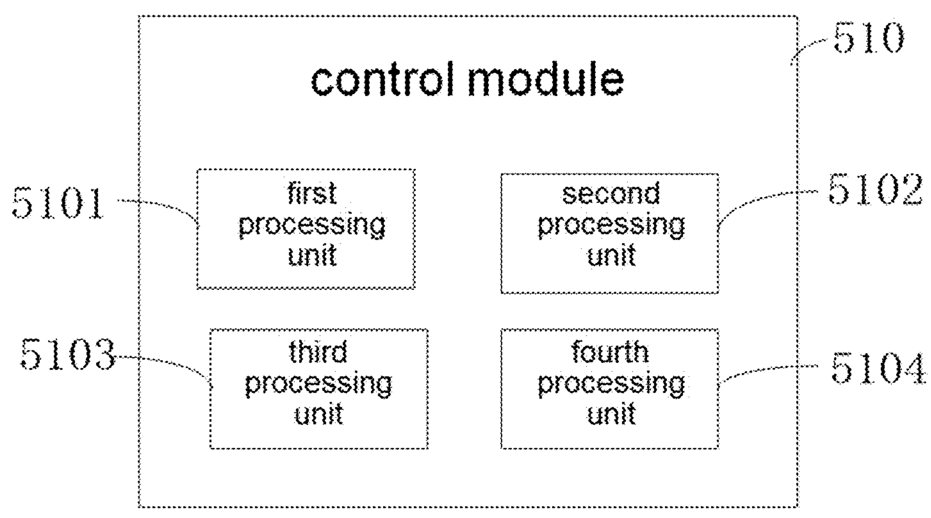
FIG. 50 is a block view of a control module of the disclosure.

Please refer to FIG. 49 through FIG. 51. In an embodiment of the disclosure, when a state change of the accelerating device 516 is detected, and the accelerating device 516 changes from a first opening degree to the free state. The control method of the vehicle braking provided by the disclosure includes:

S100: obtaining a first time taken for the opening degree of the accelerating device 516 to change from the first opening degree to the free state.

In this embodiment, the first time may be detected by the analog quantity acquisition module 511, and the first opening degree is, for example, an opening degree greater than 30%, which means that a range of the first opening degree is from 30% to 100%. The first time is a time interval during which the opening degree of the accelerating device 516 changes from the first opening degree to the free state.

S101: determining whether the first time is greater than a first threshold, if so, executing S102, otherwise, executing S103.

In this embodiment, the control module 510 may be used to determine whether the first time is greater than the first threshold, preferably, the first processing unit 5101 may be used to determine whether the first time is greater than the first threshold. A range of the first threshold is from 180 mS to 230 mS, preferably 200 mS. When the first time is greater than the first threshold, it is predicted that the driver only releases the accelerating device 516 and has no intention of braking. When the first time is less than the first threshold, it is predicted that the driver has an emergency braking intention.

S102: the vehicle entering a coasting feedback braking mode.

In this embodiment, when the first time is greater than the first threshold, it is predicted that the driver has no controlling intention. At this time, because the accelerating device 516 is released, the braking device 517 is also in the free state. When entering the coasting feedback braking mode, the vehicle will be in a coasting state, and the kinetic energy is converted into electrical energy by the execution module 514 and stored in the battery module 513.

S103: the vehicle entering the emergency braking mode.

In this embodiment, when the first time is less than the first threshold, it is predicted that the driver has an emergency braking intention. When entering the emergency braking state, the control module 510 controls the execution module 514, and the execution module 514 outputs the maximum reverse torque to brake the vehicle. At this time, the braking device 517 is not activated, and before the braking device 517 is activated, the emergency braking is performed according to a rate of change of the accelerating device 516.

Please refer to FIG. 49 through FIG. 52. In an embodiment of the disclosure, when it is detected that the states of both the accelerating device 516 and the braking device 517 have changed, on the basis of the above-mentioned braking system of the vehicle shown in FIG. 49 and FIG. 50, combined with FIG. 52, the control method of the vehicle braking provided by the disclosure may include:

S110: detecting a time interval for operating the accelerating device 516 and the braking device 517.

In this embodiment, the opening degree of the accelerating device 516 changes from a second opening degree to the free state, and after a second time, the opening degree of the braking device 517 changes from the free state to a third opening degree. A change and a rate of change of the opening degree of the accelerating device 516 may be monitored through the analog quantity acquisition module 511. The second opening degree is, for example, an opening degree greater than 0%, which means that a range of the second opening degree is, for example, from 0% to 100%. The second time which is a time interval between a first operation of the accelerating device 516 and a second operation of the brake device 517, wherein the first operation is the change of the opening degree of the accelerating device 516 from a second opening degree to a free state, and the second operation is the change of the opening degree of the brake device 517 from a free state to a third opening degree. The third opening degree is, for example, an opening degree greater than 10%, which means that a range of the third opening degree is, for example, from 10% to 100%.

S111: determining whether the second time is greater than a second threshold, if so, executing S112, otherwise, executing S113.

In this embodiment, the control module 510 may be used to determine whether the second time is greater than the second threshold, preferably, the first processing unit 5101 may be used to determine whether the second time is greater than the second threshold. A range of the second threshold is, for example, from 420 mS to 460 mS, preferably 450 mS. When the second time is greater than the second threshold, it is predicted that the driver has a normal braking intention. When the second time is less than the second threshold, it is predicted that the driver has the emergency braking intention.

S112: the vehicle entering the normal feedback braking mode.

In this embodiment, when the second time is greater than the second threshold, it is predicted that the driver has the normal braking intention. The vehicle brakes normally, and at the same time, the kinetic energy is converted into electrical energy by the execution module 514 and stored in the battery module 513. At this time, the braking torque is: T=(N*P*y2)/(y1*r). Wherein, N is the braking coefficient. In this embodiment, N is, for example, 9550, P is the maximum braking power of the motor, y1 is the corresponding signal voltage of the braking device 517 when the opening degree of the braking device 517 is 100%, y2 is the real-time signal voltage of the braking device 517, and r is the real-time rotating number of the motor.

S113: the vehicle entering the emergency braking mode.

In this embodiment, when the second time is less than the second threshold, it is predicted that the driver has the emergency braking intention. When entering the emergency braking state, the control module 510 controls the execution module 514, and the execution module 514 outputs the maximum reverse torque to brake the vehicle.

Please refer to FIG. 49, FIG. 50 and FIG. 53. In an embodiment of the disclosure, when it is detected that the braking device 517 changes, and the braking device 517 changes from a fourth opening degree to a fifth opening degree. On a basis of the above-mentioned braking system of the vehicle in FIG. 49 and FIG. 50, combined with FIG. 53, the control method of the vehicle braking provided by the disclosure may include:

S120: obtaining a third time taken for the opening degree of the braking device 517 to change from the fourth opening degree to the fifth opening degree.

In this embodiment, the opening degree of the braking device 517 changes from the fourth opening degree to the fifth opening degree after the third time. The change and the rate of change of the braking device 517 may be detected through the analog quantity acquisition module 511. The fourth opening degree is, for example, an opening degree greater than or equal to 0%, which means that a range of the fourth opening degree is, for example, from 0% to 100%. The third time is a time interval during which the opening degree of the braking device 517 changes from the fourth opening degree to the fifth opening degree. The fifth opening degree is greater than the fourth opening degree, and the fifth opening degree is, for example, greater than or equal to 30% of the opening degree, which means that the range of the fourth opening degree is, for example, from 30% to 100%. That is, in the third time, the opening degree of the braking device 517 is increased.

S121: determining whether the third time is greater than the third threshold, if yes, executing S122, otherwise, executing S123.

In this embodiment, the control module 510 may be used to determine whether the third time is greater than the third threshold, preferably, the first processing unit 5101 may be used to determine whether the third time is greater than the third threshold. A range of the third threshold is from 180 mS to 230 mS, preferably 200 mS. When the third time is greater than the third threshold, it is predicted that the driver has the normal braking intention. When the third time is less than the third threshold, it is predicted that the driver has the emergency braking intention.

S122: the vehicle entering the normal feedback braking mode.

In this embodiment, when the third time is greater than the third threshold, it is predicted that the driver has the normal braking intention. The vehicle brakes normally, and at the same time, the kinetic energy is converted into electrical energy by the execution module 514 and stored in the battery module 513. At this time, the braking torque is: T=(N*P*y2)/(y1*r). Wherein, N is the braking coefficient. In this embodiment, N is, for example, 9550, P is the maximum braking power of the motor, y1 is the corresponding signal voltage of the braking device 517 when the opening degree of the braking device 517 is 100%, y2 is the real-time signal voltage of the braking device 517, and r is the real-time rotating number of the motor.

S123: the vehicle entering the emergency braking mode.

In this embodiment, when the third time is less than the third threshold, it is predicted that the driver has the emergency braking intention. When entering the emergency braking state, the control module 510 controls the execution module 514, and the execution module 514 outputs the maximum reverse torque to brake the vehicle.

Please refer to FIG. 49 through FIG. 53. The control method of the vehicle braking provided in this embodiment determines the driver's intention according to the change rate of the accelerating device 516 and the braking device 517 and an interval time between operating the accelerating device 516 and the braking device 517. Before the braking device 517 is activated, the execution module 514 outputs the maximum reverse torque for emergency braking. And when the vehicle is coasting and braking normally, the kinetic energy is converted into electrical energy and stored in the battery module 513, and the kinetic energy of the vehicle is converted into electrical energy and stored in the battery as much as possible, so as to avoid a waste of heat generated by vehicle kinetic energy friction through a traditional mechanical brake.

Please refer to FIG. 49 through FIG. 53. In this embodiment, during coasting and normal braking, the execution module will perform energy feedback, but when the kinetic energy of the vehicle is small, recovered electrical energy is insufficient, and the execution module 514 needs to consume electrical energy during energy feedback. Please refer to FIG. 54. In another embodiment of the disclosure, the embodiment provides a braking method of the vehicle, which may realize a maximum power feedback during a process of coasting and braking the vehicle.

Figure 54:
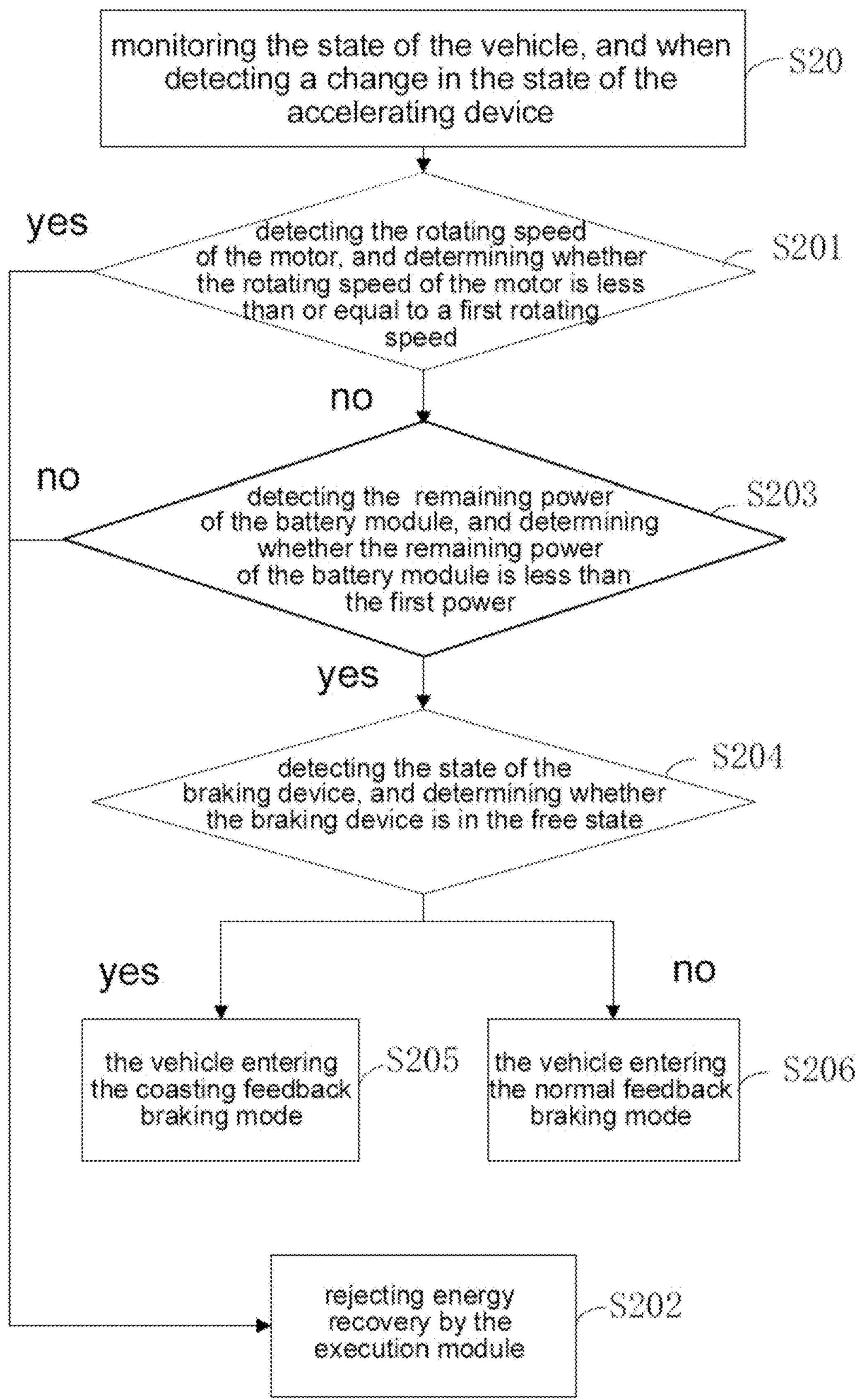
FIG. 54 is a fourth flowchart of a control method of vehicle braking of the disclosure.

FIG. 54 is a schematic flowchart of a second embodiment of the control method of the vehicle braking of the disclosure. An embodiment of the disclosure provides the control method of the vehicle braking, the method may be executed by any device for executing the control method of the vehicle braking, and the device may be implemented by software and/or hardware. In this embodiment, the device may be integrated in the vehicle. On a basis of the above-mentioned braking system of the vehicle in FIG. 49 and FIG. 50, please refer to in FIG. 54, in an embodiment of the disclosure, the control method of the vehicle braking provided in the disclosure may includes:

S20: monitoring the state of the vehicle.

In this embodiment, monitoring the state of the vehicle specifically includes monitoring states of the braking device 517 and the accelerating device 516. And when it is detected that the state of the accelerating device 516 changes, S201 is executed. And a specific implementation manner of S20 is the same as that of S10 in the first embodiment. Specifically, when it is detected that the accelerating device 516 changes from a sixth opening degree to the free state, S201 is executed, and the sixth opening degree is greater than 0%. In this embodiment, the change of the opening degree of the accelerating device 516 and the rate of change may be collected through the analog quantity acquisition module 511. The control method of the vehicle braking provided by the disclosure includes:

S201: detecting the rotating speed of the motor, and determining whether the rotating speed of the motor is greater than a first rotating speed, if yes, executing S203, otherwise executing S202.

In this embodiment, the rotating speed of the motor may be detected by the vehicle state acquisition module 512, and specifically, the rotating speed of the motor in the execution module 514 may be detected by the vehicle state acquisition module 512. Furthermore, the control module 510 is used to determine whether the rotating speed of the motor is less than or equal to the first rotating speed, and preferably a second processing unit 5102 is used to determine whether the rotating speed of the motor is less than or equal to the first rotating speed. A range of the first rotating speed is, for example, from 80 rpm to 120 rpm, preferably 100 rpm. The first rotating speed is a condition for performing energy feedback, for example, it is defined as an energy feedback speed, when rotating speed of the vehicle is less than or equal to the first rotating speed, recovered electrical energy is not enough to perform a process of energy feedback. When the rotating speed of the vehicle is greater than the first rotating speed, the execution module 514 may perform an energy feedback function, which converts the kinetic energy into electrical energy and storing it in the battery module 513.

S202: rejecting energy feedback by the execution module 514.

At this time, the execution module 514 rejects the energy feedback, the vehicle will not enter the coasting feedback mode and the normal feedback mode, and only glides or brakes according to the states of the braking device 517 and the accelerating device 516 of the vehicle. And when coasting, according to the vehicle weight and speed from a subjective experience of most drivers and passengers, the coasting braking force is 18% to 25% of the maximum braking force of the motor, and preferably 20%. At this time, the driver and passengers feel more comfortable and do not feel the braking. At this time, the coasting braking torque T2=T1/5, where T1 is the maximum braking torque of the motor at different speeds. Therefore, the coasting braking torque may be specifically obtained by the following formula: T2=(N*P)/(5*r). Wherein, N is the braking coefficient. In this embodiment, N is, for example, 9550, P is the maximum braking power of the motor, and r is the real-time rotating speed of the motor.

S203: detecting the remaining power of the battery module 513, and determining whether the remaining power of the battery module 513 is less than a first power, if so, executing S204, otherwise executing S202.

In this embodiment, the remaining power of the battery module 513 may be detected by the vehicle state acquisition module 512, the control module 510 may be used to determine whether the remaining power of the battery module 513 is less than the first power, and preferably, the second processing unit 5102 is used to determine whether the remaining power of the battery module 513 is less than the first power. The first power is the safe power of the battery, for example, the first power is 95% of a maximum power of the battery, which means that when a state of charge (SOC) of the battery is less than 95%, S205 is executed. When the remaining power of the battery module 513 is greater than the first power, the execution module 514 does not perform the energy feedback, and when the remaining power of the battery module 513 is greater than 95% of the total battery power, the energy feedback is easy to damage the battery.

S204: detecting the state of the braking device 517, and determining whether the braking device 517 is in the free state, if yes, executing S205, otherwise, executing S206.

In this embodiment, the state of the braking device 517 may be detected by the analog quantity acquisition module 511, whether the braking device 517 is in the free state is determined by the control module 510, and preferably, the second processing unit 5102 is used to determine whether the braking device 517 is in the free state.

S205: the vehicle entering coasting feedback braking mode.

In this embodiment, when the vehicle enters the coasting feedback braking mode, the coasting braking force is from 18% to 25% of the maximum braking force of the motor, according to the vehicle weight and speed from the subjective experience of most drivers and passengers, preferably 20%. At this time, the driver and passengers feel more comfortable and do not feel the braking. At this time, a coasting braking torque T2=T1/5, where T1 is a maximum braking torque of the motor at different speeds. And T1=N*P/r. N is the braking coefficient. In this embodiment, N is, for example, 9550, P is the maximum braking power of the motor, and r is the real-time rotating speed of the motor.

S206: the vehicle entering normal feedback braking mode.

In this embodiment, the kinetic energy is converted into electrical energy by the execution module 514 and stored in the battery module 513. At this time, the braking torque is: T=(N*P*y2)/(y1*r). Wherein, N is the braking coefficient. In this embodiment, N is, for example, 9550, P is the maximum braking power of the motor, y1 is the signal voltage corresponding to the braking device 517 when the opening degree of the braking device 517 is 100%, y2 is the real-time signal voltage of the braking device 517, and r is the real-time rotating number of the motor.

Please refer to FIG. 54. During an execution of S205 to S206, the control system of the vehicle brake detects the rotating speed of the motor in real time, and determines whether the rotating speed of the motor is less than or equal to the first speed, if yes, executing S202, otherwise executing S203.

Please refer to FIG. 49, FIG. 50 through FIG. 54. In this embodiment, it is determined whether to execute the energy feedback by detecting the rotating speed of the motor in the execution module 514 in real time. When the rotating speed of the motor is too low, or when the power of the battery module 513 is sufficient, the energy feedback is not performed to maximize energy feedback and protect the battery in the battery module 513 at the same time. On a basis of executing the control method of the vehicle braking provided in the first embodiment, the control method of the vehicle braking provided in the second embodiment is executed simultaneously, so that energy feedback may be maximized during coasting or braking.

Figure 55:
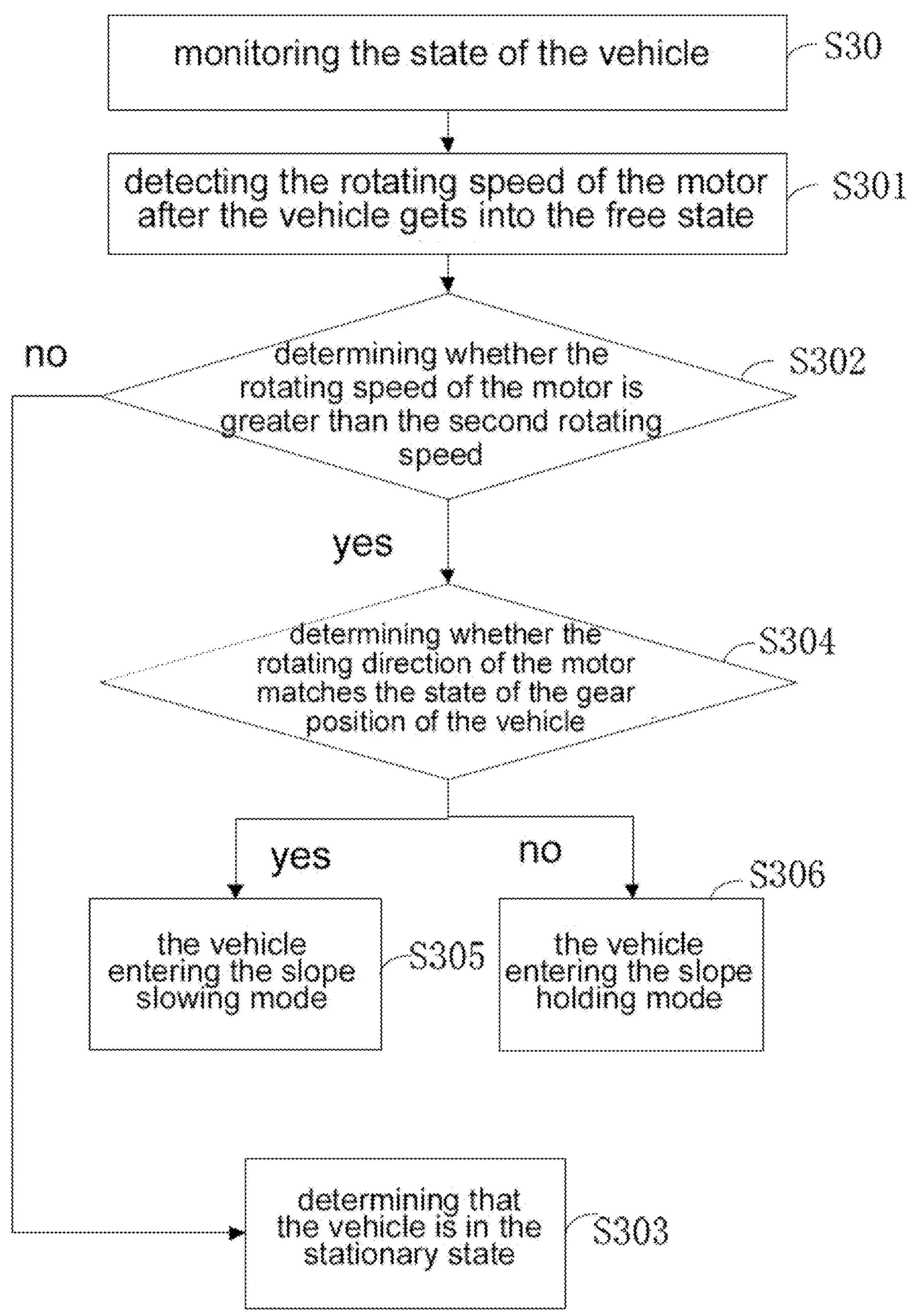
FIG. 55 is a fifth flowchart of a control method of vehicle braking of the disclosure.

FIG. 55 is a schematic flowchart of a third embodiment of the control method of the vehicle braking of the disclosure. An embodiment of the disclosure provides the control method of the vehicle braking, the method may be executed by any device for executing the control method of the vehicle braking, and the device may be implemented by software and/or hardware. In this embodiment, the device may be integrated in the vehicle. Through the control method of the vehicle braking provided in the third embodiment, an automatic parking on slopes and slow driving on slopes may be realized. On a basis of the system of the vehicle braking in FIG. 49 and FIG. 50 mentioned above, as shown in FIG. 55, in third embodiment provided by the disclosure, the control method of the vehicle braking may include:

S30: monitoring the state of the vehicle.

In this embodiment, monitoring the state of the vehicle specifically includes monitoring states of the braking device 517 and the accelerating device 516, which means monitoring the change of the opening degree of the accelerating device 516 and the change of the opening degree of the brake device 517. A specific implementation of S30 is the same as that of S10 in the first embodiment. After monitoring that the driver releases the accelerating device 516, the control method of the vehicle braking provided by the disclosure includes:

S301: detecting the rotating speed of the motor after the vehicle gets into the free state.

In this embodiment, when the vehicle is in the free state, the accelerating device 516 is in the free state, and the braking device 517 is in the free state. And after the vehicle becomes in the free state, detecting the rotating speed of the motor may include: the braking device 517 of the vehicle being always in the free state, and when the accelerating device 516 of the vehicle changes from the seventh opening degree to the free state, detecting the rotating speed of the motor through the vehicle state acquisition module 512, and specifically, the vehicle state acquisition module 512 detecting the rotating speed of the motor in the execution module 514. Wherein, the seventh opening degree is an opening degree greater than 0%, and the braking device 517 is always in the free state. And when the accelerating device 516 is activated, an accumulating time is performed, for example, a fourth time. In this embodiment, the fourth time is a detecting time of the vehicle speed. When the fourth time reaches a fourth threshold, the rotating speed of the motor is detected, and the fourth threshold is, for example, from 450 mS to 550 mS, preferably 500 mS.

S302: determining whether the rotating speed of the motor is greater than a second rotating speed, if yes, executing S304, otherwise executing S303.

In this embodiment, the control module 510 is used to determine whether the rotating speed of the motor is lower than the second rotating speed, and preferably the third processing unit 5103 is used to determine whether the rotating speed of the motor in the execution module 514 is lower than the second rotating speed. The second rotating speed is defined as a safe rotating speed of the vehicle, and the second rotating speed is, for example, from 8 rpm to 15 rpm, preferably 10 rpm. When the rotating speed of the motor is within the second rotating speed, the vehicle is close to a stationary state.

S303: determining that the vehicle is in the stationary state.

In this embodiment, when the rotating speed of the motor is within the second rotating speed, the vehicle is close to the stationary state. No other action is required. At this time, the vehicle is in a flat road state, or the vehicle is in the stationary state or close to the stationary state through structures such as a handbrake.

S304: determining whether a rotating direction of the motor matches a state of the gear position of the vehicle, if yes, executing S305, otherwise, executing S306.

In this embodiment, the third processing unit 5103 is used to determine whether the rotating direction of the motor matches the direction of the gear of the vehicle. Gears are arranged on the vehicle, and the gears usually include a forward gear and a reverse gear. Under normal conditions, the state of the gear matches the rotating direction of the motor. When the gear of the vehicle is in the forward gear, the motor rotates forward, and when the gear of the vehicle is in the reverse gear, the motor reverses. In this embodiment, when both the braking device 517 and the accelerating device 516 of the vehicle are in the free state, but the rotating speed of the motor is greater than the second rotating speed, and the rotating direction of the motor matches the rotating direction of the gear of the vehicle, it is determined that the vehicle is in a downhill state, which means that the vehicle slips on the slope with a certain gradient. When both the braking device 517 and the accelerating device 516 of the vehicle are in the free state, but when the rotating speed of the motor is greater than the second rotating speed, and the rotating direction of the motor does not match the rotating direction of the gear of the vehicle (the rotating direction of the motor is opposite to the rotating direction of the gear), it is determined that the vehicle is in an uphill state, which means that the vehicle slips backwards on the slope with a certain gradient.

S305: the vehicle entering a slope slowing mode.

In this embodiment, when the vehicle is in the downhill state and slips on the slope with the certain gradient, the vehicle enters the slope slowing mode. At this time, an electric driving module in the execution module 514 works and enters a rotating speed control mode. The control module 510 controls the motor to rotate at a preset rotating speed to drive the vehicle to run slowly on the slope at a third rotating speed, for example, the third rotating speed is from 10 rpm to 20 rpm, preferably 10 rpm. It may avoid a danger caused by the vehicle going downhill rapidly because the driver does not step on the braking device 517 in time, and prevent the vehicle from slipping.

S306: the vehicle entering a slope holding mode.

In this embodiment, when it is determined that the vehicle is in the uphill state and rolls backwards on the slope with the certain gradient, the vehicle enters the slope slowing mode. At this time, the electric drive module in the execution module 514 works and enters the rotating speed control mode. The control module 510 controls the motor to rotate at the rotating preset speed to drive the vehicle to continue to rotate at a fourth rotating speed to keep the vehicle in place. In this embodiment, the fourth rotating speed is defined as a braking rotating speed of the vehicle, and when the vehicle rotates at the braking rotating speed, the vehicle stops on the slope. Therefore, the driver has enough time to perform other operations on the vehicle, such as pulling up an original parking brake of the vehicle, so as to ensure that the vehicle may be parked on the slope more safely.

Figure 56:
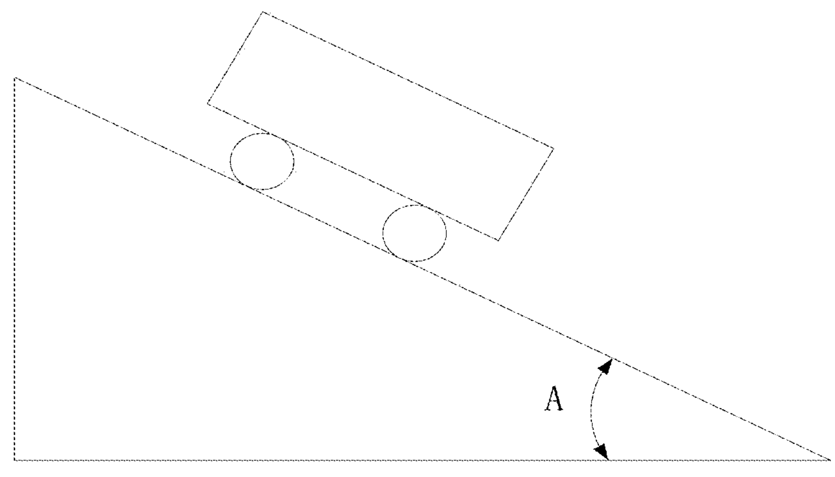
FIG. 56 is a schematic view of the vehicle traveling on a slope of the disclosure.

Please refer to FIG. 55 through FIG. 56. In an embodiment of the disclosure, when the vehicle requires the motor to continue to rotate at the fourth rotating speed to keep the vehicle in place, at this time, the vehicle weight is greater than a frictional force. At this time, the fourth rotating speed is obtained by a following formula: $R=(N*P)/(G*\cos A-f)$. Wherein, R is the fourth rotating speed (braking rotating speed), N is the braking coefficient. In this embodiment, N is, for example, 9550, P is the maximum braking power of the motor, G is the gravity of the vehicle, A is the gradient of the slope, and f is the frictional force on the vehicle.

Please refer to FIG. 49, FIG. 55 through FIG. 56. In this embodiment, after the accelerating device 516 is released, it is determined whether the vehicle is on the slope by detecting the rotating speed of the motor, the rotating direction of the motor and the state of the gear. The vehicle is prevented from rolling or slipping back on the slope, which ensures a personal safety of the driver. In this disclosure, on a basis of executing the control methods of the vehicle braking provided in the first or second embodiment, the control method of the vehicle braking provided in the third embodiment may be executed simultaneously.

Please refer to FIG. 49 through FIG. 56. In an embodiment of the disclosure, while executing the first, second and third embodiments, the control method of the vehicle braking provided by the disclosure further includes real-time monitoring of fault information of the vehicle, and using the fourth processing unit 5104 in the control module 510 to execute the related control method of the vehicle brake, and changing the output state of the execution module 514. In order to ensure the normal operation of the vehicle, the control method of the vehicle braking includes:

Collecting a temperature of the motor is by the vehicle state acquisition module 512. When the temperature of the motor is lower than a first temperature, the motor works normally. When the temperature of the motor is between the first temperature and a second temperature, an output power of the motor is limited, for example, the output power of the motor is less than 75% of a maximum output power of the motor. When the temperature of the motor exceeds the second temperature of the motor, the motor stops working. The first temperature and the second temperature are defined according to a performance of the motor and the vehicle. The first temperature is, for example, from 80° C. to 100° C., and the second temperature is, for example, from 100° C. to 150° C.

Collecting a temperature of the control module 510 by the vehicle state acquisition module 512. When the temperature of the control module 510 is lower than a third temperature, the control module 510 works normally. When the temperature of the control module 510 is higher than the third temperature, the output power of the motor is limited. The third temperature may be set according to a quality of the control module, which is not limited in this disclosure.

Collecting the battery power of the battery by the vehicle state acquisition module 512. When the state of charge of the battery is too low, for example, the state of charge is less than 5%, the output power of the motor is limited, and an alarm message is displayed on the display module 515.

Collecting an output voltage of the battery by the vehicle state acquisition module 512. When the output voltage of the battery is too low, for example, the output voltage of the battery is less than 50% of the rated voltage of the battery, the output power of the motor is limited.

Collecting a voltage difference of the battery within a certain period of time by the vehicle state acquisition module 512. And when the voltage difference is too large, the battery is maintained. The disclosure does not limit a threshold value of the voltage difference, which may be determined according to a specification of a specific battery.

Collecting the temperature of the battery by the vehicle state acquisition module 512. And when the temperature of the battery is lower than its threshold, the output power of the motor is limited. The disclosure does not limit a threshold value of the temperature of the battery, which may be determined according to a specification of a specific battery.

In summary, the disclosure provides the electric all-terrain vehicle. The electric all-terrain vehicle includes the vehicle frame, the vehicle frame includes the bottom assembly and the upper assembly, and the upper assembly is arranged on the bottom assembly, so the upper assembly and the bottom assembly form the accommodation space, and the battery pack may be arranged in the accommodation space. The bottom assembly may include two longitudinal beams arranged in parallel and the upper assembly may include the seat fixing bracket and the cargo compartment mounting bracket. The seat fixing bracket and the cargo compartment mounting bracket may be fixed on the longitudinal beam through the rear swing arm bracket, so that the structure of the vehicle frame is relatively simple. When other components need to be mounted on the vehicle frame, they may be fixed on the longitudinal beam through the functional bracket, so the vehicle frame has good versatility.

In summary, the disclosure provides the control method of the vehicle braking, which may realize the parking on the slope only by the motor and a slow slide at a predetermined speed on different slopes only through the motor. Through determining the time interval between the driver's operation of the accelerating device and the braking device, and a time of operating the opening degree of the braking device, it is determined whether the driver's braking intention is a slow braking or an emergency braking, and then it is determined whether the motor needs to be provided additional braking force. Under a condition allowed by the battery module, when the driver operates the braking device, the motor will follow the established strategy to achieve a maximum braking feedback, convert the kinetic energy of the vehicle into electrical energy and store it in the battery as much as possible, which avoids wasting vehicle kinetic energy through frictional heat generation by traditional mechanical brakes, and a main purpose of this process is vehicle braking. In normal driving, when the driver releases the accelerating device, the motor will perform a coasting braking according to the established strategy with a more comfortable braking force, which converts a small amount of kinetic energy into electrical energy and re-storing it in the battery, and this process does not have a primary purpose of vehicle braking. According to the remaining power of the battery of the vehicle and a mileage of the vehicle under comprehensive working conditions in the previous period, it is estimated that the remaining power may be used for the mileage of the vehicle to display various state information of the vehicle in real time, including but not limited to various fault information of the vehicle, remaining power mileage and other information, and the control module will implement different working conditions according to the established strategy.

The above description is only a preferred embodiment of the disclosure and an explanation of the technical principle used. Those skilled in the art should understand that a disclosure scope involved in this disclosure is not limited to the technical solutions formed by the specific combination of the above technical features. At the same time, it should also cover other technical solutions formed by any combination of the above technical features or their equivalent features without departing from a concept of the disclosure, such as a technical solution formed by replacing the above-mentioned features with technical features with similar functions disclosed in (but not limited to) this disclosure.

What is claimed is:

1. An electric all-terrain vehicle, comprising:

a vehicle frame;

a motor, arranged on the vehicle frame and located at a rear end of the vehicle frame;

a gearbox, arranged on the vehicle frame, located on a first side of the motor and connected to the motor;

a cargo compartment, arranged on the vehicle frame and located above the motor and the gearbox;

a battery pack, mounted on the vehicle frame to provide power to the electric all-terrain vehicle;

a handle assembly, arranged on the cargo compartment and being adjustable to lock or unlock the cargo compartment from the vehicle frame;

a wheel assembly, arranged on the vehicle frame and comprising a rear wheel, and the gearbox being connected to the rear wheel;

a casing, arranged on the vehicle frame;

a front casing, arranged on the vehicle frame and located at a front end of the casing, and the front casing being connected to the casing through a rotating assembly:

a first limiting plate, connected to the vehicle frame and comprising a groove; and an elastic bracket, a first end of the elastic bracket being arranged on the front casing, and a second end of the elastic bracket being matched with the groove.

2. The electric all-terrain vehicle according to claim 1, wherein the vehicle frame comprises:

a bottom assembly, and an upper assembly, arranged on the bottom assembly, and the upper assembly and the bottom assembly forming an accommodation space.

3. The electric all-terrain vehicle according to claim 2, wherein the vehicle frame further comprises a front assembly arranged on the bottom assembly, and the front assembly is located at a front end of the upper assembly.

4. The electric all-terrain vehicle according to claim 2, wherein the bottom assembly comprises:

two longitudinal beams arranged in parallel;

a plurality of side beams, respectively arranged on the two longitudinal beams, the side beams being perpendicular to the longitudinal beams and extending to an outside of the accommodation space;

a front bumper bracket, arranged at a first end of the longitudinal beams and connecting the two longitudinal beams; and a rear tow hook bracket, arranged at a second end of the longitudinal beams and connecting the two longitudinal beams.

5. The electric all-terrain vehicle according to claim 4, wherein the bottom assembly further comprises:

a first connecting beam and a second connecting beam, arranged in parallel between the two longitudinal beams; and a connecting arm, two ends of the connecting arm being respectively connected to the intermediate cross beams.

6. The electric all-terrain vehicle according to claim 2, wherein the upper assembly comprises:

a seat bucket frame, arranged on the vehicle frame and parallel to the bottom assembly; and a seat cushion mounting bracket, arranged on the seat bucket frame and comprising a rubber cushion therein.

7. The electric all-terrain vehicle according to claim 6, further comprising a seat, wherein the seat is arranged on the seat bucket frame, the seat comprises a seat cushion, a bottom of the seat cushion comprises a seat cushion fixing column, and the seat cushion fixing column is arranged in the seat cushion mounting bracket and pass through the rubber cushion.

8. The electric all-terrain vehicle according to claim 2, wherein the battery pack is arranged in the accommodation space.

9. The electric all-terrain vehicle according to claim 8, wherein the bottom assembly comprises two longitudinal beams arranged in parallel, the vehicle frame further comprises a battery supporting beam arranged on the longitudinal beams, a width of the battery supporting beam is greater than a width between two longitudinal beams.

10. The electric all-terrain vehicle according to claim 9, wherein the battery supporting beam is provided with a first battery pack bracket and a second battery pack.

11. The electric all-terrain vehicle according to claim 1, wherein a first distance is formed between a center of gravity of the battery pack and a front end of the electric all-terrain vehicle, and a range of the first distance is one-third to one-half of a length of the electric all-terrain vehicle.

12. The electric all-terrain vehicle according to claim 11, wherein the battery pack is provided with a plurality of heating patches, and the heating patches are located on a side wall and a top of the battery pack.

13. The electric all-terrain vehicle according to claim 11, further comprising a controller, wherein the controller is mounted on the vehicle frame and located at a first side of the battery pack.

14. The electric all-terrain vehicle according to claim 1, wherein the cargo compartment is turnably connected to the vehicle frame, and a ratio of a distance between a turning center of the cargo compartment and a rear end of the cargo compartment to a length of the cargo compartment is from 0.25 to 0.45.

15. The electric all-terrain vehicle according to claim 1, wherein the cargo compartment comprises a cargo compartment frame and a bottom plate, the bottom plate is arranged on the cargo compartment frame, a lifting bracket is arranged on the cargo compartment frame, and at least one inner hook is arranged on a surface of the bottom plate away from the cargo compartment frame.

16. The electric all-terrain vehicle according to claim 15, wherein the vehicle frame is provided with an automatic lifting structure, and a first end of the automatic lifting structure is arranged on the vehicle frame, and a second end of the automatic lifting structure is arranged on the lifting bracket.

17. The electric all-terrain vehicle according to claim 1, wherein the motor comprises:

a motor body;

an upper connecting plate, arranged on the motor body; and a rear connecting plate, arranged on the motor body and opposite to the upper connecting plate.

18. The electric all-terrain vehicle according to claim 17, wherein the rear connecting plate is connected to the gearbox.

19. The electric all-terrain vehicle according to claim 1, wherein an output shaft of the motor extends into the gearbox.

* * * * *